US007200749B2

(12) United States Patent
Wheeler et al.

(10) Patent No.: US 7,200,749 B2
(45) Date of Patent: Apr. 3, 2007

(54) METHOD AND SYSTEM FOR USING ELECTRONIC COMMUNICATIONS FOR AN ELECTRONIC CONTRACT

(75) Inventors: Lynn Henry Wheeler, Greenwood Village, CO (US); Anne Mcafree Wheeler, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 141 days.

(21) Appl. No.: 10/312,164

(22) PCT Filed: Aug. 6, 2001

(86) PCT No.: PCT/US01/41586

§ 371 (c)(1),
(2), (4) Date: Dec. 20, 2002

(87) PCT Pub. No.: WO02/13435

PCT Pub. Date: Feb. 14, 2002

(65) Prior Publication Data

US 2003/0177361 A1    Sep. 18, 2003

Related U.S. Application Data

(60) Provisional application No. 60/223,076, filed on Aug. 4, 2000.

(51) Int. Cl.
*H04L 9/00* (2006.01)

(52) U.S. Cl. .................... 713/170; 713/176; 705/80

(58) Field of Classification Search ........... 713/170, 713/176, 180, 181; 705/51, 1, 80
See application file for complete search history.

(56) References Cited

U.S. PATENT DOCUMENTS 3,962,539 A    6/1976  Ehrsam et al.

(Continued)

FOREIGN PATENT DOCUMENTS

CA    2271178    5/1999

(Continued)

OTHER PUBLICATIONS

PKCS #9, Selected Object Classes and Attribute Types Version 2.0, RSA Laboratories, Redwood City, CA, pp. 1-42.

(Continued)

*Primary Examiner*—Gilberto Barron
*Assistant Examiner*—Andrew L Nalven
(74) *Attorney, Agent, or Firm*—Morris, Manning & Martin LLP

(57) ABSTRACT

A method and system for digitally signing an electronic contract document. An electronic communication contains an identifier, a message, which includes the document, and a digital signature generated with a private key of an asymmetric key pair (247). The identifier may be used to retrieve a corresponding public key (287) and account information pertaining to the sender of the message. The public key may be used to authenticate the sender and the message. A device containing the private key may be used to protect the privacy thereof. The device may also generate a verification status indicator corresponding to verification data input into the device. The indicator may also be used as evidence that the sender of a contract document performed an overt act in causing the electronic communication to be digitally signed. A security profile linked to the public key in a secure database indicates security characteristics of the device.

20 Claims, 17 Drawing Sheets

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,408,203 A | 10/1983 | Campbell | |
| 4,424,414 A | 1/1984 | Hellman et al. | |
| 4,734,564 A | 3/1988 | Boston et al. | |
| 4,748,668 A | 5/1988 | Shamir et al. | |
| 4,797,920 A | 1/1989 | Stein | |
| 4,823,388 A | 4/1989 | Mizutani et al. | |
| 4,825,050 A | 4/1989 | Griffith et al. | |
| 4,850,017 A | 7/1989 | Matyas, Jr. et al. | |
| 4,868,877 A | 9/1989 | Fischer | |
| 4,885,788 A | 12/1989 | Takaragi et al. | |
| 5,018,196 A | 5/1991 | Takaragi et al. | |
| 5,029,208 A | 7/1991 | Tanaka | |
| 5,097,504 A | 3/1992 | Camion et al. | |
| 5,140,634 A | 8/1992 | Guillou et al. | |
| 5,214,703 A | 5/1993 | Massey et al. | |
| 5,225,978 A | 7/1993 | Petersen et al. | |
| 5,231,668 A | 7/1993 | Kravitz | |
| 5,422,953 A | 6/1995 | Fischer | |
| 5,453,601 A | 9/1995 | Rosen | |
| 5,455,865 A | 10/1995 | Perlman | |
| 5,502,766 A | 3/1996 | Boebert et al. | |
| 5,509,071 A | 4/1996 | Petrie, Jr. et al. | |
| 5,534,855 A | 7/1996 | Shockley et al. | |
| 5,539,828 A | 7/1996 | Davis | |
| 5,557,518 A | 9/1996 | Rosen | |
| 5,563,946 A | 10/1996 | Cooper et al. | |
| 5,577,120 A | 11/1996 | Penzias | |
| 5,586,036 A | 12/1996 | Pintsov | |
| 5,590,197 A | 12/1996 | Chen et al. | |
| 5,604,801 A | 2/1997 | Dolan et al. | |
| 5,606,609 A | 2/1997 | Houser et al. | |
| 5,615,266 A | 3/1997 | Altschuler et al. | |
| 5,615,268 A * | 3/1997 | Bisbee et al. | 713/176 |
| 5,619,574 A | 4/1997 | Johnson et al. | |
| 5,623,637 A | 4/1997 | Jones et al. | |
| 5,625,690 A | 4/1997 | Michel et al. | |
| 5,636,280 A | 6/1997 | Kelly | |
| 5,659,616 A * | 8/1997 | Sudia | 705/76 |
| 5,671,279 A | 9/1997 | Elgamal | |
| 5,671,285 A | 9/1997 | Newman | |
| 5,677,953 A | 10/1997 | Dolphin | |
| 5,677,955 A | 10/1997 | Doggett et al. | |
| 5,694,471 A | 12/1997 | Chen et al. | |
| 5,708,780 A | 1/1998 | Levergood et al. | |
| 5,715,314 A | 2/1998 | Payne et al. | |
| 5,721,779 A | 2/1998 | Funk | |
| 5,724,424 A | 3/1998 | Gifford | |
| 5,745,886 A | 4/1998 | Rosen | |
| 5,751,813 A | 5/1998 | Dorenbos | |
| 5,778,072 A | 7/1998 | Samar | |
| 5,781,723 A | 7/1998 | Yee et al. | |
| 5,787,172 A | 7/1998 | Arnold | |
| 5,790,677 A | 8/1998 | Fox et al. | |
| 5,796,840 A | 8/1998 | Davis | |
| 5,809,144 A | 9/1998 | Sirbu et al. | |
| 5,812,666 A | 9/1998 | Baker et al. | |
| 5,825,884 A | 10/1998 | Zdepski et al. | |
| 5,848,161 A | 12/1998 | Luneau et al. | |
| 5,862,327 A | 1/1999 | Kwang et al. | |
| 5,870,475 A | 2/1999 | Allan et al. | |
| 5,878,142 A | 3/1999 | Caputo et al. | |
| 5,883,810 A | 3/1999 | Franklin et al. | |
| 5,887,131 A | 3/1999 | Angelo | |
| 5,903,882 A * | 5/1999 | Asay et al. | 705/44 |
| 5,910,988 A | 6/1999 | Ballard | |
| 5,910,989 A | 6/1999 | Naccache | |
| 5,943,423 A | 8/1999 | Muftic | |
| 5,949,881 A | 9/1999 | Davis | |
| 5,956,404 A | 9/1999 | Schneier et al. | |
| 5,963,648 A | 10/1999 | Rosen | |
| 5,970,147 A | 10/1999 | Davis | |
| 6,000,522 A | 12/1999 | Johnson | |
| 6,000,832 A | 12/1999 | Franklin et al. | |
| 6,009,177 A | 12/1999 | Sudia | |
| 6,021,202 A | 2/2000 | Anderson et al. | |
| 6,023,509 A | 2/2000 | Herbert et al. | |
| 6,029,150 A | 2/2000 | Kravitz | |
| 6,044,154 A | 3/2000 | Kelly | |
| 6,047,051 A | 4/2000 | Ginzboorg et al. | |
| 6,061,794 A | 5/2000 | Angelo et al. | |
| 6,061,799 A | 5/2000 | Eldridge et al. | |
| 6,070,154 A | 5/2000 | Tavor et al. | |
| 6,073,242 A * | 6/2000 | Hardy et al. | 726/1 |
| 6,084,969 A | 7/2000 | Wright et al. | |
| 6,092,202 A | 7/2000 | Veil et al. | |
| 6,102,287 A | 8/2000 | Matyas, Jr. | |
| 6,104,815 A | 8/2000 | Alcorn et al. | |
| 6,105,012 A | 8/2000 | Chang et al. | |
| 6,108,644 A | 8/2000 | Goldschlag et al. | |
| 6,111,956 A | 8/2000 | Field et al. | |
| 6,125,349 A * | 9/2000 | Maher | 705/1 |
| 6,134,325 A | 10/2000 | Vanstone et al. | |
| 6,144,949 A | 11/2000 | Harris | |
| 6,154,543 A | 11/2000 | Baltzley | |
| 6,161,180 A | 12/2000 | Matyas et al. | |
| 6,161,181 A | 12/2000 | Haynes et al. | |
| 6,167,518 A | 12/2000 | Padgett et al. | |
| 6,189,096 B1 | 2/2001 | Haverty | |
| 6,192,130 B1 | 2/2001 | Otway | |
| 6,192,405 B1 | 2/2001 | Bunnell | |
| 6,199,052 B1 | 3/2001 | Mitty et al. | |
| 6,202,151 B1 | 3/2001 | Musgrave et al. | |
| 6,205,437 B1 | 3/2001 | Gifford | |
| 6,213,391 B1 | 4/2001 | Lewis | |
| 6,230,269 B1 | 5/2001 | Spies et al. | |
| 6,233,565 B1 | 5/2001 | Lewis et al. | |
| 6,240,091 B1 | 5/2001 | Ginzboorg et al. | |
| 6,243,812 B1 | 6/2001 | Matyas et al. | |
| 6,253,027 B1 | 6/2001 | Weber et al. | |
| 6,253,322 B1 * | 6/2001 | Susaki et al. | 713/170 |
| 6,263,447 B1 | 7/2001 | French et al. | |
| 6,279,112 B1 | 8/2001 | OToole, Jr. et al. | |
| 6,282,522 B1 | 8/2001 | Davis et al. | |
| 6,285,991 B1 | 9/2001 | Powar | |
| 6,292,897 B1 * | 9/2001 | Gennaro et al. | 713/175 |
| 6,299,062 B1 | 10/2001 | Hwang | |
| 6,314,519 B1 | 11/2001 | Davis et al. | |
| 6,324,525 B1 | 11/2001 | Kramer et al. | |
| 6,373,950 B1 | 4/2002 | Rowney | |
| 6,510,516 B1 | 1/2003 | Benson et al. | |
| 6,523,067 B2 | 2/2003 | Mi et al. | |
| 6,532,451 B1 | 3/2003 | Schell et al. | |
| 6,565,000 B2 | 5/2003 | Sehr | |
| 6,567,913 B1 * | 5/2003 | Ryan, Jr. | 713/156 |
| 6,571,339 B1 | 5/2003 | Danneels et al. | |
| 6,587,837 B1 | 7/2003 | Spagna et al. | |
| 6,594,633 B1 * | 7/2003 | Broerman | 705/1 |
| 6,671,805 B1 * | 12/2003 | Brown et al. | 713/176 |
| 2001/0000535 A1 | 4/2001 | Lapsley et al. | |
| 2002/0120846 A1 | 8/2002 | Stewart et al. | |

OTHER PUBLICATIONS

Digital Signature Guidelines Tutorial ; ABA Network, (web site at http://www.abanet.org/scietech/ec/isc/dsg-tutorial.html), date of capture Feb. 18, 2003, pp. 1-7, Feb. 18, 2003.

Gerck, Ed, Overview of Certification Systems: x.509, PKIX, CA, PGP & SKIP—Do you understand digital certificates? Do you know what they warrant? pp. 1-18, Jul. 18, 2000.

Linn, John, Trust Models and Management in Public-Key Infrastructures; RSA Laboratories, pp. 1-13, Nov. 6, 2000.

PKCS #5, v2.0: Password-Based Cryptography Standard, RSA Laboratories, Redwood City, CA: pp. 1-30, Mar. 25, 1999.
PKCS #9, v2.0: Selected Object Classes and Attribute Types, RSA Laboratories, Redwood City, CA; pp. 1-34, Feb. 25, 2000.
PKCS #10, v1.7: Certificate Request Syntax Standard, RSA Laboratories, Redwood City, CA; pp. 1-10, May 26, 2000.
PKCS #12, V1.0: Personal Information Exchange Syntax, RSA Laboratories, Redwood City, CA; pp. 1-23, Jun. 24, 1999.
PKCS #15: Conformance Profile Specification; RSA Laboratories, Redwood City, CA; pp. 1-8, Aug. 1, 2000.
Pepe, M., Smart Cards Gaining Traction; CRN.com—Point of Sale: Trends, Markets and Technologies; Dec. 31, 2002 (http://crn.channelsupersearch.com/news/crn/39163.asp) Feb. 18, 2003.
Guide to Internet Security; Public Key Cryptography (web site at http://www.e-certify.com/library/pkc_guide.htm) captured on Feb. 18, 2003.
Private Server Product Description; (web site at http://www.bnn.com.tr/assets/cserver_prodesc.html), date of capture Feb. 18, 2003; pp. 1-11.
Cylink atm encryptor (web site at http//securitytools.hypermart.net/security_1/cylink_atm_encryptor.html), date of capture Feb. 18, 2003, p. 1.
BAL's PGP Public Key Server; The Computer Law Resource 1996; (web site at http://www.complaw.com/pgp/webkeyserver.html) date of capture Feb. 18, 2003; pp. 1-2.
Baltimore; Solutions; A New Era in Secure and Trusted E-Business; (web site at http://www.baltimore.com/solutions/index.asp) date of capture Feb. 18, 2003; p. 1.
(PGP) Pretty Good Privacy; What's? com; Dec. 27, 2000; (web site at http://whatis.techtarget.com/WhatIs_Definition_Page/0,4152,214292,00.html) date of capture Dec. 27, 2000; pp. 1-3.
An Introduction to Cryptography; Network Associates, Inc. PGP, Version 6.5.1; Jun. 1999; pp. 1-88.
Turnbill, J., "Cross-Certification and PKI Policy Networking"; Entrust, Inc; pp. 1-10, Aug. 2000.
Some Suggestions For Automatic Encryption and Identity Verification in the IBM Internal Computing Network; pp. 1-13, Dec. 28, 1985.
Arthur, D., AADS Option for Buyer Authentication; Response to NACHA/IC ANT 2 RFI; pp. 1-3, Sep. 14, 1998.
Internet Counsel; Consumer Internet Purchases Using ATM Cards Successfully Processed by NACHA Pilot Participants; pp. 1-4, Feb. 23, 2003.
Internet Counsel; NACHA to Test ATM Card Payments for Consumer Internet Purchases; pp. 1-3, Feb. 23, 2003.
News Release: Digital Signatures Can Secure ATM Card Payments on the Internet, NACHA Pilot Concludes; pp. 1-2, Jul. 23, 2001.
Kutler, Jeffrey, Privacy Broker: Likely Internet Role for Banks? Digital Frontiers; pp. 1-6, Oct. 8, 1998.
Hettinga's Best of the Month, Journal of Internet Banking and Commerce; Array Development, web site at http://www.arraydev.com/commerce/JIBC/9801-20.html, pp. 1-4, Mar. 31, 1999.
Denny, Stephanie, The Electronic Commerce Challenge, Journal of Internet Banking and Commerce; Array Dev., http://www.arraydev.com/commerce/JIBC/9811-06.htm, pp. 1-2, Mar. 31, 1999.
Kaliski, Burton S., Jr., Some Examples of the PKCS Standards, An RSA Laboratories Technical Note, RSA Laboratories, Redwood City, CA., pp. 1-15, Nov. 1, 1993.
Kaliski, Burton S., Jr., A Layman's Guide to a Subset of ASN.1, BER, and DER, An RSA Laboratories Technical Note, RSA Laboratories, Redwood City, CA., pp. 1-36, Nov. 1, 1993.
PKCS Editor, PKCS #1 v2.1: RSA Cryptography Standard, RSA Laboratories, Draft 2, RSA Laboratories, Bedford, MA, pp. 1-60, Jan. 5, 2001.
PKCS #3: Diffie-Hellman Key-Agreement Standard, An RSA Laboratories Technical Note, Version 1.4, RSA Laboratories, Redwood City, CA. pp 1-8, Nov. 1, 1993.
PKCS #6: Extended-Certificate Syntax Standard, An RSA Laboratories Technical Note, Version 1.5, RSA Laboratories, Redwood City, CA. pp. 1-11, Nov. 1, 1993.
PKCS #8: Private-Key Information Syntax Standard, An RSA Laboratories Technical Note, Version 1.2, RSA Laboratories, Redwood City, CA. pp. 1-5, Nov. 1, 1993.

Wiener, M., Performance Comparison of Public-Key Cryptosystems, Technical Newsletter of RSA Laboratories, a div of RSA Data Security, Inc., Summer 1998, vol. 4, No. 1, pp. 1-23.
Apostolopoulos, G., Securing Electronic Commerce: Reducing the SSL Overhead, IEEE Network, Jul./Aug. 2000, vol. 14, Issue 4, pp. 1-16.
Maurer, Modeling a Public-Key Infrastructure, Sep. 1996, Dept. of Computer Science, Swiss Federal Institute of Technology, pp. 1-26.
Security Requirements for Cryptographic Modules, FIPStandards Pub. 140-1, pp. 1-45, CSL Bulletin for FIPS 140-1 pp. 1-6, 2001-2000.
Heroux, M., A Private Key Storage Server for DCE—Functional Specification, Open Software Foundation Request for Comments; 94.1, (http://www.opengroup.org/rfc/mirror) Nov. 1996.
Cox, P., Bench-Marking SmartGate, Establishing the Scaleability of V-ONE's SmartGate Security System, Internet SmartWare Ltd., pp. 1-7, Jul. 24, 1997.
Answers to Frequently Asked Questions about Today's Cryptography, RSA Data Security, Inc., Revision 2.0, pp. 1-44, Oct. 5, 1993.
Announcing the Standard for Digital Signature Standard (DSS), Federal Information Processing Standards Publication 186, pp. 1-18, May 19, 1994.
Boeyen, Sharon, Certificate Policies and Certification Practice Statements, Entrust Technologies White Paper, Version 1.0, pp. 1-7, Feb. 1997.
Public-Key Infrastructure (PKI)—The VeriSign Difference, Copyright 1999, VeriSign, Inc. pp. 1-21, Feb. 3, 2001.
Moreau, Thierry, Thirteen Reasons to Say 'No' To Public Key Cryptography, Draft paper, CONNOTECH Experts-Conseils, Inc., Montreal, Quebec, Canada, pp. 1-5, Mar. 4, 1998.
"X9 Overview," American Bankers Association web page (web site at http://www.x9.org/aboutX9.htm), 1998, date of capture Jan. 11, 1999, 3 pp.
Jul. 1997 Meeting Report, Electronic Payments Forum (web site at http://www.epf.net/PrevMtngs/July97Report.htm), date of capture Jan. 11, 1999, 2 pp.
Kaliski, Burton S., Jr. An Overview of the PKCS Standards, RSA Laboratories Technical Note, RSA Data Security, Inc. Public-Key Cryptography Standards (PKCS), pp. 1-27, Nov. 1, 1993.
Public Key Cryptography, NIST Special Publication 800-2, reprinted at http://csrc.nist.gov/publications/nistpubs/800-2/800-2.txt), pp. 1-138, Apr. 1991.
Guideline for Implementing Cryptography in the Federal Government, NIST Special Publication 800-21, pp. 1-138, Nov. 1999.
Guideline for the Use of Advanced Authentication Technology Alternatives, FIPS Pub. 190, reprinted at http://csrc.nist.gov/publications/fips/fips190/fip190.txt), pp. 1-55.
Building a Foundation of Trust in the PC, The Trusted Computing Company Platform Alliance (web site at http://www.trustedpc.org), pp. 1-9, Jan. 2000.
Trusted Platform Module (TPM) Security Policy (A Part of the "TCPA Security Policy"), Version 0.45, pp. 1-13, Oct. 2, 2000.
Trusted Platform Module Protection Profile (TPMPP) (A Part of the "TCPA Security Policy"), Version 0.45, pp. 1-151, Sep. 14, 2000.
TCPA PC Specific Implementation Specification, Version 0.95, pp. 1-70, Jul. 4, 2001.
Common Criteria for Information Technology Security Evaluation, Smart Card Security User Group, Smart Card Protection Profile, draft Version 2.1d, pp. 1-194, Mar. 21, 2001.
X.9.84-2000, Biometric Information Management Security for the Financial Services Industry, draft version, pp. 1-141, Mar. 21, 2001.
Security Requirements for Cryptographic Modules, FIPS Publication 140-2, pp. 1-62, May 25, 2001.
Secure Hash Standard, FIPS Publication 180-1, pp. 1-24, Apr. 17, 1995.
Digital Signature Standard (DSS), FIPS Publication 186-2, pp. 1-72, Jan. 27, 2000.
Entity Authentication Using Public Key Cryptography, FIPS Publication 196, pp. 1-52, Feb. 18, 1997.
Computer Data Authentication, FIPS Publication 113, (web site at www.itl.nist.gov/fipspubs/fip113.htm), date of capture Jan. 16, 2001, pp. 1-7, May 30, 1985.

Sales Brochure for APPROVEIT, electronic approval management software, by Silanis Technology, Inc., pp. 1-12, Jul. 18, 2000.

Public Key Infrastructure, An NSS Group White Paper, by Bob Walder, undated, reprinted http://www.nss.co.uk/WhitePapers/PublicKeyInfrastructure.htm on Jan 25, 2001, pp. 1-18.

Smart Card & Security Basics, Cardlogix, Inc. brochure, Ref. Date Q1-Q2 2000, pp. 3-36.

Understanding Public Key Infrastructure (PKI), Technology White Paper, by RSA Security, Inc., 1999, pp. 1-10.

Chan, S.C., An Overview of Smart Card Security, reprinted from website http://home.hkstar.com/~alanchan/papers/smarCardSecurity, captured on Jan. 27, 2001, pp. 1-7, Aug. 17, 1997.

Taschler, S., Technical Introduction to CIP 3.0, reprinted from website http://www.datakey.com/cardpage/cip.htm, captured on Jan. 25, 2001, pp. 1-6, Sep. 30, 1997.

Smart Cards: Enabling Smart Commerce in the Digital Age, CREC/KPMG White Paper (Draft), pp. 1-22, May 1998.

List Serve Posting dated Dec. 29, 1999 regarding Attacks on PKI, Dec. 29, 1999.

List Serve Posting dated Dec. 30, 1999 regarding Attacks on PKI, Dec. 30, 1999.

List Serve Posting dated Feb. 7, 2000 regarding Questions about PKI, Feb. 7, 2000.

List Serve Posting dated Feb. 14, 2000 regarding RealNames Hacked—Firewall Issues, Feb. 14, 2000.

List Serve Posting dated Dec. 3, 1998 regarding EU Digital Signature Initiative Stalled, Dec. 3, 1998.

List Serve Posting dated Dec. 12, 1999 regarding QC Bio-Info Leak?, Dec. 12, 1999.

List Serve Posting dated Apr. 2, 2000 regarding Biometrics and Electronic Signatures, Apr. 2, 2000.

List Serve Posting dated Dec. 11, 1998 regarding AADS Strawman, Dec. 11, 1998.

List Serve Posting dated May 24, 1999 regarding [ECARM] Cardtech / Securetech & CA PKI, May 24, 1999.

List Serve Posting dated May 25, 1999 regarding [ECARM] Cardtech / Securetech & CA PKI, May 25, 1999.

List Serve Posting dated May 30, 1999 regarding [ECARM] Cardtech / Securetech & CA PKI, May 30, 1999.

List Serve Posting dated Jul. 16, 1999 regarding Common Misconceptions, was Re: KISS for PKIX, Jul. 16, 1999.

List Serve Posting dated Aug. 15, 1999 regarding Risk Management in AA / draft X9.59, Aug. 15, 1999.

"X9-59 Working Draft" ABA; American National Standard X9.59-199X, For the Financial Services Industry: Account-Based Secure Payment Objects, pp. 1-26, Sep. 25, 1998.

Account Authority Digital Signature Model web page (http:www.garlic.com/~lynn/aadsover.htm) believed available at website after Nov. 8, 1997, date of capture Oct. 2, 2001, 5 pp.

"How PGP Works," web pages from www.pgpi.org, containing basic information.

PGP Certificate Server, Total Network Security, Network Associates, 3965 Freedom Circle, Santa Clara, CA 95044-1203.

"PGP Desktop Security 7.0," PGP Security, 3965 Freedom Circle, Santa Clara, CA 95054-1203.

"Policy Management Agent for SMTP," Network Associates, 3965 Freedom Circle, Santa Clara, CA 95054-1203.

"Inside PGP Key Reconstruction: Technical Details," Revision by Will Price, dated Jul. 25, 2000, A PGP Security, Inc. White Paper.

Stewart, D., "Account Authority Digital Signatures: Enabling Secure Internet Transactions via Existing Payment Processes & Infrastructure," www.garlic.com/~lynn/aadswp.htm.

O'Mahoney, "Electronic Payment Systems," Artech House, Inc., pp. 51 and 77-80 (1961).

\* cited by examiner

FIG. 7

| | | |
|---|---|---|
| ID | = | Identifier, Such as Entity Name, or Preferably, a Number Generated by AA Upon Registration Therewith by an Entity |
| Message | = | Information Being Communicated, Such as an Offer or Acceptance |
| M | = | Message + ID |
| EC | = | Electronic Communication |
| Hash | = | Hash Algorithm, such as SHA-1 |
| PrK | = | Private Key of an Asymmetric Key Pair |
| PuK | = | Public Key of the Asymmetric Key Pair |
| DS(M) | = | Digital Signature of M |

<u>Typical Structural Arrangement of an Offer Message Sent as an EC</u>

| | | |
|---|---|---|
| EC(M) | = | M + PrK(Hash(M)), where M = Offer Message + ID, and PrK(Hash(M)) = DS(M) |

LEGEND

7000

METHOD AND SYSTEM FOR USING ELECTRONIC COMMUNICATIONS FOR AN ELECTRONIC CONTRACT

I. CROSS-REFERENCE TO RELATED APPLICATIONS

This patent application claims priority in the United States under 35 U.S.C. 119(e), and under the Paris Convention worldwide, to the benefit of the filing date of Wheeler et al. U.S. provisional patent application Ser. No. 60/223,076, which was filed on Aug. 4, 2000, and which is incorporated herein by reference. This application also incorporates herein by reference each of four international patent applications and three U.S. patent application to Anne and Lynn Wheeler filed concurrently herewith in the U.S. Patent & Trademark Office and bearing serial number PCT/US01/41587 (titled "Person-Centric Account-Based Digital Signature System") and Ser. No. 09/923,179 (titled "Account-Based Digital Signature (ABDS) System") (hereinafter such pair of applications being referred to as the "ABDS Applications"); serial number PCT/US01/41562 (titled "Entity Authentication in Electronic Communications by Providing Verification Status of Device") and Ser. No. 09/923,075 (titled "Modifying Message Data and Generating Random Number Digital Signature Within Computer Chip") (hereinafter such pair of applications being referred to as the "VS Applications"); serial number PCT/US01/24572 (titled "Linking Public Key of Device to Information During Manufacture") and Ser. No. 09/923,213 (titled "Manufacturing Unique Devices That Generate Digital Signatures") (hereinafter such pair of applications being referred to as the "PRiMR Applications"); and serial number PCT/US01/24563 titled "Trusted Authentication Digital Signature (TADS) System") (hereinafter referred to as the "TADS Application").

II. FIELD OF THE PRESENT INVENTION

The invention relates to systems and methods in which an electronic communication comprising terms of a contract is digitally signed. More particularly, account information is linked to a sending individual or entity by using a verification status indicator and a security profile, which correspond to a sending device and which are used to facilitate the recipient in determining that the sender intended to be bound by the contract terms.

III. BACKGROUND OF THE PRESENT INVENTION

In the modern commercial environment, efficiency and timeliness are paramount in ensuring the success of many businesses. Furthermore, transactions may occur across great distances. For example, two parties to a contract may not actually be physically present at the same time and place as the terms are being negotiated or even when the contract is actually executed. Traditional means for negotiating and executing contracts include communicating over the telephone, communicating in writings sent between the parties using the mail or a facsimile machine, or even through third party negotiators such as attorneys or agents. Although technology has facilitated such activities, i.e. the facsimile machine increasing the speed at which contracts are formed versus sending writings through the mail, the recent explosion of the Internet and e-mail has resulted in the potential for even greater speed and efficiency in contract formation.

However, the Internet and e-mail are merely forms of communication. The basic elements of a contract, offer, acceptance and consideration, must still exist. Furthermore, Article 2 of the Uniform Commercial Code (UCC) still applies to the sale of goods. Moreover, the Electronic Signatures in Global and National Commerce Act ("E-SIGN") and the Uniform Electronic Transactions Act (1999) ("UETA") are recent examples of legislation that are aimed at standardizing laws regarding facilitating electronic contracts ("e-contracts").

According to memo M-00-15 "Memorandum for the Heads of Departments and Agencies", by the Office of Management and Budget Director "E-SIGN eliminates legal barriers to the use of electronic technology to form and sign contracts, collect and store documents, and send and receive notices and disclosures." In addition, as discussed in comments to UETA, the main point of a signature is to apply a sound, symbol or process with an intent to do a legally significant act. Thus, UETA attempts to establish that an electronic signature and a manual signature are equivalent. Furthermore, an electronic signature should be connected to the record or document being signed.

Accordingly, in contracting over the Internet, for example, the issue of how to connect an electronic, or digital, signature with a document being signed, and thus, the issue of how to determine that a valid contract has been formed, is raised. Traditional contract law relating to the sale of goods requires a writing signed by the party to be bound to prove all contracts in excess of a certain dollar amount, usually $500. Oral contracts for more than $500 are generally not enforceable under the UCC Statute of Frauds, a version of which practically each state has enacted into law in some form or another, unless a party to be bound admits the existence of the contract.

As discussed above, UCC, UETA and E-SIGN provide ways around the physical signature requirement. Thus, with respect to electronic commerce ("e-commerce"), there are various ways to evidence intent to be bound. UCC section 1-201 provides that "signed" includes any symbol executed or adopted by a party with present intention to authenticate a writing, and "written" or "writing" includes printing, typewriting or any other manner of intentional reduction to a tangible form. Thus, since a digital signature, for example, is represented as electronic data, it can symbolize intent in connection with an electronic document to be bound by the terms contained therein.

Accordingly, the competitive nature of the marketplace has propelled many technological advances in the arena of e-commerce. An electronic communication ("EC") is considered to be a communication in electronic form. ECs have become an integral part of transacting business today, especially with the growth of the Internet and e-commerce. Over recent years, digital signatures also have become an important part of e-commerce, with a digital signature being used both to identify a sender of an EC as well as to "authenticate" a message contained within the EC. Thus, the integration of digital signatures and ECs into modern commerce to facilitate e-contracts is a natural result of technological evolution.

However, computing systems developed for using digital signatures are typically designed to perform message and sender authentication. These systems can apply digital signatures without an overt act by the message originator. Thus, these systems lack the sense of originator intention, as they only support originator authentication.

The origination of a digital signature essentially comprises the encryption of a message ("M") sent in an EC. In addition, the message may include a hash value of the message that is conveyed in the EC, wherein the hash algorithm used to generate the hash is, for example, SHA-1, or other similar algorithm known in the art. The message, which may or may not include a hash value, is encrypted by an electronic device using a private key ("PrK") of a key pair used in public-private key cryptography (also known as asymmetric cryptography). The resulting ciphertext, which may be referred to as a message digest, constitutes the digital signature ("DS"), which typically is appended to the message to form the EC that is sent from a sender to a recipient. In generating the hash value, either the device applies a hashing algorithm—such as the SHA-1 algorithm—to the subject matter of the message to be sent, or the hashing algorithm is applied to the message external to the device and the resulting hash value then is communicated to the device for encrypting. Furthermore, while the encryption is performed by the device, the user of the device (i.e., the sender of the EC) is considered the "signer" of the digital signature. The sender may be a computing system that automatically responds with a digital signature to a query requesting the identity of the sender. This may be analogized to an airplane transponder responding to an air traffic control request for identification.

The recipient of the EC may know or be able to obtain both the hashing algorithm applied to the message as well as the public key ("PuK") corresponding to the private key used to generate the digital signature. With this knowledge, the recipient applies the appropriate hashing algorithm to the message to generate a hash value and then decrypt the digital signature. If the hash value generated by the recipient equals the hash value of the decrypted digital signature, then the recipient is able to determine that the sender who signed the message actually possessed the private key corresponding to the public key held by the recipient. Accordingly, the recipient "authenticates" the sender. Additionally, the recipient is able to determine that the content of the message contained in the EC was not altered or modified because any change to the message would change the bash value. Accordingly, the recipient "authenticates" the message.

A digital certificate (also known as a "digital ID") is a voucher by a third party (commonly referred to as a "Certificate Authority") attesting to the identity of an owner of a public key. Essentially, digital certificates are the electronic counterparts to driver licenses, passports, membership cards, and other paper-based forms of identification. The digital certificate itself comprises an electronic message including a public key and the identity of the owner of the public key. A digital certificate also typically contains an expiration date for the public key, the name of the Certificate Authority, a serial number of the digital certificate, and a digital signature of the Certificate Authority. The most widely accepted format for digital certificates is defined by the CCITT X.509 international standard; thus, certificates can be read or written by any application complying with X.509. Based on a digital certificate included in an EC, a recipient is able to authenticate the digital certificate using a public key of the Certificate Authority and thereby confirm the identity of the owner set forth therein.

The system wherein a digital certificate is included in an EC comprises a "public key infrastructure" (PKI) commonly referred to as the "Certificate Authority Digital Signature" (CADS) system. Unfortunately, while the CADS system enables two parties who otherwise may not have a preexisting relationship with one another to communicate with each other with the confidence of knowing the other's identity, the CADS system has drawbacks. For example, a digital certificate typically is issued with an expiration date, and an expired digital certificate generally is not recognized in the industry. Furthermore, if a private key is lost or stolen, then the owner of the private key must notify the Certificate Authority to revoke the owner's digital certificate; however, a recipient of an EC with a digital certificate will only know of the revocation of the digital certificate if the recipient cross-references the serial number of the digital certificate against a certificate revocation list (CRL) published by the Certificate Authority. Another drawback to the CADS system is that the digital certificate itself is only as good as the particular authority that issues it, and it often may be necessary to obtain multiple digital certificates (i.e., from Certificate Authorities 306a, 306b to 306n as shown in FIG. 1 of the incorporated ABDS Applications) in order to create a sufficient "chain" or "network" of trust between the sender and recipient for a transaction or communication to be accepted and acted upon. Additionally, the entire CADS system rests upon the secrecy of the private key of the Certificate Authority issuing a digital certificate, which, if compromised, collapses the CADS system.

In the context of an EC regarding an account, such as the example of an online purchase order, another drawback of the CADS system is that the account information must be encrypted or otherwise protected if sent over an insecure communications medium, such as the Internet. In the example above, a hacker eavesdropping on the communication of the account information would possess sufficient information to make fraudulent charges to the account of the purchaser, especially as not all merchants require a digital signature and digital certificate to fill a purchase order. Moreover, financial institutions have yet to standardize a requirement that a digital certificate of a purchaser be submitted as a condition precedent to approving a payment request by a merchant. Instead, in determining whether a purchaser actually has the authority to effect payment to a merchant, a financial institution relies upon the personal account information provided by the merchant, and whether the account information has been reported lost or stolen.

Accordingly, a need exists for an improved system of communicating ECs that contain contract related documents using digital signatures and for authenticating the identity of a contracting party and that party's associated account information without the inherent inefficiencies, limitations and potential pitfalls of a CADS.

A need also exists for such a system that can link account information to an individual without the need for secret identification information, i.e. PIN or mother's maiden name, to be sent as part of the EC, thereby preventing hacking of such secret information.

Furthermore, although the identity of a party sending an electronic communication may be successfully verified as being the identity of a party with which another party has a pre-existing relationship, many employees of a merchant, for example, may have access to the merchant's private key. This creates the scenario where a low-level employee that knows the employer's private key may be able to bind the employer to a large transaction, even though the employee is not authorized to bind the company except for transaction of relatively small dollar amount. Thus, the low-level employee may have apparent authority to bind the employer vis-a-vis another party, but may not have actual authority to do so.

Moreover, even if the sender has the authority to bind the employer, the sender may be an employee who contracts with multiple parties at various times during the workday. If, for example, the employee is involved with entering into contracts with multiple parties during a certain time period during the workday, the employee, using a PC, may inadvertently assent to a contract without reviewing the terms of the contract. This would occur, for instance, if the employee was actively engaged in negotiating terms of a contract with another party where each is replying to the other with counteroffers. Then, due to not paying careful attention to the documents that are active on the employee's computer, an inadvertent keyboard stroke causes an offer or an acceptance to be sent in response to a message arriving from a totally different party. This is because a distinction exists between a computer system that is designed to authenticate an entity without the need for an overt action by the entity, and a computer system designed to demonstrate a person's or an entity's intent in connection with a particular document. Accordingly, a need exists for enabling a recipient of an electronic communication that comprises a contract document to determine whether the sender has the authority to be bound, and furthermore, whether the sender intends to be bound to the terms of the document.

Finally, a need exists to enable the recipient of an electronic communication containing a contract document to determine the level to which secret information that may have been used to digitally sign the EC is physically protected, such that the likelihood of a hacker obtaining the secret information and posing as a person or entity legitimately associated with the secret information is low or nonexistent.

IV. SUMMARY OF THE INVENTION

The invention relates to a method and system for using electronic messages for securely forming and executing a contract. This application incorporates by reference the ABDS Applications which discloses in detail various methods, systems and devices for sending ECs using an account authority ("AA") to maintain and forward to a recipient account information associated with the sender of the EC. The AA verifies and authenticates that a requestor is who they say they are and that they are authorized to access information associated with another. Upon verification and authentication of the request, the AA may release the requested information to the requestor.

To facilitate party-to-party e-contracting, each party to the e-contract may act as the AA for the other. A third party AA may also be used to facilitate the providing of information to contracting parties. Various features and technologies described in the incorporated VS, ABDS and PRiMR Applications are used to implement various aspects of the traditional contracting process, thereby enabling e-contracting. The incorporated VS Applications disclose in detail a device, method and system for making and using a device that contains a private key to create a DS among other things. The device is personal to an individual such that, based on the security level with which the device was manufactured, another cannot use the device's private key to fraudulently pose as the first individual, and therefore bind the first individual to a contract to which he did not intend to be bound. In addition, the device may be manufactured in a secure environment with a private key retained in the device, and a public key, complementary to the private key, retained in a database in the secure environment such that the public key is linked to security characteristics of the device. This scenario is disclosed in the incorporated PRiMR Applications.

For the technologies disclosed in the aforementioned ABDS, PRiMR and VS Applications to facilitate e-contracting between parties, the parties will typically have formed a relationship that contemplates future contracting between them, although a scenario in which the parties have not already formed a relationship is also supported. Party A provides certain data to party B, and party B provides certain data to party A before the contracting process begins. Or, the parties provide certain data to a third party AA. Thus, when party B receives an EC from party A, the AA function is either performed at party B's device, such as a personal computer ("PC") or a personal digital assistant ("PDA") that receives the EC, or by sending a request to a third party AA.

This preliminary "setup" data will typically include the other party's PuK and a preferred hash routine, such as SHA-1. This data may also include such information as cash on hand, accounts payable, accounts receivable, payment history with respect to timeliness of payment, manufacturing capacity, quantity of goods in stock, performance history with respect to timeliness of shipment of goods or performance of services and any other information relevant to making a business decision of whether to make an offer or to accept an offer. In addition, the information may include parameters that are relevant to a party's business, such as type of raw materials used to manufacture goods and description of the goods themselves and/or service that the party provides, among other things. This type of information helps facilitate a keyword search that may be used by a potential offeror that is looking for a merchant that deals in a particular type of product.

For example, if party A is the offeror and party B is the offeree, A would send a proposal to B in the form of an EC. The EC would be sent by A from A's device, such as the types of devices disclosed in the incorporated VS Applications. Thus, A's computer device would encode the proposed contract into an EC using A's PrK and possibly a hash routine, and send it from A's PC to B's PC. When B receives the contract offer encoded into the EC as a message, B's PC retrieves the identification information, such as A's name or account number, and searches a database, indexed by name or account number, that resides on B's PC. From this search, B retrieves A's associated PuK and authenticates the digital signature of the EC. Successful authentication of the digital signature provides confidence that the EC was sent by A.

If B wishes to determine that the message received was the identical message that was sent by A, B may use the identification information to retrieve a hash routine associated with the identification information. Then, the message is hashed by the hash routine. Since one of the components of the authenticated EC may be a hash value of the message, the message being a component of the EC separate from the hash value of the message, B then compares the value of the message as hashed by B to the verified hash value. If the two match, B is assured that the message was not altered after being sent by A. This may be important if B needs to prove the terms of the contract to which A intended to be bound.

Heretofore, the focus has been on authenticating the sender of the message as opposed to keeping the contents of the message from a hacker. Thus, the message itself may not be encrypted, as the naked, unencrypted message may be a component of the EC, the encrypted and optionally hashed message being another component of the EC. However, to prevent an eavesdropper to the transmission of the EC from determining the contents of the message, the message could be encrypted as well.

If it is desirable to encrypt the message to prevent unwanted access to the contract and the contents thereof, the message may be encrypted as well as the hashed message. This is similar to the operation of the encryption method known in the art as Pretty Good Privacy ("PGP"), which uses an asymmetric key pair. However, there is a distinction between the way the keys are used vis-à-vis the way they are used in traditional PGP. In traditional PGP, the sender of a message encrypts the message with the recipient's public key. The recipient decrypts with their private key. Thus, the recipient (or anyone who has access to the recipient's private key) is the only person that can decrypt and access the information contained in the message.

With respect to the invention, a sender encrypts the message with their own private key to generate a digital signature, and then the recipient authenticates the sender by decrypting the digital signature using the sender's public key. Thus, both parts of the asymmetric key pair are used essentially as private keys because each party stores the other's public key that was received from a previous swapping of keys either at the party's local PC or at a secure AA. The sender gives the recipient the sender's public key and relies on the receiver, or the AA, keeping it private from others. So, the sender's public key is in essence a semi-private key, because the universe of those who know it is limited. Thus, the public key may be used by the parties to a contract to provide reasonable security to the contents of an electronic message. If a particular party insists upon complete assurance as to the confidentiality of the message, PGP can be used to encode the message with the recipient's public key of another asymmetric key pair.

A. First Aspect—Each Party Acts as Account Authority to the other

In addition to providing a means for authenticating the sender and the contents of the EC, the AA function may provide information that may be pertinent to whether a party wishes to contract with another party. Account information may be provided that allows the initiator of an EC to determine whether the other party is capable of performing the other party's obligation under the contract terms, and thus, whether it is desirable to enter into a contract with the other party.

B. Second Aspect—Business Rules Used to Determine whether to (Automatically) Agree Often, the same parties will enter into contracts having the same or similar terms as that of a previous transaction. Furthermore, the similar transactions may have been between exactly the same parties, or between parties from a finite set or group of parties. Thus, deciding whether to make an offer or an acceptance may be based on historical data from previous transactions between the same parties, historical data shared among the group of parties, or, most importantly, based on predetermined business rules. Business rules typically establish thresholds and limits with respect to certain parameters, such as cost, quantity, delivery or production requirements. Traditionally, for example, a business manager may have autonomy to approve purchases up to a certain dollar amount, but may be required to get approval from a higher-ranking manager for purchases above the certain dollar amount. Such a scenario may be more likely to arise when the types of goods bought and sold are consumables, such as office supplies, or other low cost items. Accordingly, the second aspect of the invention relates to a scenario where a given party may incorporate business rules into a computer algorithm to automatically accept an offer, thereby eliminating the need to have human personnel take part in negotiating the terms of a contract.

C. Third Aspect—Third Party AA "Vouches for" other Parties' Account Information The above aspects of the invention relate to scenarios where contracting parties have a preexisting relationship. However, although the account information may be exchanged at the initial setup stage to facilitate party-to-party contracting, the third party AA model may be preferable in certain scenarios. For example, a third party AA may be preferable when the account information includes subjective data such as quality of product. This is due to the statistical economies of scale that result from many data from many sources. Since a third party AA may typically have many users that can provide objective as well as subjective information, the statistical probability that the data is accurate and valid is increased.

In addition, more sources of information about other parties is beneficial as opposed to a single party maintaining and updating its own data with respect to a particular party, or relying on other parties to accurately provide information about themselves. This is because having various sources of account information related to the same parameter provides a check on the accuracy of said account information. Furthermore, a third party AA in the business of maintaining account information is more likely to have effective procedures for regularly gathering, updating, and maintaining confidentiality of account information, as opposed to relying on a party to which the account information pertains to provide the account information. This is especially true when the account information may reflect negatively on the party to which it pertains. Thus, account information maintained in association with an identifier and a public key by a third party AA may be more accurate and reliable than account information similarly maintained by a discrete party about another discrete party.

Accordingly, a third party AA is in a position to more accurately and reliably "vouch" for the validity of account information than a party in a party-to-party scenario where a party is responsible for gathering and updating information from other contracting parties. Furthermore, as long as adequate procedures are followed by the AA for maintaining confidentiality of the data, more merchants or entities are likely to be willing to participate in the collective relationship among other merchants or entities that results from sharing data and account information with a single AA "clearinghouse." Moreover, many small merchants may not have adequate resources to purchase, operate and maintain a secure account authority system.

D. Fourth Aspect—Verification Status Aspect

In addition to facilitating digital signature authentication of a sender of an EC and the providing of account information associated with an identifier and public key, another aspect uses an verifications status indicator, to authenticate a message, with respect to the message sender's intent to digitally sign that particular message. For instance, if the signature is received along with a message, it is possible that the sender may have used a device containing the PrK to encode other messages as well. If the device was obtained by someone besides the owner of the device, but the device was still activated to send a digital signature, the device may increment the sequentially incremented verification status indicator to show that the digital signature has been used to send other messages as well. This process is described in detail in the incorporated VS Applications. Thus, if the verification status indicator indicates that digital signatures have been generated for other EC's since the device was reset, the digital signatures alone will not provide evidence that the sender intended to be bound as strong as if the indicator indicated that no other signatures were generated since reset of the device. However, if the verification status indicator shows that the digital signature has not been generated for another message, the recipient is assured of the authentication of the sender and that the sender intended to be bound by the terms of the message.

The previous discussion has focused on the formation element of whether a contract is enforceable or not. However, for a contract to be enforceable, there must also be an absence of defenses to the enforceability of the contract. If a contract is not signed by the party to be bound, certain types of agreements are not enforceable under the Statute of Frauds. However, when the transaction relates to the sale of goods, the UCC governs and provides that the signature may be a symbol evidencing intent to be bound.

Therefore, in addition to authenticating a sender of a message, the verification status indicator of the message, as described in detail in the incorporated VS Applications, may also be used to facilitate automatic approval of a contract document in accordance with predetermined business rules. For example, if the contract is between merchants and standardized forms are used, either of the parties can pre-authorize acceptance of either an offer or of a change in terms received in an acceptance that modifies or adds to the original terms of the offer. If the quantity and/or amount of goods in a received message is below a certain threshold, the receiver of the message can pre-authorize the receiving computer to automatically accept the offer or the amended terms, by evaluating the verification status indicator that accompanies the message.

If, for example, the receiver uses business rules to accept offers to sell certain goods if the quantity offered is 5 widgets and the price of each widget is below $10, the receiver (offeree) may only require a digital signature that does not contain any secret or personal biological data verification, as described in the incorporated VS Applications. However, if the cost of each widget is greater then $100 and/or the quantity is greater than 10, the offeree may require that the verification status component of the EC comprising an offer contain a PIN authorization or a retinal scan verification, for example, before automatically accepting the offer. This provides the advantage that an agent of the offeror may bind the employer to terms that would not place significant burdens on the company. Similarly, an agent for an entity that receives an offer may pre-authorize acceptance of an offer, the terms of which are below a predetermined threshold.

However, if the quantity and or cost of the transaction is above a predetermined threshold, then the business rules associated with the sender of the EC may require additional assurance that the sender intended that the message be sent. This may be implemented through the use of a verification status marker that indicates that secret or biological verification data was used to send the EC. Moreover, the verification status aspect facilitates determining whether a digital signature was automatically signed, or whether there was some explicit and overt human action involved with the signing that can establish intent. This allows routine sales offers and purchase order agreements to transpire without involvement of upper management, thereby letting them focus their energies on less routine tasks. In addition, the verification status aspect may also facilitate evaluating, in accordance with predetermined business rules, the confidence in the secureness of the environment in which an EC is signed, with respect to the signing entity simultaneously viewing and signing the EC.

E. Fifth Aspect—PuK Linked Database without ABDS

This aspect relates to providing information about a device used to digitally sign an EC. The device is typically a device used to generate digital signatures in association with ECs as described in the incorporated PRiMR Application. The device is manufactured with an embedded private key of an asymmetric cryptographic key pair. The public key of the key pair is stored along with associated device information in a secure database record stored in a secure environment. This database record links the public key to the device information. The information, or "security characteristics", relates to, for example, the device type, the level of security under which the device was manufactured, what type of verification data it is capable of receiving and the degree to which the device protects the private key from being appropriated by someone other than the authorized owner of the device. The device information, hereinafter referred to as the devices "security profile" may also contain many other types of information that are relevant to the device and its security level. Thus, a recipient of an EC from the owner of the device may request the device information from the entity that operates the secure environment. Then, upon receipt of the information, the recipient of the EC can determine whether to trust the authentication of the digital signature of the EC based on the information received from the secure entity. This advantageously eliminates some concerns that a party or parties may have regarding e-contracting. By having information related to a device used to send a contract document, the contracting party can determine whether the device used to sign an EC has a high degree of security, and thus whether the sender of the EC is actually the sender of the message. If the security profile of a device used to digitally sign as EC is not high, or does not exist, the recipient party may make an informed decision not to trust the authentication of the sender of the EC, and thus, may decide not to form a contract with the sender of the EC.

F. Sixth Aspect—VS and PRiMR without ABDS

This aspect of the invention combines the benefits of verification status indicator aspect and a security profile aspect, as described above and in the incorporated VS and PRiMR Applications. The combination of the verification status indicator aspect and a security profile aspect allows a recipient of an EC to not only confidently authenticate the sender of an EC, but to determine with a high level of confidence that the sender intended to be bound by the terms of the document. Upon receiving an EC containing a contract document, the recipient authenticates the sender of the EC by decrypting the digital signature of the EC. However, to ensure that the device used to generate the digital signature was not used by someone else, the recipient may use the verification status indicator aspect and a security profile aspect to determine whether the sender of the EC intended to be bound by the terms thereof.

The verification status indicator indicates whether valid verification data has been entered and whether the device has been used more than one time to digitally sign an EC since the last time it was reset. Furthermore, the security profile aspect allows the recipient of the EC to determine the level of confidence in the accuracy and legitimacy of the information contained in the verification status indicator. By requesting and receiving the security profile of the device used to digitally sign an EC, the recipient of the EC can gauge the risk of believing that the proper owner of the device legitimately used the device to digitally sign the EC. Furthermore, the physical act of entering verification data (PIN or BIO) can be interpreted as an additional confidence factor in authenticating the sender, because the verification data is something the legitimate sender would know or something they are. Or, the physical act of entering verification data can be interpreted as an additional confidence factor in authenticating that the sender intended that the digital signature of the particular EC be performed. It will also be appreciated that the physical act of entering verification data can be interpreted as both an additional confidence factor in authenticating a sender and an additional confidence factor in establishing the intentional signing of the EC.

Accordingly, if the security profile indicates that the device was manufactured in a secure environment under strict manufacturing protocols such that an unauthorized individual or entity cannot invade the secure environment, and therefore obtain the private key as the device is manufactured, the recipient is ensured that the likelihood of the private key being appropriated by an unauthorized individual is remote. Furthermore, the security profile may indicate the device's resistance to tampering as specified in the device's engineering specifications. Thus, if the security profile indicates that the device is impervious to physical attempts to tamper with the device to extract the private key out of the device so that it can be used for fraudulent purposes, the recipient of the EC is further assured that the individual or entity identified in the EC is the sender of the EC. Therefore, the recipient contracting party is provided a high level of confidence that the sender identified in the EC intended to be bound by the terms of the contract contained in the EC. This confidence is higher than in a scenario where, for example, the recipient of an EC relies solely a digital signature of the EC, without having the advantages provided by a verification status indicator, a security profile of the device used to digitally sign the EC, or both.

G. Seventh Aspect—System with a Personal Device and a Secure Input Device

This aspect uses a secure input device, the device having a private key contained therein, to send messages using a senders' personal device' the personal device having another private key. This aspect is also described in the incorporated PRiMR and TADS Applications, which also refer to the secure input device as an I/O support element. The secure input device can also be capable of providing a digital signature in an EC that is sent from the secure input device. This provides strong evidence that a sender of an EC intended to sign the message contained therein, because a security profile of the secure input devices may indicate to a recipient that 1) verification information was securely entered and passed to the personal device, and that 2) terms of the message were accurately displayed. Thus, the recipient is provided assurance that the sender's private key has not been copied and fraudulently used by a hacker posing as the sender, or used in any other way without the legitimate sender's knowledge. Therefore, the recipient can authenticate the EC received from the secure input device, and thus, the sender and message contained in the EC, with a high level of confidence.

This is beneficial because it may be possible for a personal device to legitimately sign an EC without the individual or entity that is sending the EC actually seeing, or otherwise being aware of, the subject matter being signed. This can occur when a PC is used to formulate a document and a device is inserted into a card reader that is attached to the PC. If a virus, for instance, or an individual for example, is able to cause the subject matter of the EC to be displayed on the PC erroneously, the sender may legitimately sign the EC, and may even provide valid verification data for the verification status indicator of the EC. However, even though the sender may have performed an overt act in inputting verification data in connection with signing the EC, there may be a discrepancy between what the sender thought the overt act was being linked to and the actual subject matter of the EC message. Thus, even if a verification status indicator is used, the sender may have appended a digital signature to a contract document to which the sender did not intend to sign. This could harm the sender, as the actual EC may contain terms that agree to the transfer of $1,000,000, whereas the terms of the document that was displayed on the PC screen may have appeared to be only $10,000. In addition, the recipient may be harmed by accepting an EC that contains terms assenting to, for example, the shipment of 1,000 widgets for a price of $1,000, when the recipient's PC displays terms to ship 100 widgets for $1,000.

Accordingly, using a personal device to sign and provide a verification status indicator as a result of an overt act that indicates intent to digitally sign an EC in conjunction with a secure input device, or I/O support element solves this problem by providing a high level of confidence that the sender of the EC intended to sign the actual subject matter of the EC. Further confidence is possible by having a secure input device, or I/O support element like the European Union FINREAD standard, for example, also sign the EC, provided that a secure input device was used.

H. Eighth Aspect—VS, PRiMR and ABDS

This aspect combines the advantages discussed above of a verification status indicator aspect, a public key linked security profile aspect and an account authority aspect in authenticating a sender of an EC and the message sent in the EC. Thus, a recipient of an EC may use the verification status, which is contained in a sent EC, of a sending device to enhance the confidence in the authentication of a sender of an EC. The verification status indicator may also be used to enhance the confidence in the authentication of the message contained in the EC, as well as the intent of the sender of the EC to digitally sign the particular subject matter of the message contained in the EC. Furthermore, the security profile of the device used to send the EC further enhances the confidence that the authentication of the sender, the message and the sender's intent in causing the EC to be digitally signed by the sender's device EC is believable. Moreover, these aspects may be used in combination with an account authority database to provide confidence in the linking of account information with the person or entity that has been authenticated as intending to sign the EC. Accordingly, a recipient of an EC, in which the message contained therein is a contract document, is provided confidence in acting on the subject matter of the contract document vis-à-vis the sender's account. More specifically, the recipient is provided confidence that the legitimate account holder, for example, intended to agree, based on an agreement with consideration contained in the subject matter of the EC message, that the holder intends to pay the recipient.

V. DESCRIPTION OF THE DRAWINGS

The preferred embodiments will now be described in detail with reference to the accompanying drawings, wherein:

FIG. 7 illustrates a legend of preferred term definitions used generally in electronic contracting.

VI. DETAILED DESCRIPTION OF PREFERRED EMBODIMENTS

As a preliminary matter, it will readily be understood by those persons skilled in the art that the present invention is susceptible of broad utility and application in view of the following detailed description of the preferred methods of the present invention. Many methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Accordingly, while the present invention is described herein in detail in relation to preferred methods and systems, it is to be understood that this disclosure is illustrative and exemplary and is made merely for purposes of providing a full and enabling disclosure of the preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto and the equivalents thereof. Accordingly, while much of the present invention is described in detail herein with respect to computers, networks, devices, computer chips, and tokens, no specific software or logic circuit is intended nor is required to be used in the practicing of the present invention. Indeed, it would be a matter of routine skill to select appropriate computers, networks, devices, computer chips, and tokens in implementing the invention in a particular business application.

Figure 1:
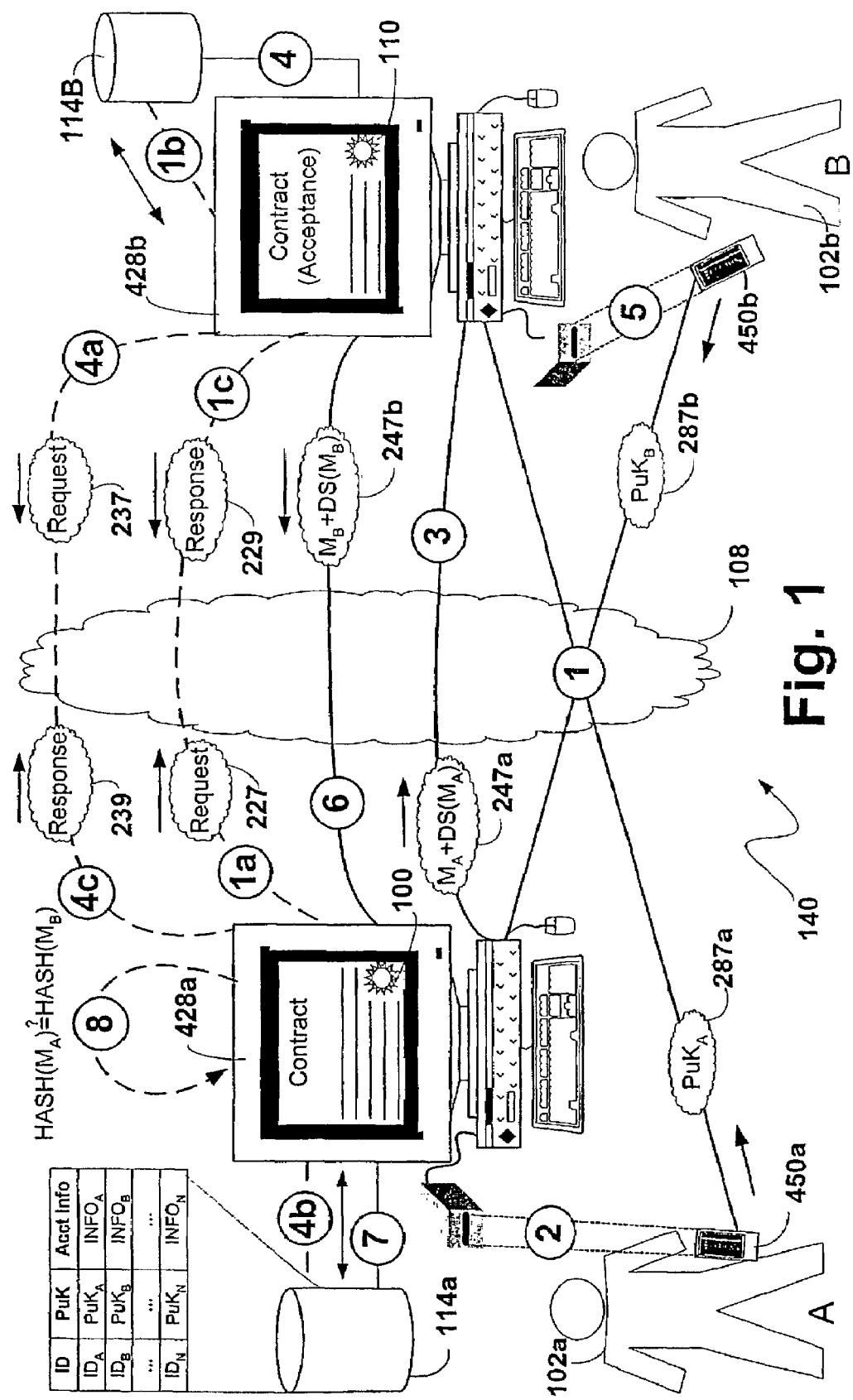
FIG. 1 illustrates a basic contract scenario between an offeror and offeree where each party acts as an account authority to the other.

Party-To-Party Contract Scenario Where Each Party Acts As Account Authority For The Other Turning now to the figures, FIG. 1 illustrates a typical system 140 for facilitating a scenario involving two parties to a contract, wherein a network, preferably the Internet 108, may be used to transmit and receive messages between the contracting parties. For illustration purposes, party A 102a will be referred to as the offeror and party B 102b will be referred to as the offeree. Upon agreeing to contract, either for a specific transaction, or to facilitate ongoing fixture transactions, the parties exchange public keys. The public keys are each part of a public/private key asymmetric key pair. Accordingly, the offeror 102a provides his public key 287a to the offeree 102b, and the offeree provides his public key 287b to the offeror. The encircled 1 on the figure represents the step of exchanging keys.

The public keys of the offeror 102a and the offeree 102b are stored in database 114b and database 114a, respectively. These databases are indexed by an identifier, so that when either party receives a communication from the other, any data associated with the identifier are readily accessible. The identifier will typically be an account number that was created for the corresponding party at step 1. For example, when party A 102a establishes an account with party B 102b, party B assigns an account number to party A.

In addition, account information particular to the party maintaining the database may be stored in each database. The account information will primarily include financial information, such as cash account balance, line of credit, etc. But, the account information may also include various data related to the associated party such as types of materials, goods and services in which the entity normally trades, quantities available, cost of goods and/or services, and other indicators of ability to perform a potential contract. Thus, party A 102a would maintain and associate in database 114a an identifier of party B 102b and party B's public key. Database 114a may also contain the account information related to and associated with party A 102a. This account information can be stored as a record in database 114a in association with an identifier of party A 102a and A's public key. Obviously, party A 102a does not need to access this information from database 114a to gain knowledge about itself, but this arrangement provides a convenient way for the account information to be stored and provided to and/or accessed by another party if necessary. Database 114b, maintained by party B 102b, has a similar arrangement structure as the structure of database 114a.

After the public keys and identifiers have been exchanged and set up at step 1, the offeror 102a drafts an offer 100 to be made to the offeree 102b on the offeror's personal computer ("PC") computer 428a. It will be appreciated that although the PC 428a is the type of device used in the preferred embodiment to send the offer 100 to the offeree 102*b*, other devices, such as a PDA or similar device, may also be used to draft and send the offer.

The offeror party A 102*a* may wish to send a communication to all parties with which he has a pre-existing relationship to determine whether any are able to fulfill his requirements. This communication may be a request 227 sent in the form of an electronic message at step 1*a*. In response to this request, which includes an identifier that identifies party A 102*a*, the recipient, party B 102*b* in this example, receives the request with computer 428*b* and performs the AA function of retrieving the requested account information at step 1*b* based on the identifier from database 114*b*. Since the parties have a pre-existing relationship, party A 102*a* knows what type of information party B 102*b* has available. The request message may also be digitally signed using party A's 102*a* private key and since the parties have a pre-existing relationship, party B 102*b* may also digitally sign the response 229 to the request sent at step 1*c*. It will be appreciated that, although party B 102*b* is sending information at step 1*c* pertaining to its ability to satisfy party A's 102*a* potential offer, this information does not necessarily constitute an offer from party B to party A. This information is merely being sent to party A 102*a* to facilitate his deciding whether to make an offer to party B 102*b*.

Figure 4:
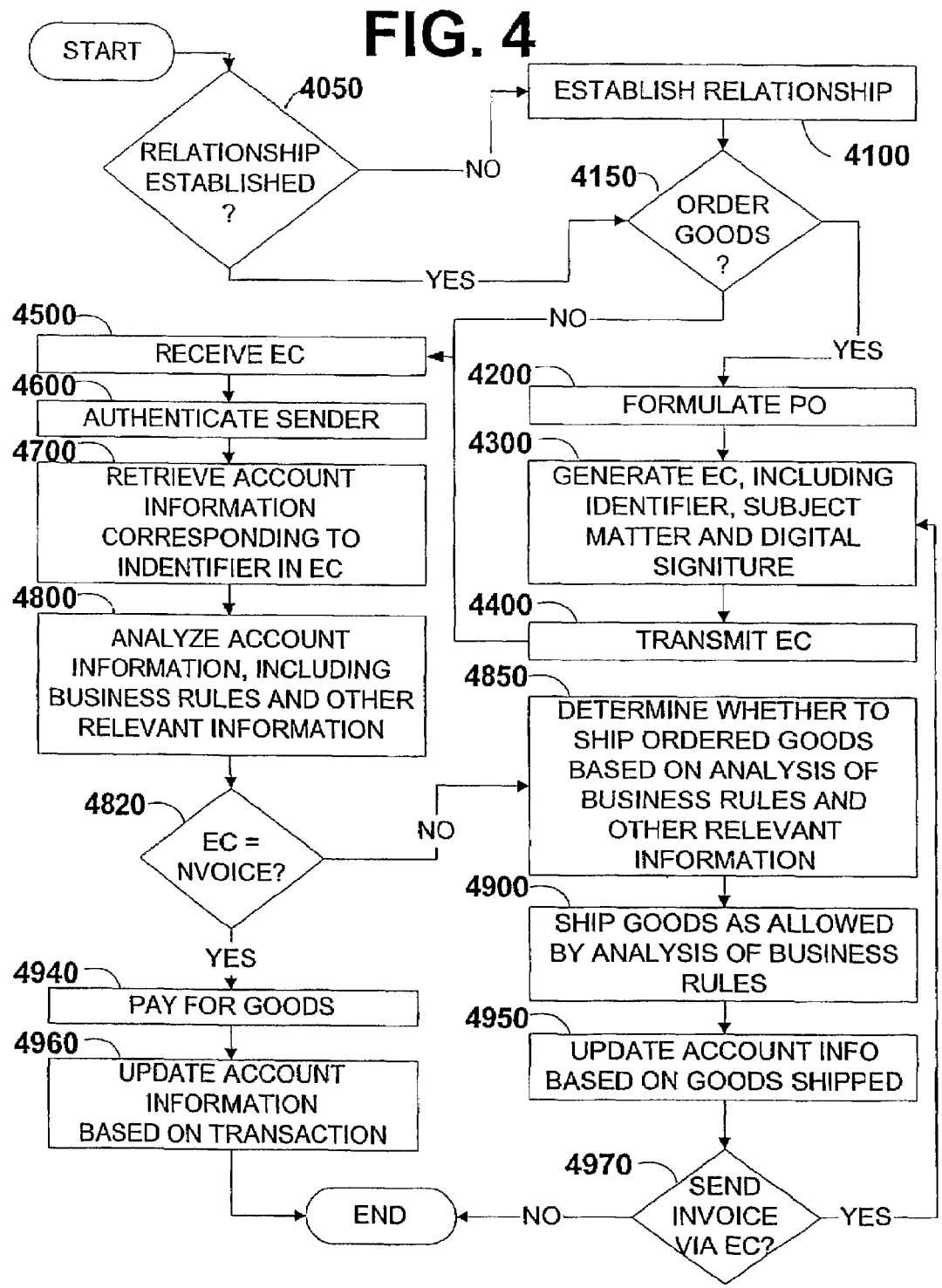
FIG. 4 illustrates a flow diagram depicting a process for implementing a contract scenario where business rules are used to automatically assent to and perform a contract.

When the offeror 102*a* is ready to send the offer to the offeree 102*b*, the offeror uses device 450*a* that contains the offeror's private key, which is associated with the public key 287*a*, to electronically sign the offer to be sent at step 3. Device 450*a* may be one of a variety of devices as shown in FIG. 4 of the incorporated ABDS Applications that illustrates a variety of devices that may be used to securely store a private key. When the offeror 102*a* sends the offer 100 to the offeree 102*b*, the device 450*a* has digitally signed the offer message with the offeror's device 450*a* at step 2 and appended it to an electronic message, which may include the subject matter of the offer 100 and an identifier. This combined message and digital signature form an EC 247*a* that is sent by the offeror's computer via a network 108, preferably the Internet, to the offeree 102*b* at step 3. If confidentiality of the subject matter of EC 247*a* is important, the entire EC may be encrypted with offeree's 102*b* PuK 287*b* to prevent an eavesdropper from discerning the contents of the offer message.

When the offeree 102*b* receives the EC 247*a* from the offeror 102*a*, the offeree's computer 428*b* performs a table lookup function in database 114*b* at step 4 based on the identifier that is part of the received message in the EC to retrieve the offeror's public key 287*a*. This allows the offeree 102*b* to verify the digital signature. If the verification process is successful, the offeree 102*b* has authenticated the sender of the message in the EC 247*a*.

Once the offeree 102*b* is assured that the sender of the message was indeed the offeror 102*a*, the offeree then performs the traditional task of analyzing the offer and deciding whether to accept it or not. This analysis is based on account information about the offeror 102*a* that is retrieved from database 114*b* that corresponds to the identifier and associated public key 287*a*.

If the offer is accepted, a contract is formed under general contract law principles. Similar to steps 1*a*, 1*b* and 1*c* discussed above, the offeree 102*b* may request certain account information from the offeror 102*a* at step 4*a*. In response to request 237, offeror 102*a* performs the AA function to retrieve the requested account information from database 114*a* at step 4*b* and then provides a response 239 containing the requested account information to the offeree at step 4*c*. The information requested will likely include the offeror's 102*a* ability to perform their end of the bargain if the offeree 102*b* fulfills their obligations. This information would typically include the offeror's 102*a* ability to pay if the offer was an offer to buy goods or the offeror's ability to produce certain goods if the offer was a sales contract. The information requested may also include whether the offeror 102*a* has the ability to accept any modification to the terms of the original offer sent in EC 247*a* at step 3.

If the offeree 102*b* decides to accept the offer, he communicates his intent to do so to the offeror 102*a*. Generally, a contract is formed when the acceptance 110 is received by the offeror 102*a*. When the offeree 102*b* decides to accept the offer 100, he uses his device 450*b* at step 5 to generate a digital signature from his private key that corresponds to the public key he provided to the offeror at step 1. Then, like the offeror 102*a* at step 3, the offeree 102*b* sends an EC 247*b* containing a message and a digital signature to the offeror at step 6, wherein the message includes the acceptance 110 and an identifier. In addition, the message may contain a confirmation of a written contract offer, for example, which may be encrypted by the offeror 102*a*. In such a scenario, the message would typically refer to the particular offer being accepted in order to link the acceptance to the offer being accepted.

When the offeror 102*a* receives the EC 287*b*, his computer 428*a* performs a table lookup function in database 114*a* at step 7 based on the identifier that is part of the received message in the EC to retrieve the offeree's public key 287*b*. If the message was encrypted for confidentiality purposes, then it would require decryption by the offeree 102*b*. When the offeror 102*a* has retrieved the offeree's 102*b* public key from database 114*a*, the offeree's public key can be used to verify the digital signature found in EC 247*b*. If the verification, is successful, the offeror 102*a* has authenticated the sender of the message as being the offeree 102*b*. Thus, a contract is formed between offeror 102*a* and offeree 102*b*.

Preferably, at step 8, the offeror 102*a* may perform a hash function on the message $M_B$ received in EC 247*b* from offeree 102*b* to generate a hash value Hash($M_B$) and the same hash function on the original offer sent to the offeree at step 3 to produce a hash value Hash($M_A$). The hash values are compared, and if they are identical, the offeror 102*a* has reasonable assurance that the offeree 102*b* accepted the identical terms as offered. Of course, this comparison could be performed by more traditional means, such as rendering the acceptance 110 on the monitor of computer 428*a* or printing the acceptance with a computer attached to the computer, and then performing a visual comparison. However, comparing hash values at step 8 provides a fast and accurate comparison of the terms in the offer 100 and the acceptance 110. Hash routines may also be performed to determine that a message was not tampered with during transmission from the other party.

Figure 2:
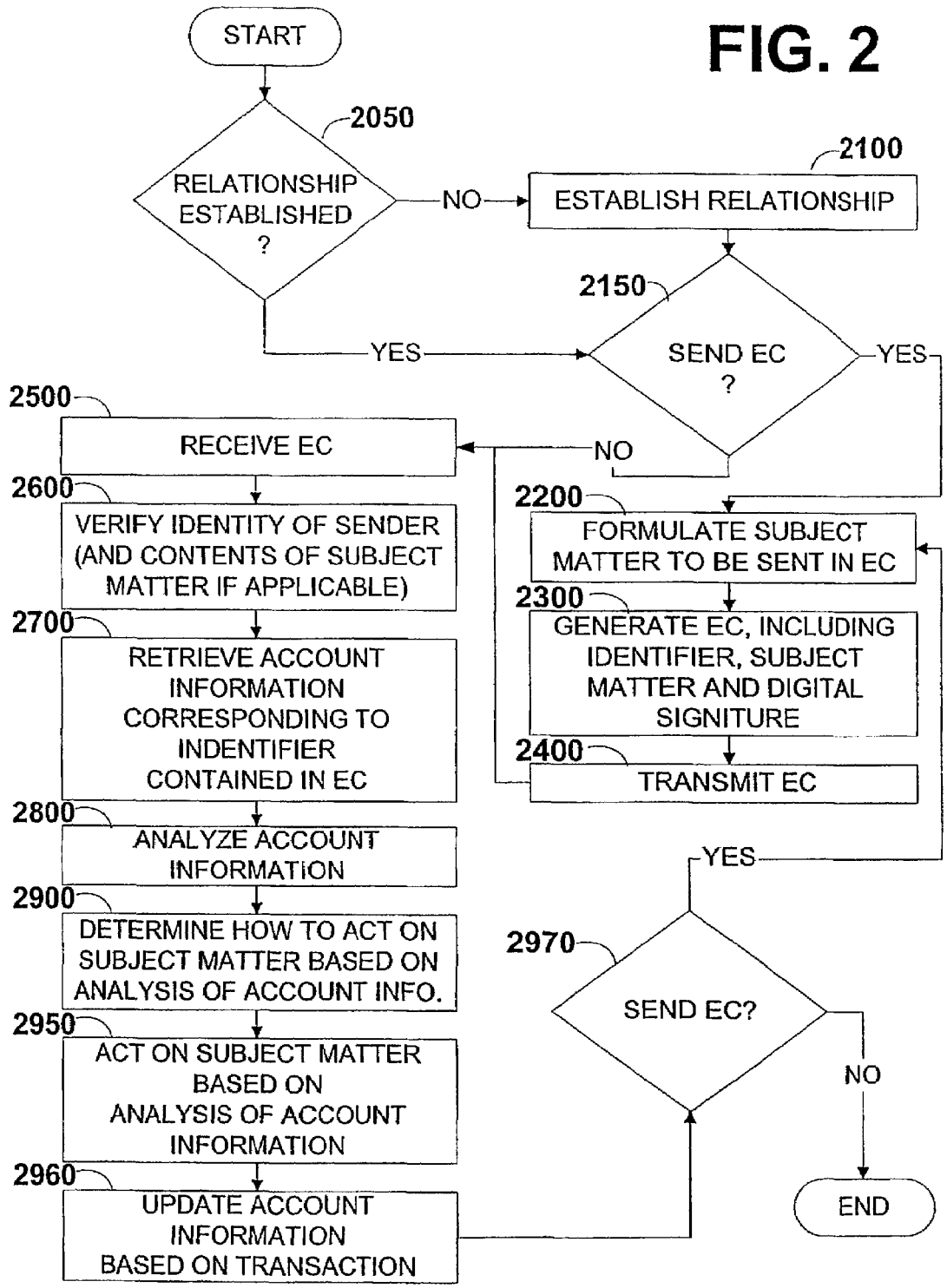
FIG. 2 illustrates a flow diagram depicting a process for implementing a contract scenario where each contracting party acts as an account authority for the other.

Process for Party-to-Party Scenario Where Each Party Acts as an Account Authority to the Other Turning now to FIG. 2, the figure illustrates a flow diagram of the preferred method for carrying out a party-to-party contract scenario where each party acts as an AA to the other. The method process begins when two parties establish a relationship at step 2100. Establishing a relationship 2100 may involve discussions between the parties that they may want to contract with one another. Moreover, the step of establishing a relationship 2100 involves exchanging information with each other. The exchanged information includes an identifier, a public key and account information that is associated with the identifier and the public key. The identifier may be any means for electronically identifying another party in a database, such as a company name or an account number. The public key is part of an asymmetrical cryptography key pair such that a party that possess the public key can verify a digital signature that was signed with the complementary private key of the key pair. Furthermore, the account information, which is associated with the identifier and the public key in a database, includes a variety of information that another party may wish to know about a party before deciding to enter into a contract with that party.

At step 2200, the subject matter of a communication to be sent to another party is formulated. This subject matter may include an offer or an acceptance of a contract.

After the subject matter of a communication has been formulated, at step 2200, an EC to be sent to another party is generated at step 2300. The EC comprises an identifier that identifies the sender of the EC, the subject matter to be sent in the EC, and a digital signature identifying the sender of the EC. After the EC has been generated at step 2300, the EC is transmitted by the sender to a recipient at step 2400. The EC may be transmitted by various electronic means, including a local area network, the Internet, or by a wireless network, among other means for communication.

Once the recipient receives the EC at step 2500, the sender is authenticated at step 2600. This authentication at step 2600 includes using the identifier contained in the EC to retrieve a public key from a database for use in verifying the digital signature. Once the digital signature is successfully verified, the recipient has authenticated the sender of the EC, and thus, has confidence that the sender is who the sender says it is. The verification step 2600 also includes retrieving a hash algorithm and performing a hash of the subject matter to compare the resulting hash value to a hash value sent as part of the digital signature, if a hash value was sent as part of the digital signature. If the hash values match, the recipient is assured that the subject matter of the EC was the subject matter that the party associated with the identifier of the EC transmitted.

After the sender and the subject matter have been authenticated at step 2600, the identifier is used to retrieve account information associated with the identifier at step 2700. This information is typically sensitive information regarding the sender of the EC that the sender would not want divulged to the general public. However, this information may be information that the recipient, with whom the sender wishes to contract, requires before entering into a contract with the sender. This account information is analyzed by the recipient at step 2800 to determine how to act upon the subject matter of the EC. For instance, if an EC contains an offer to buy a quantity of goods at a certain price, the recipient may want to determine whether the sender has the ability to pay for the goods before agreeing to sell the goods to the sender. Otherwise, if the recipient promises to sell the goods to the sender, ships the goods to the sender and the sender of the EC does not pay for the goods as promised due to cash flow problems, the recipient of the EC has lost the value of the shipped goods. Moreover, the recipient of the EC may have missed an opportunity to sell the goods to another party that may have been able to pay for them. Thus, analysis of the account information at step 2800 provides intelligence to the recipient of the EC. This intelligence can be used to reduce the risk of accepting the offer contained in the subject matter of the EC by allowing the recipient of the EC to make an educated determination of the likelihood that the sender of the EC will pay for the goods upon delivery.

After the analysis of the account information associated with the identifier is performed at step 2800, the intelligence gained as a result of the analysis performed at step 2800 is applied at step 2900 to determine whether to accept or reject the offer. After the decision on whether to accept of reject the offer is made at step 2900, the recipient of the EC acts by accepting or rejecting the offer at step 2950. Then, any previously stored account information that corresponds to the identifier and public key used to authenticate the sender and message at step 2600 is updated at step 2960. This updating at step 2960 may include reducing the quantity of goods that a seller has indicated were available to a buyer, or reducing the credit line the seller has previously made available to the buyer.

If the subject matter contained in the EC was an offer, the recipient may wish to accept the offer. An acceptance may be made in a variety of ways, including sending a second EC from the offeree, or seller of the goods, to the offeror, or sender of the original EC. Thus, the recipient of the first EC may decide to formulate another EC to send to the offeror at step 2970. The EC sent from the offeree to the offeror would be formulated, generated and transmitted by following the process shown at steps 2200–2400. If the acceptance is sent as another EC, the offeror, now the recipient of the acceptance EC, would follow steps 2500 and 2600 to confirm that the offeree sent the acceptance and to confirm that the terms of the offer were not amended vis-à-vis the original offer terms by performing a hash routine on the subject matter of the transmitted EC as described above. Alternate to sending an acceptance in the form of an EC at step 2950, the offeree may merely ship the goods to constitute acceptance. If the determination at step 2950 is to reject the offer, the offeree may send an EC to the offeror, wherein the subject matter of the EC is a text message stating "I decline" or some similar text that conveys a rejection.

For purposes of example, a vendor in the business of manufacturing and selling widgets is considered. If the vendor receives an offer to buy 10,000 widgets from a merchant at step 2500, the vendor may wish to determine the likelihood of getting paid before accepting the offer and agreeing to ship the widgets to the merchant. Thus, the account information retrieved at step 2700 may contain information about the merchant vis-à-vis the vendor such as credit line amount, accounts receivable, accounts payable and payment history. Optionally, the merchant may also choose to reveal typically sensitive and private information about the merchant, irrespective of the vendor, such as available cash, accounts receivable, accounts payable and payment history, including the timeliness of payment to other vendors and whether the other vendors had to engage a collection agent to prod the merchant to pay. The merchant may choose to provide such information to the vendor at the vendors request if the vendor, for instance, requires such information before agreeing to negotiate with the merchant. Accordingly, a meaningful analysis can be performed to determine the likelihood that the merchant will pay the vendor for the widgets at step 2800. The process for making such a determination is known to those skilled in the art, as such determinations are routinely made by persons engaged in business, regardless of the nature of the business.

After the vendor analyzes the account information of the merchant at step 2800, the vendor may decide whether to accept the offer received from the merchant at step 2900. If the vendor wishes to accept the offer, the vendor sends an EC back to the merchant at step 2950, wherein the EC contains an identifier of the vendor, a digital signature formed as discussed above, and the subject matter contained in the offer. Alternatively, the EC sent back to the offeror could contain a simple text message saying "I accept" rather than the text of the original subject matter of the offer. However, to prevent fraudulent replay attacks, each "I accept" should preferably reference a specific offer, for example, by using a SHA-1 hash of the original offer.

Upon sending of the EC containing an acceptance, the vendor updates the account information regarding the merchant at step 2960. In the example, the vendor would reduce the quantity of widgets available to sell the merchant by 10,000. The accounts receivables would be increased by the cost of the 10,000 widgets shipped, the line of credit extended from the vendor to the merchant would be reduced by the cost amount and the accounts payable of the merchant to the vendor would be increased by the same amount.

The EC sent from the vendor to the merchant would constitute an acceptance of the offer and the merchant would begin the process of receiving the acceptance. Upon receipt of the acceptance EC at step 2500, the merchant would authenticate the sender of the acceptance EC at step 2600, including optionally performing a hash of the subject matter contained in the acceptance EC to determine whether any terms of the offer were amended by the acceptance. Alternatively, if a simple message like "I accept" was sent as the subject matter of the acceptance, the acceptance EC may also include the original hash value that was part of the offer EC to confirm the terms that are being accepted as described above.

Upon receipt of the acceptance at step 2500, the merchant uses the identifier to retrieve the vendor's public key to decrypt the digital signature and the vendor's preferred hash routine, if required, to confirm whether the terms were amended by the acceptance at step 2600. Then, the merchant may use the identifier to retrieve any available associated account information to analyze the vendor's ability to perform at step 2700. This information may include, for example, the quantity of widgets in stock, the monthly production capacity, delivery history with respect to timeliness and quantity delivered, and any quality ratings, which may have been made on a standardized scale by other merchants that have bought the vendor's goods.

Finally, a decision is made at step 2970 whether to send another EC, an EC confirming receipt of acceptance 110, as shown in reference to FIG. 1, or another offer from the offeror 102*a*, which would then cause the relevant steps of the above described process to be repeated.

Purchase Order Business Rules Scenario

Figure 3:
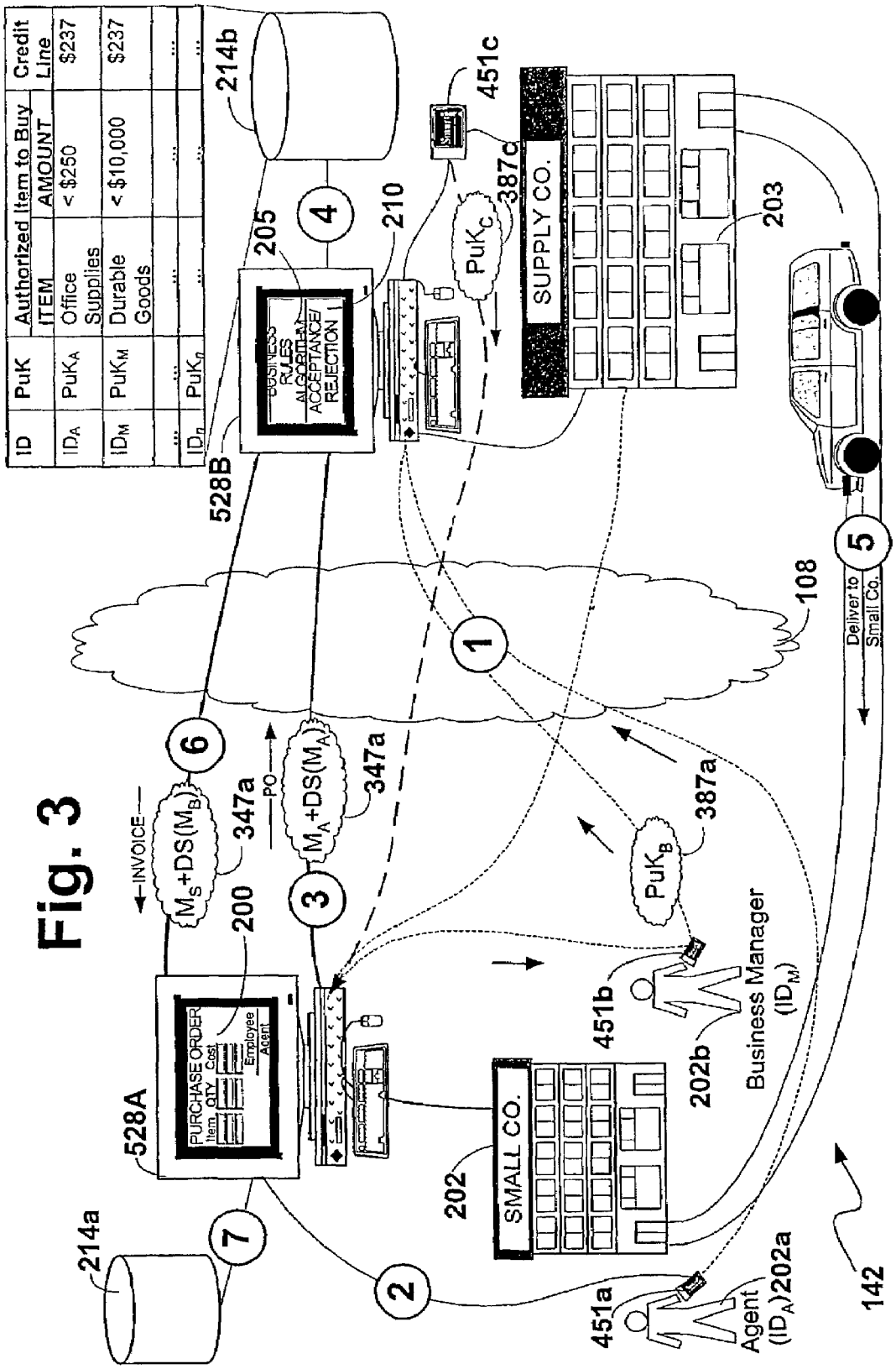
FIG. 3 illustrates a party-to-party contracting scenario wherein a party uses business rules to automatically assent to and perform the terms of a contract.

Turning now to FIG. 3, the figure illustrates, by way of example, a system 142 for facilitating a contracting scenario where business rules are used to automatically accept or reject an order for goods, as may be typical in a merchant-to-merchant scenario. System 142 may use a network, preferably the Internet 108, to transmit and receive messages between the contracting parties. For example, a purchasing agent 202*a* for a business 202 takes inventory and determines that the business' 202 supply of pens and paper is low. In addition, the business just hired ten new employees who need desks and computers. Thus, the purchasing agent 202*a* determines to purchase the items from an office supply company 203, with whom the business 202 has an existing account that is created at encircled step 1.

At step 1, identifiers and public keys of the agent 202*a*, the agent's manager 202*b* and the supply company 203 are exchanged. The identifier may identify the person or the entity by name, or, the identifier may preferably be an account number associated with the given party. In addition, account information is associated with each of the identifiers and public keys. In the example scenario, the account information typically includes the type of goods either the agent 202*a* or the manager 202*b* is authorized by the business 202 to purchase. In addition, the account information also includes the amount of goods in dollars that the agent or the manager is authorized to purchase. Also, the account information may include the credit line the business 202 has with the supply company 203. Moreover, this credit line amount may be applied in conjunction with the authorized amounts that either agent 202*a* or manager 202*b* can spend such that if the total credit line is less that the authorized amount, neither agent nor manager can purchase more than the available total credit line to the business 202.

Upon the initial setup and exchange of information between the parties, the agent 202*a* creates a purchase order ("PO") 200 to purchase the needed goods. The PO 200 is converted to an EC 347*a*, which includes an identifier, the PO subject matter and a digital signature of the PO, which is generated using the agent's private key from device 451*a* at step 2. The EC 347*a* is transmitted at step 3. When the supply company 203 receives the EC 347*a*, it uses the identifier to retrieve the public key 387*a* of the business's 202 purchasing agent 202*a* at step 4. The public key 387*a* is used to authenticate the sender purchasing agent 202*a*. Next, the identifier is used to retrieve any account information that the office supply 203 company may have that corresponds to the company's purchasing agent 202*a*.

For purposes of the example scenario, the purchasing agent 202*a* has only been authorized to buy low cost items costing less than $250, namely, consumables, such as paper, pens, paper clips, staples and the like that routinely need replenishing. Furthermore, due to previous purchases, the credit line is only $237 to anyone associated with the business 202. Moreover, the business 202 has not authorized the purchasing agent 202*a* to purchase relatively expensive items such as office furniture and computer equipment. These parameters are referred to as "business rules" in this example, as shown in detail in the exploded view of database 214*b* in the figure.

Thus, the supply company 203 computer 528*b* uses an algorithm 205 to analyze the account information in accordance with the business rules contained in the account information data that are associated with the purchasing agent's 202*a* identifier and public key. The analysis of the business rules associated with the purchasing agent's identifier result in a determination that precludes shipment of the desks and computers. Accordingly, assuming that the cost of pens and paper are less than $237, the office supply company 203 agrees to ship, and does ship, the paper and pens to the business 202 in accordance with the PO 200 at step 5, but does not agree to ship the desks and computers. This partial performance constitutes an acceptance of the PO 200 and may be accompanied by an invoice in the form of another EC 347*b* that is sent from the supply company 203 to the business 202 at step 6.

Then, the business 202 authenticates the sender by using the identifier in the EC 347*b* to retrieve the public key of the supply company 203 that was received at step 1 to decrypt the digital signature of the EC. The identifier is then used to retrieve a deposit account number of the supply company 203 from the account information stored in association with the supply company's identifier in database 214*a* at step 7. This deposit account number may then be used to make payment for the invoice contained in the EC 347*b* that was received at step 6.

It is noted that the business rules in the example would have allowed that manager 202*b* to order the desks and computers if their total cost was less than $10,000. However, since the line of credit to anyone affiliated with business 202 was only $237, analysis of the business rules in light of the credit line would not have allowed fulfillment of the order for office furniture.

Process for Purchase Order Business Rules Scenario

Turning now to FIG. 4, the figure illustrates the steps of a process for implementing business rules to automatically accept an offer received in an EC. The process begins at step 4050 by determining whether a relationship has been established with the intended recipient of the offer. An employee of an offeror may make this determination by accessing a database indexed by entities or merchants. If a relationship has not been established, the relationship is established at step 4100. This establishment involves exchanging identifiers, such as account numbers, public keys to be associated with the identifier and account information that will be used to facilitate future contracting.

After a relationship has been established, a purchasing agent determines items to be ordered and generates a PO therefrom at step 4200. The PO is converted to an EC at step 4300, the EC including the PO, the agents identifier and digital signature of the PO. The EC is transmitted to the recipient at step 4400 and received by the recipient at step 4500.

Upon receipt of the PO EC, a computer operated by the recipient automatically extracts the identifier from the EC and retrieves an associated public key from a database to verify the digital signature at step 4600. Upon successful authentication of the sender, the recipient's computer retrieves account information associated with the identifier at step 4700 and uses business rules contained in the account information to analyze the terms of the PO at step 4800.

Based upon the analysis of the business rules, the recipient's computer automatically determines that the EC was a PO at step 4820 and determines at step 4850 whether to ship the goods to a shipping address associated with the identifier contained in the PO EC. If the computer automatically determines that goods are to be shipped, the goods are shipped automatically at step 4900. Depending on the nature of the goods, the computer may direct automatic warehouse equipment to identify the goods, place the goods in an appropriate shipping container, prepare a shipping label and stage the packaged goods for pickup by a traditional delivery service at step 4900. Alternatively, if the goods are software or other electronic information, the goods may be shipped to an e-mail address that is associated with the identifier contained in the PO EC. When the goods have been shipped, the computer updates the account information associated with the identifier at step 4950. This updating step includes reducing the buyer's line of credit by an amount equal to the cost of the goods that were shipped at step 4900. Then, the computer may generate and send an invoice electronically in an EC to the same e-mail address as specified in the account information associated with the identifier contained in the PO EC. In addition, the invoice may contain a statement of account based on the revised line of credit as adjusted at step 4950.

Scenario Using a Third Party AA

Figure 5:
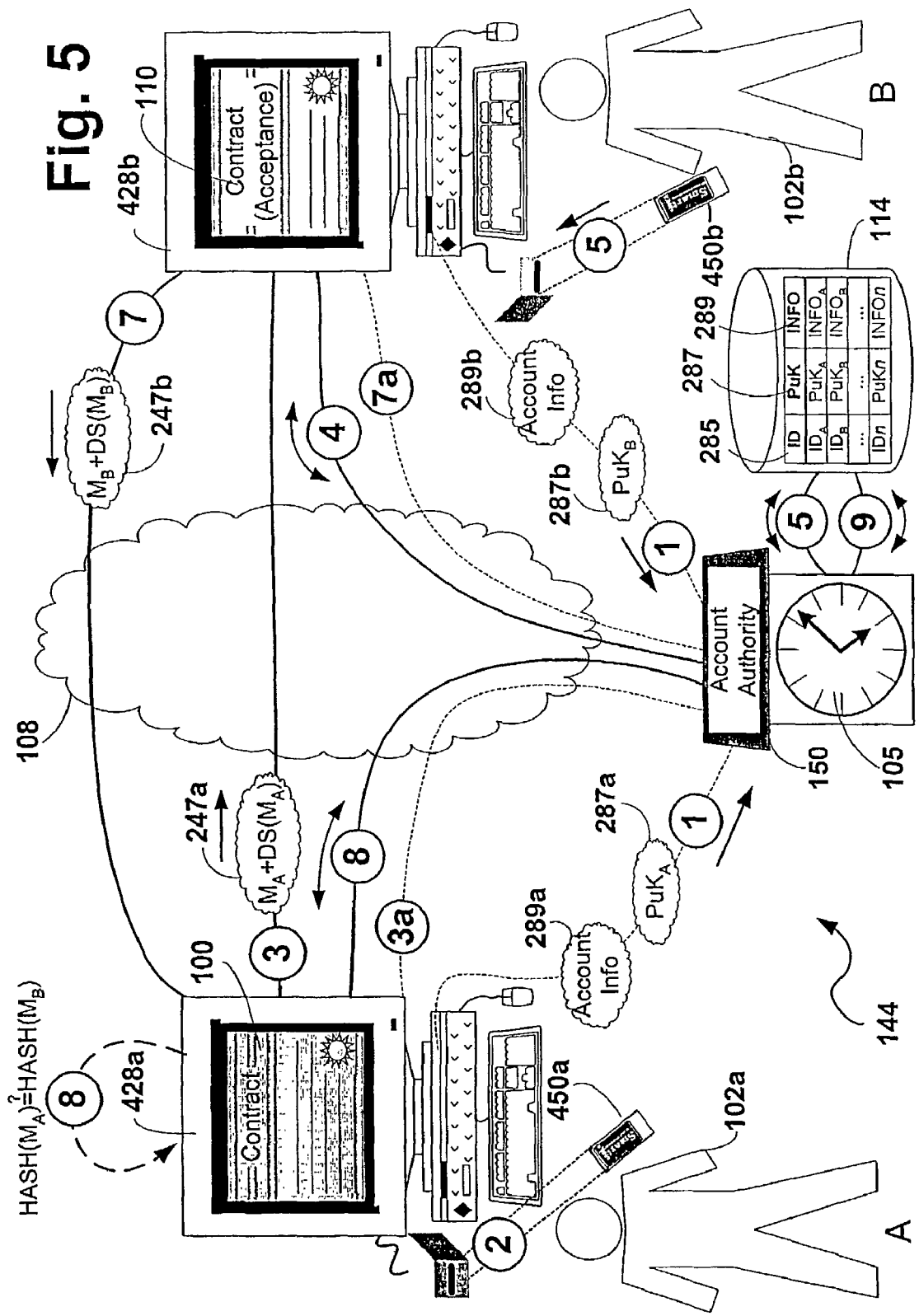
FIG. 5 illustrates a contract scenario where each party to a contract uses an account authority to associate a public key and account information with an identifier.

Turning now to FIG. 5, the figure illustrates an embodiment of a system 144 for facilitating a contracting scenario where a third party is used to maintain the public keys of the parties and associate said keys with other information, the other information including an identifier and account information, wherein a network, preferably the Internet 108, may be used to transmit and receive messages between the contracting parties. The process begins with the contracting parties providing their public keys from respective asymmetric key pairs at step 1 as in the party-to-party scenario shown in FIG. 1. However, the parties do not provide their public key and account information directly to each other before a negotiation process begins.

Rather, the offeror 102a provides his public key 287a to a third-party AA 150. The AA 150 can then provide the offeror's 102a public key 287a to another party when the offeror directs or permits the account authority to do so. Similarly, the offeree 102b provides his public key 287b to the account authority 150 at this step. Thus, when the offeror 102a is ready to make and send an offer 100, direct contact with the offeree 102b may not be required.

In addition, each party will generally provide the AA 150 with account information 289 relative to their business, such as type of goods, materials or services in which they normally trade, and other information that may be relevant to a potential contracting party such as quantity and price of items in stock, credit payment history and cash balances, etc. Thus, the information that is maintained by the AA 150 in database 114 comprises an identifier 285 generated by the AA when an entity registers with the AA at step 1 that identifies each party, either natural person or entity, registered with the AA. The database 114 also includes a public key 287 and the various account information data 289 associated with each of the identifiers 285.

The offeror 102a need only determine to which entity he wishes to make an offer 100 and send the offeree 102b the offer 100. The offer 100 is sent as an EC 247a from the offeror's PC 428a, which is part of the Internet 108. The EC 247a includes the offer 100 in the form of a message, an account identifier and a digital signature, which is generated by device 450a at step 2. Device 450a is a device as disclosed in the incorporated VS Applications and shown in FIG. 4 therein. The EC 247a is sent to the offeree at step 3.

When the offeree 102b receives the offer 100, instead of using the identifier to look up the offeror's 102a public key 287a as shown in FIG. 1, the offeree sends a request to the account authority 150 at step 4. The request is an EC that contains as a message the identifier found in EC 247a that was received from the offeror 102a at step 3. The account authority 150 then performs a table look up function in database 114 at step 5 based on the identifier received at step 4 and retrieves the public key 287a that corresponds to the identifier 285. The account authority 150 then provides the retrieved public key 287a and associated account information to the offeree 102b.

Upon receipt of the offeror's 102a public key 287a and account information 289, the offeree 102b may then perform the traditional process of analyzing the offer 100 and deciding whether to accept it. If the offeree 102b chooses to accept the offer 100, the acceptance 110 is sent to the offeror 102a. The acceptance 110 is sent as an EC 247b from the offeree's PC 428b, which is connected to the Internet 108. The EC 247b includes the acceptance 110 in the form of a message and a digital signature, the digital signature signed by device 450b at step 6. Device 450b is a device as disclosed in the incorporated VS Applications and shown in FIG. 4 therein. The EC 247b is sent to the offeror 102a at step 7.

When the offeror 102a receives the acceptance 110, instead of using the identifier to look up the offeree's 102b public key as shown in FIG. 1, the offeror sends a request to the account authority 150 at step 8. The request is an EC that contains the identifier found in EC 247b received from the offeree 102b at step 7. The account authority 150 then performs a table look up function in database 114 at step 9 based on the identifier received at step 8 and retrieves the associated public key 287b and account information. The account authority 150 then provides the retrieved public key 287b to the offeror 102a for authenticating the offeree 102b.

Continuing to refer to FIG. 5, but similar to the discussion of FIG. 1 above, the offeror 102a may wish to confirm that the terms of the original offer 100 were not modified by the acceptance 110 received from the offeree 102b at step 7. Thus, the offeror 102a may optionally at step 8 perform a hash function on the message $M_B$ received in EC 247b from offeree 102b to generate a hash value Hash($M_B$) and perform the same hash function on the original message sent to the offeree at step 3 to produce a hash value Hash($M_A$). If the hash values match, the offeror 102a is reasonably assured that the terms were not changed.

As with the embodiment described in connection with FIG. 1, either the offeror 102a or the offeree 102b may request account information associated with the other party or parties. This information is used to aid in the various aspects of the contracting process. For example, when the offeror 102a first contemplates making an offer, they may send a request query to the AA 150 to find all other parties that are registered with the AA that may be a likely offeree 102b, i.e. deals in the goods or services that offeror contemplates being the subject matter of the contract. This is a helpful feature because a preexisting relationship directly between the parties is not required. All that is required is that the parties have registered with the AA 150. Because the account information 289 is stored in the database 114, a standard search, such as a keyword search, known to those skilled in the art, will result in a list of likely offerees 102b.

However, the account information in database 114 provides more than just information related to the general nature of the enterprise to which it pertains. The account information 289 also comprises financial data and other sensitive strategic data that a given enterprise would not typically want to be public knowledge. Thus, the account information will only be provided to a requestor that is registered with the AA 150 and sends a request with a digital signature. Furthermore, a given entity may place restrictions on the level of security required before its sensitive information is divulged. This function may be accomplished through the use of a verification status indicator and an algorithm that implements business rules predetermined by the party to which the sensitive information pertains.

For instance, if an entity deals in low cost goods and/or services that are sold to a wide variety of consumers, that entity may not require more than authentication of the consumer, customer or entity. But, if the entity deals in costly items or items that require a long lead-time, the entity may require a higher level of authentication confidence. And, if the entity deals in a highly competitive market or a market where knowledge of the entities financial or production ability by a competitor would allow the competitor to cause severe damage to the entity, the entity may require the highest level of security for the information, before the information is released in contemplation contract negotiations. This could be implemented as a form of a nondisclosure agreement ("NDA"), such that the receiver of the account information agrees that the information is confidential and only provided for purposes of facilitating contract negotiations and transactions. By requiring the highest level of confidence as to the authentication of the requestor, the AA 150 generates a record that the requestor agreed to a NDA that can then be used as evidence that the requestor breached the NDA if the information somehow becomes known to someone other than the requestor. Thus, the party is assured that the information will be used by another that is serious about negotiating a contract, while at the same time providing the relevant information to more potential customers, thereby increasing the party's amount of business.

The third party AA model may associate a warning with account information it provides to a requesting party that the account information may not be valid. For instance, if a first party claims to have $50,000 in payables, other parties that have sold goods or services to the first party may have accounts receivable from the first party totaling more than $50,000. Thus, a "no vouch" warning that the payables information may not be accurate may be included in the account information associated with a particular identifier and its corresponding public key.

Still referring to FIG. 5, in another illustrative example, a merchant may wish to order a specific quantity of a certain type of lever used to make widgets, needs them by a time certain and is only willing to pay a certain amount. The potential buyer can send a request to a third party AA for identification of all vendors registered with the AA that are fully capable of filling the order, or alternatively that are capable of partially satisfying the potential purchaser's requirements. If one or more vendors registered with the AA satisfy some or all of the purchaser's requirements, the AA returns the identifiers of the vendors to the requesting party along with public keys and account information associated with each identifier. The buyer/requestor then analyzes the account information to determine whether to make an offer to buy the materials from the vendors. If the account information indicates that all the requirements of the purchaser can be met by a single vendor, the purchaser may make an offer to just one vendor. If one vendor can meet some of the requirements, and others can meet other requirements, the purchaser may wish to make multiple offers, each one directed to a certain fulfillment requirement. Additionally, the purchaser may wish to make conditional offers contingent upon successful acceptances of other offers made to the other vendors.

Thus, the third party AA in essence "vouches" for the ability of a party to fulfill certain requirements required by a requesting party, at least to the extent that the account information was accurately provided to the AA. Accordingly, the requesting party diminishes the risk of the scenario where an offer is made to a party that is unable or unwilling to fulfill an order but no offer is made to a party able to fulfill until that party is no longer so able.

In an alternate embodiment of system 144, the offeror 102a may send the offer EC 247a to the offeree 102b via the third party AA 150 at step 3a. This may be the only EC sent, or it may be a copy of the EC sent directly to the offeree 102b. If it is the only offer EC sent, the third party AA 150 may forward the EC along with the associated account information 289 and public key 287 associated with the offeror 102a to offeree 102b. One advantage this provides is that the AA 150 can append a time-date stamp 105 on the offer EC 247a before forwarding the offer EC to the offeree 102b. Or, if the system 144 is configured such that a copy is sent to the AA 150 at the same time the offer EC 247a is sent to offeree 102b, the AA 150 may append a time-date stamp to the copy and then forward a copy of the time-date-stamped-appended offer EC to offeree 102b. The same process of sending an acceptance EC to the AA 150 may be followed at step 7a. Thus, regardless of the system configuration, the AA places a time-date stamp on offer and acceptance documents and provides the benefit of documenting the time when documents are sent. This may be useful in a variety of scenarios, such as, for example, online auctioning services where the timing of bids may be crucial. Securely appending a time-date stamp may also be useful for establishing the sequence or order of the original events with respect to each other, as well as with respect to activity that may be occurring elsewhere.

Process for Scenario Using a Third Party AA

Figure 6:
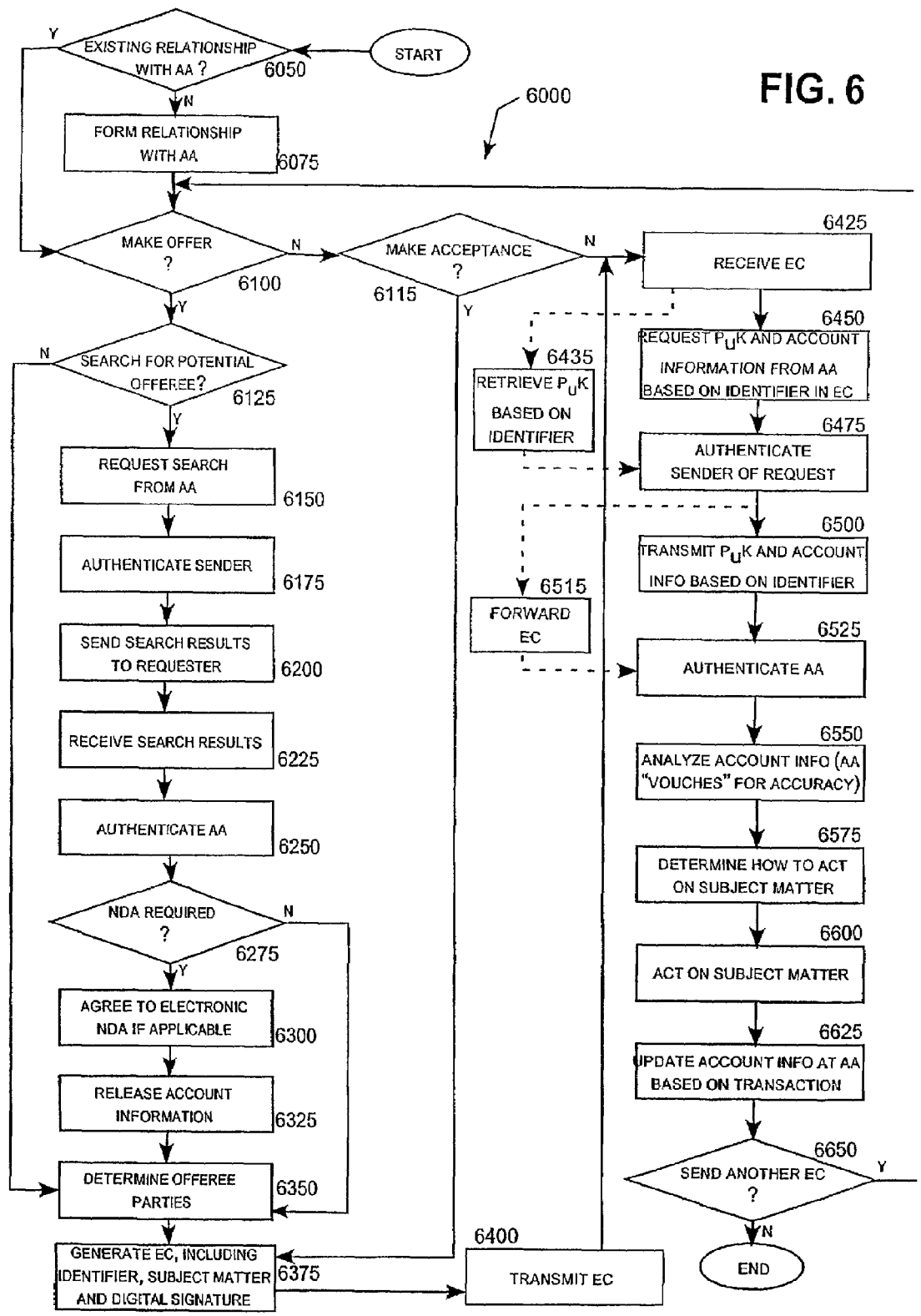
FIG. 6 illustrates a flow diagram depicting a process for implementing a contract scenario where each party to a contract uses an account authority to associate a public key and account information with an identifier.

Turning now to FIG. 6, the figure illustrates the steps of a process for using a third party AA for facilitating a contract scenario. When the process begins, the first step is to determine whether a relationship exists between the contracting parties at step 6050. If a relationship does not exist, the parties for a relationship at step 6075. This formation of a relationship is accomplished by providing information relevant to forming a contract between parties. It will be appreciated that the parties need not have communicated between themselves that they wish to form a relationship. By registering with the AA and providing relevant account information thereto constitutes the formation of a contract because the type of information provided by one party will enable another party to make an offer to the first party without any prior communication between the two parties.

After the relationship has been formed by providing information the AA, the next step is to determine whether an offer is to be made at step 6100. If not, the next step is to determine whether an acceptance to a previously sent EC is to be made at step 6115. If the action to take is determined at step 6100 to be an offer, the next step is to determine whether to search for a potential offeree at step 6125. This may include searching for a merchant or merchants that are involved in the type of business for which the offeror wishes to contract. Thus, the information about a parties business and products is helpful to narrowing the number of potential offerees from all the parties that are registered with the AA. If the offeror wishes to make an offer to a particular party, the process advances to step 6350, where the offeror determines to make an offer to an already-known party. If the offeror wants to search all potential parties registered with the AA, the offeror enters a search of all parties that may satisfy the offeror's needs at step 6150. This search request is sent to the AA in the form of an EC, upon receipt of which the AA authenticates the sender using an identifier and digital signature at step 6175 as previously discussed. The AA performs the search and sends the results to the requesting offeror at step 6200. Upon receipt of the results at step 6225, the offeror authenticates the sender of the search results EC and then verifies the digital signature at step 6250.

Because the information sent as part of the search results will typically be sensitive information such as bank balances of the entities returned in the search results, the AA may require at step 6275 that the recipient/offeror of the results digitally sign an electronic nondisclosure agreement ("NDA"). If an NDA is not required, the process advances to step 6350. If an NDA is required at step 6275, the offeror must agree to the terms of the NDA at step 6300 by sending an EC with a digital signature to the AA confirming as much at step 6300. Upon receipt of the NDA confirmation, the AA releases the sensitive information that accompanies the search results at step 6325.

The offeror then analyzes the search results to determine which parties, if any, to make offers to at step 6350. Once the offeree party or parties is determined, the offeror generates an EC at step 6375. The EC contains the subject matter (i.e. terms) of the offer, and includes a digital signature and an identifier. The EC is transmitted to the party or parties at step 6400 and is received by the recipient at step 6425. After receipt of the offer EC at step 6425, the recipient/offeree sends an EC to the AA requesting the public key of the offeror and account information associated therewith at step 6450. Next, the AA authenticates the sender/offeree at step 6475. If the system 144, illustrated in FIG. 5, is configured to send the EC to the offeree party via the AA, the process follows the path indicated by the dashed lines, and the AA retrieves the PuK based on the identifier of the EC at step 6435. Thus, the recipient/offeree does not have to request the sender's PuK and account information at step 6450 because this information arrives with the EC if system 144 is configured accordingly.

After the AA authenticates the sender/offeree at step 6475, the AA sends the offeror's public key and account information associated with the offeror identifier at step 6500. However, if system 144, as illustrated in reference to FIG. 5, is configured to send the EC from the offeror to the offeree via the AA, the AA sends the offeror's public key, account information and account identifier with the forwarded EC the offeree at step 6515. Thus, if system 144 is accordingly configured, a separate transmission of the offeror's public key, account information and account identifier is not required. Therefore, step 6500 is bypassed if system 144 is so configured.

Next, the offeree receives the public key and account of information associated with the offeror, and authenticates the sender of the offer at step 6525. Not only should the offeree know who the sender is in order to know who to contact to accept the offer, the sender and contents of the offer are also retained by the offeree in case proof is later-needed to show that the offeror did indeed make the offer. Upon successful authentication of the offeror, the offeree analyzes the terms of the offer and account information associated therewith at step 6550 to determine whether to accept the offer. Since the account information and the public key used to authenticate the offeror was sent to the offeree by the AA, the AA in essence "vouches" for the accuracy of the account information and the public key of the offeror. Thus, since the offeree has a record of the account information sent from the AA regarding the offeror, the AA may accept liability for the accuracy of the information, thereby increasing the likelihood that an entity will be willing to register with the AA and use its services.

Once the offeree has analyzed the offer and the account information regarding the offeror, the offeree decides how to act on the offer at step 6575 based on traditional business principles known to those skilled in the art, and then acts thereon at step 6600. After the action has been taken on the offer, the account information regarding the transaction is updated at step 6625. The information is updated if the offeree accepts the offer, or if the offeree rejects the offer. The information may be saved and stored by the offeree, but will also preferably be sent to the AA for updating of the records of both the offeror and the offeree. Sending updated account information to the AA would involve the typical steps associated with sending information in an EC as previously discussed herein. The information would include items such as a debit to the offeree's deposit account if the offer was to sell goods, or would include an entry to accounts receivable and a reduction in quantity of goods available from the offeree if the offer was to buy goods. Even if the offeree rejects the offer would be relevant information because a future offeror or offeree may be able to use this information to determine whether to contract with either of the two parties in the future.

Once the account information has been updated at step 6625, the recipient determines whether to send another EC at step 6650. For instance, if the offeree does not wish to accept the offer, simply not replying to the offer would constitute a rejection and the process would end. However, if the offeree wishes to accept, or request farther information, the determination would be made at step 6650 to send another EC. Accordingly, since a relationship with the AA already exists, the process would loop back to step 6100. Since the offeree would not be making an original offer, the process would advance to step 6115. If the action in response to the offer is to accept the offer, accept with a counter offer, or simply a request for more information, the process would advance to step 6375, at which point the process of sending and receiving an EC would repeat until a contract is formed. The process finally ends when a determination is made that no more ECs need to be sent at step 6650.

Legend of Preferred Terms

FIG. 7 illustrates a legend 7000 of preferred terms. The terms illustrated in the legend 7000 are illustrated for purposes of example. However, the legend is not meant to limit the terms as used herein to the definitions shown in the specific examples illustrated in the legend 7000. The terms are shown in legend 7000 are generally known to those skilled in the art and are shown to give a visual example of the structure of some of the terms used elsewhere herein.

Contract Scenario Using a Verification Status Indicator

Figure 8:
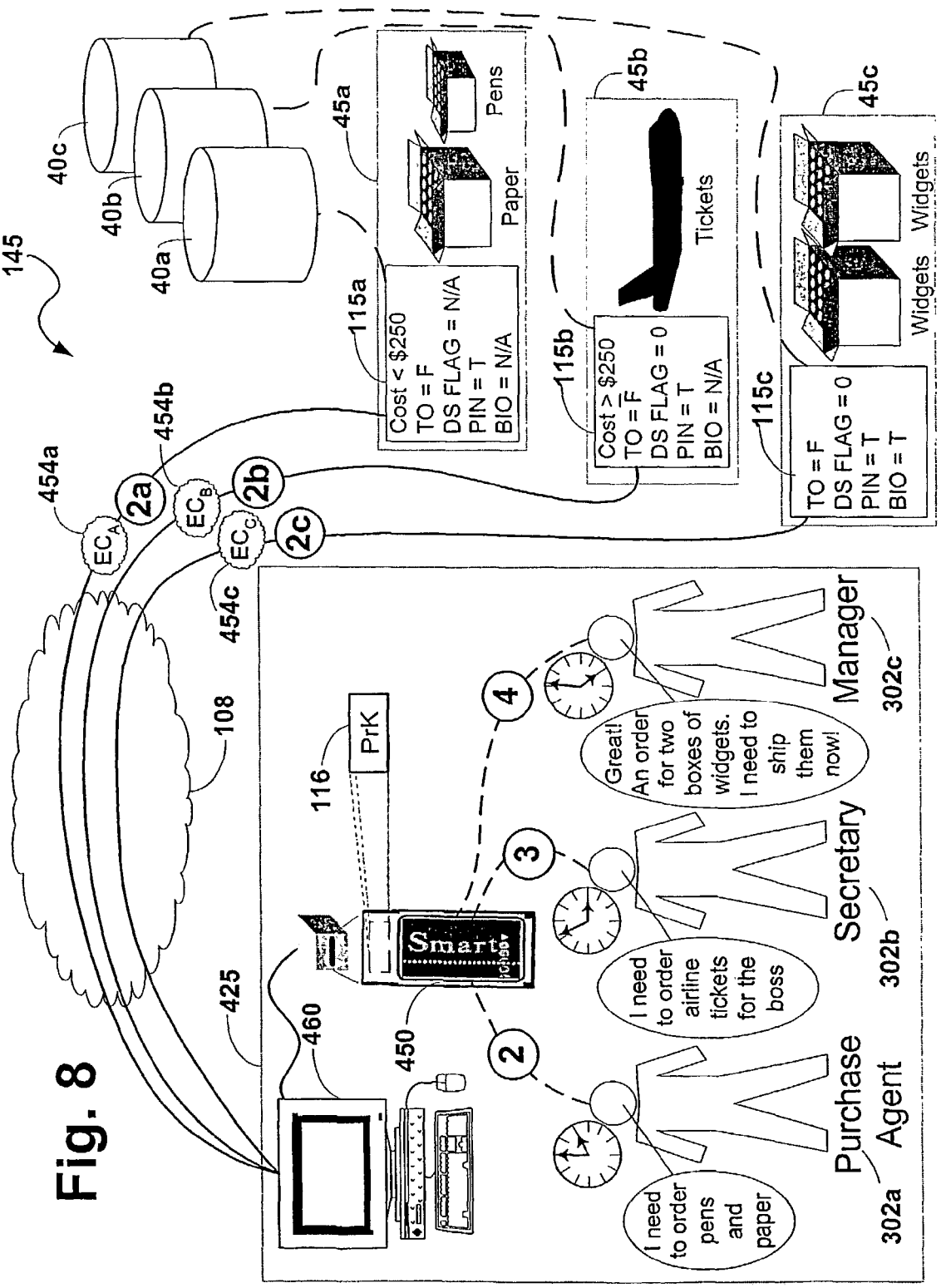
FIG. 8 illustrates a contracting scenario using a device that implements a verification status indicator.

FIG. 8 illustrates a system 145 for using the verification status of a device containing a PrK to determine what level of confidence to assign to a digitally signed EC. In the illustrative example, a network, preferably the Internet 108, may be used to transmit and receive messages between the contracting parties. The system 145 facilitates determining how much confidence to have in the authentication and the intent of the sender of the EC to be bound to the contract terms contained therein. For example, if the contract offer is for a low dollar amount and/or quantity, the offeree may only need to know that it was sent using a device owned by the offeror. However, if the value of the transaction is greater, the offeree may require that the digital signature of the EC be generated with a device wherein data, such as a personal identification number ("PIN"), was correctly entered when the device digitally signed the EC. If even more confidence is desired, the offeree may require that biometric data ("BIO") be used to generate the digital signature and the EC before acting on the subject matter of the EC.

Thus, not only is the offeree/recipient assured that the message was sent from the offeror's device, the offeror is protected from unauthorized signing and sending of an EC using their digital signature, which may occur in connection with CADS if the Certificate Authority hierarchy breaks down, or if someone's credit card is stolen. This also protects the offeree because the offeror cannot later assert that someone else used the device to digitally sign an EC. Thus, the risk to the recipient of performing the contract, only to have the supposed sender say there was no intent is reduced or eliminated. Therefore, merchants are more inclined to engage in electronic contracting because the aspect facilitates providing strong evidence of who sent an EC and of a sender's intent to be bound.

Indeed, the European Union has specified personal digital signature devices that internally generate the public/private keys, never divulge the private keys and that require very high security for protecting the private key. The European Union, in the FINREAD standard, also specifies a secure input device, or I/O support element that 1) securely inputs PIN and/or BIO data and 2) securely displays the terms of an EC to be signed, thus ensuring that the sender caused to be signed the terms that were visible on the secure input device at the time of signing.

Continuing now with discussion of FIG. 8, a typical office scenario 425 is depicted showing a computer 460 that is accessible by various employees. In addition, a device 450 is shown that contains a PrK 116. The device 450 is configured not only to digitally sign a message of an EC, but also to output an indicator that indicates the status of the device, as described in detail in the incorporated VS Applications.

The office scenario 450 shows three individuals that may share device 450 that was received at step 1. At step 2, purchasing agent 302A determines that the office needs more pens and paper. Accordingly, the agent 302A uses device 450 after 2:00 to order the paper and pens using office computer 460. The office computer uses the PrK 116 of the device 450 to form and send a digital signature along with an identifier as part of an EC 454A at step 2a. The EC 454A contains the subject matter of an offer for pens and paper. In addition, the EC 454A includes a verification status marker, as described in the incorporated VS Applications.

Upon successful decryption of the digital signature, the recipient 45a of the EC 454A analyzes the verification status indicator to determine whether the EC satisfies predetermined business rules 115a. In order to perform the analysis of the verification status indicator, the recipient 45a accesses the business rules 115a. This may be performed by accessing database 40a, which is maintained by recipient entity 45a. Alternately, the business rules 115a may be maintained by a third party account authority 32, or by another account authority entity. Regardless of where the business rules are stored, they are associated with an identifier and public key, as described above, so that they can be retrieved upon receipt of a corresponding identifier.

For the business rules to be satisfied, the device 450 must not have timed out. Whether the device 450 has timed out is represented by the timeout variable ("TO"). This is shown in 115a as TO=F. If the device had timed out, the variable would be represented as TO=T, and the business rules 115a would not be satisfied because they require that TO=F. Since the cost of the goods being ordered is less that $250, the business rules do not care whether the device 450 has been used by another employee since the last reset of the device. Thus, the status of the sequence marker DS Flag, as described in detail in the incorporated VS Applications, is not applicable ("N/A"). Reset of the device may be accomplished by de-energizing and re-energizing device 450. Or, if business rules require that verification data be entered, as discussed below, entering of verification data would reset the DS flag to zero. PIN verification status includes whether or not the correct PIN was entered. BIO verification status includes the degree or percent match of the entered BIO data.

Although the business rules 115a do not require that the DS flag be set to zero, they do require that some form of heightened authentication be used in addition to a standard digital signature. For example, the business rules 115a may require that a correct PIN be entered by agent 302a. As illustrated in the figure, the rules 115a require that PIN=T. Thus, if someone sweeping the floors happened by, inserted the device 450 and attempted to order paper and pens, the business rules 115a at the recipient 45a would preclude acceptance of the offer 100 because intent by an authorized agent of the office 425 was not manifest vis-à-vis recipient 45a in the placing of the order. Furthermore, the business rules 115a do not require BIO confirmation because the cost and type of goods ordered is below $250. Accordingly, as long as the correct PIN had been entered upon placing the order for pens and paper by the agent 302a, the recipient 45a is assured that the offer to buy pens and paper is legitimate because the digital signature successfully authenticated the sender and the business rules 115a were satisfied by the verification status indicator in EC 454a.

However, because the DS flag criterion is N/A, business rules 115a would allow an unauthorized user to order the pens and paper (or other goods costing less that $250) if device 450 was have been left inside the computer 460 after verification data, such as a correct PIN, was last entered. The business rules 115a allow fulfillment of the order regardless of the DS flag status because the price limit of $250 mitigates any damage that may occur from unauthorized ordering of goods at step 2. Even if the device 450 had been left in computer 460 after a previous use of the device, and the DS flag was consequently incremented from 0 to 1, the entity to which the device belongs would still receive the ordered goods, even if they were not legitimately ordered. Thus, although the ordering entity in the example may end up receiving more pens and paper than it needs if an unauthorized user places the order for pens and paper, and thus, may be bound to pay the contract amount for the pens and paper, they would have received goods costing a relatively low dollar amount in exchange for the price paid. Furthermore, if they receive the goods and do not wish to keep them, they could potentially return them unused to the supply company for a refund in accordance with other business rules. Therefore, business may be tailored to meet the needs of a particular business and/or particular types of transactions.

The depicted example merely illustrates a use of verification status of a device in conjunction with predetermined business rules, but is not meant to limit the business rules and how the verification status facilitates the implementation of business rules. For example, the ordering entity may have wanted the business rules not to require that verification data be entered each time a low dollar amount purchase is made. This business decision may be made to reduce the time it takes for the purchasing agent 302A to formulate the terms of the offer and send the offer EC 454a at step 2a. However, this is only an example, and attention should focus on the fact that the contracting parties determine the business rules that are desirable for their particular situation. The ordering entity could just as well have determined that any use of device 450 to enter into a contract with another entity or individual would require that verification data, such as a correct PIN, be entered for every occurrence where the device generates a digital signature. The significance of this is that the verification status of device 450 has many uses that are customizable to a particular party or parties needs. One of the benefits of the verification status aspect is that the verification status can provide the recipient of an EC with additional evidence that the sender of the EC intended to be bound by the terms of the message contained in the EC. The business rules essentially determine what level of confidence is required before believing that the sender is legitimate (i.e. the lawful and proper owner of the device) and that the sender intended to be bound (i.e. the computer 460 prompts a sender of an EC to enter a PIN or BIO data before sending the EC).

In the example, the device may have been used by a properly authorized user (the agent 302a) who had entered the correct PIN for a prior transaction with another supplier. Thus, the verification status indicator would indicate that the user was proper, i.e. the user was authenticated, and the PIN was correctly entered. However, the evidence that the user intended to be bound to the particular terms of the offer in the offer EC 454a would be weak if the DS flag is not 0. This is because the verification status indicator does not indicate that the PIN was correctly entered in connection with the sending of the current EC 454a immediately before the EC was signed. For efficiency reasons in the example, the parties have previously agreed that it is not necessary for the DS flag to be 0, and thus the business rules permit the shipment of the pens and paper even though the DS flag may not be equal to zero.

However, the entry of a correct PIN or valid BIO verification data may be desirable for even low cost transactions. This is because entry of a correct PIN and/or valid BIO, including degree of match, provides stronger authentication of a sender than does a digital signature without a verification status indicator. Moreover, entry of a correct PIN and/or valid BIO verification data in connection with the digitally signing and sending of a specific EC provides strong evidence that the sender intended to be bound by the contract subject matter contained in the EC, for example. As discussed below in reference to FIG. 12, the European Union has specified that an EC should be supported by strong evidence of a sender's intention to send the EC. Thus, a secure input device may be specified that supports the secure input of PIN or BIO data, such that, for example, the secure input device precludes virus eavesdropping on data that passes through a PC which can be later replayed as part of a fraudulent transaction. The secure input device also securely displays the EC while the PIN or BIO data is being entered. In addition, a secure input device may also sign the EC, proving that a secure input device was used.

Continuing with discussion of FIG. 8 to the next step regarding the illustrated example, less than an hour after the EC 454a ordering the pens and paper was sent, a secretary 302b from the same office needs to place an order for airline tickets at step 3. These are for her boss to attend a conference and he must leave immediately. Assuming that the TO period is set at one hour in business rules 115b, which are retrieved from database 40b, TO for the device would still equal "F". However, if device 450 was left in computer 460 after agent 302a ordered the pens and paper at step 2, the DS Flag will not be equal to "0" because the ordering of tickets will be at least the second transaction since the device was reset, and the business rules associated with the public key corresponding to EC 454b require that transactions valued over $250 must be the first transaction where a device containing a private key is used since reset of the device. Thus, even though TO=F, the device will have to be removed and reinserted, or some other method available to device 450 for resetting of the DS Flag. Reset could also be accomplished by the computer 460 displaying a prompt for the user to enter the correct PIN that corresponds to device 450.

Resetting the DS flag indicates to recipient 45b that the sender of the EC, which contains the order for airline tickets, intended to order the tickets. Moreover, the verification status contained in EC can be stored in database 40b as a record that a sender associated with the public key of device 450 intended to order the tickets. Upon resetting the device 450, the business rules 115b still require PIN data to be entered by secretary 302b. Accordingly, upon successful decryption of the digital signature of EC, the recipient evaluates the verification status indicator to determine whether the business rules 115b are satisfied. If the verification status indicator indicates that the device 450 has not timed out and verification data, such as a correct PIN, have been entered, and entered since the device 450 was last used for a transaction, business rules 115b will allow the booking of a flight in accordance with terms of the EC 454b. This is because the recipient 45b of the EC 454b will be assured that the secretary 302*b*, who was successfully authenticated, has authority to place the order and intended to do so. Thus, a valid offer for which an acceptance was made will create a contract between the secretary's 302*b* employer and the entity 45*b*. Whether the advertisement for sale of tickets or the offer to purchase the tickets by the secretary 302*b* constitutes the offer, and whether sending the terms contained in EC 454*b* or the delivery of the airline ticket (likely via an e-mail confirmation) by airline 45*b* constitutes an acceptance is immaterial to this discussion. What is important is that an offer and an acceptance, embodied in separate ECs, are made in conjunction with a verification status indicator that enhances assurances to the receiving party that the sender intended to be bound by the terms contained in the subject matter of the EC.

Finally, in the last stage of the example depicted in the figure, manager 302*c* needs to ship an order of two boxes of widgets at step 4. According to business rules 115*c*, since the time is over two hours since the secretary 302*b* ordered the airline tickets, the device 450 will have timed out so the TO variable will have to be reset. Furthermore, the DS Flag will have to be reset, if it was not previously reset (this will typically occur automatically when the device TO flag is reset by removing the device from computer 460 or by "logging out" of the device's active session to begin a new one). Based on the value of the shipment, and other parameters, the business rules 115*c* require that the manager enter valid BIO data in addition to a correct PIN. Thus, a fingerprint, voice print, hand geometry, retinal scan, or similar verification data that is personal to the manager 302*c* will be required before the business rules at the recipient 45*c* will permit shipment of the widgets. The recipient 45*c* may be the shipping department or warehouse of the entity that employs the manager 302*c*, or it may be a bailee that has custody of the goods and is waiting for instructions from manager 302*c* to ship the goods. Accordingly, upon successful authentication of EC 454*c*, retrieval of business rules 115*c* from database 40*c*, and satisfaction of the business rules by evaluating the verification status indicator of device 450, the recipient 45*c* is assured that the sender is the manager and that the manager intended to be bound to the offer. The widgets are shipped and the offer is accepted, thereby forming a contract to which manager's 302*c* employer will be obligated to pay the shipping entity 45*c* for delivery.

Although this may not be a simple contract inasmuch as an agreement to agree between the parties would have been entered into before the manager 302*c* sends EC 454*c* at step 4*a*, this example illustrates uses of the verification status indicator other than a straightforward, arms-length offer and acceptance. The shipping entity 45*c* may be an in-house shipping warehouse owned and operated by the same entity for which the manager 302*c* in employed. Or, the shipping entity 45*c* could be a bailee, or a third party custodian, that stores the goods until ordered to ship them to a destination. In either instance, the shipping entity 45*c* and the manager 302*c* may not typically be physically located in close proximity. And, even if the manager 302*c* and shipping entity 45*c* report to a common employer, internal accounting procedures for many businesses typically require debits and credits to each departments cost tracking accounts. Thus, evidence that the manager 302*c* intended to send the EC 454*c* authorizing the shipment of the widgets will nevertheless be beneficial.

Process for Contract Scenario Using a Verification Status Indicator

Figure 9:
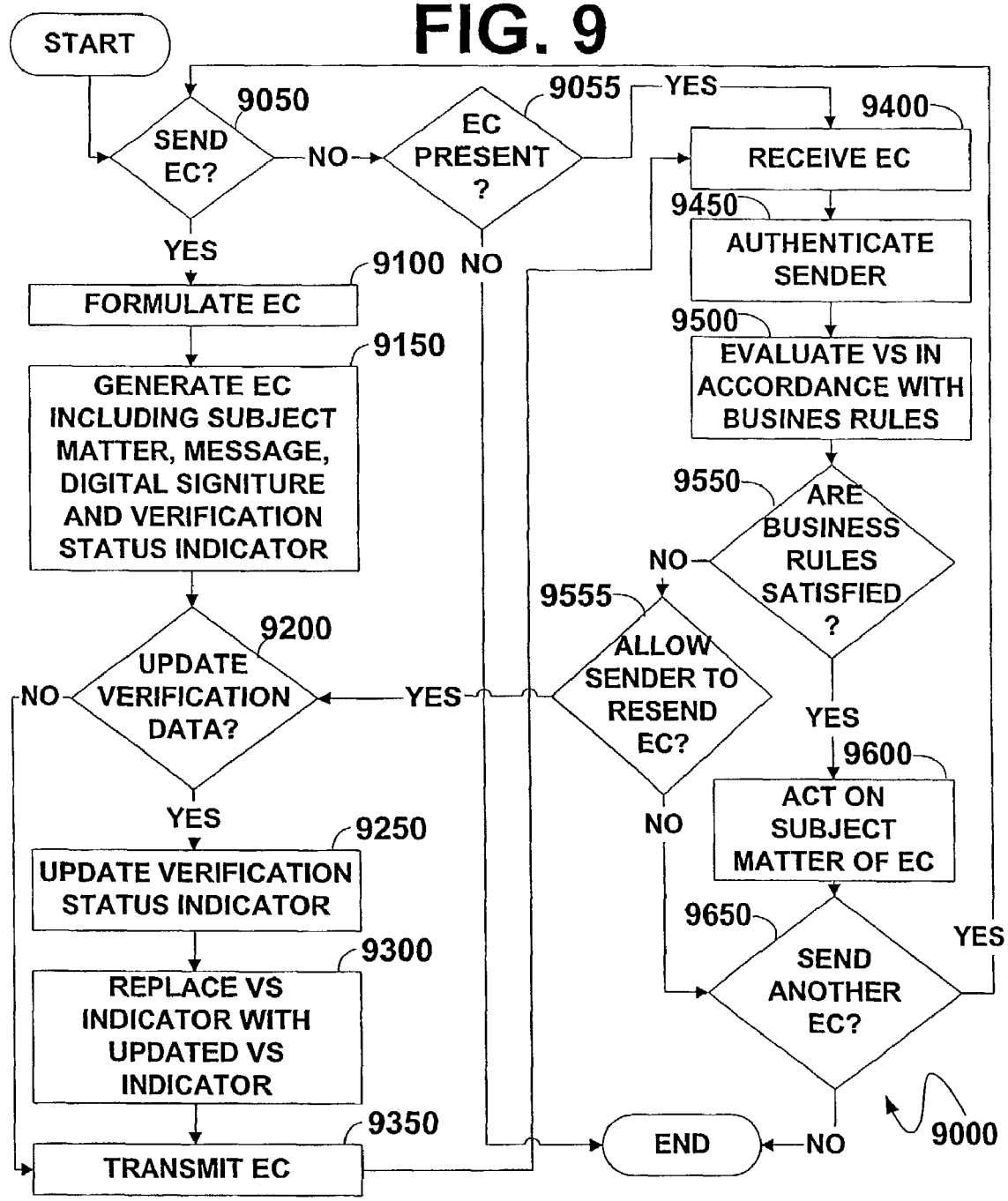
FIG. 9 illustrates a flow diagram depicting a process for using a device that implements a verification status indicator in a contracting scenario.

Turning now to FIG. 9, a flow diagram illustrates a process 9000 for e-contracting wherein an EC is used to securely transmit contract documents. Furthermore, the process 9000 illustrates the use of a verification status indicator to increase the confidence a recipient has in the authentication of the EC. Moreover, the process 9000 raises the confidence level of the recipient that the sender of the EC intended to digitally sign the message contained therein, by providing evidence that the sender performed an overt act in digitally signing the message of the EC.

The process 9000 begins at step 9050 when a user implementing the process decides whether to send a contract document as an EC. The sender of the EC may be an offeror, an offeree, or any other contracting party that may be involved in a contract scenario. If the contracting party is not sending an EC, the user is likely using the process to receive an EC that contains a contract document. Thus, the process follows the "N" decision path and advance to step 9400, which will be discussed in turn shortly. Continuing along the "Y" path from step 9050, the user formulates a contract document, typically an offer or an acceptance of an offer, using PC, for example, at step 9100. After the document has been formulated, an EC is generated at step 9150. The EC may typically contain, for example, the subject matter of the contract document in the form of an electronic message.

Continuing with the example, the EC may also typically contain a digital signature of the message and a verification status indicator. The digital signature will typically be generated using the EC sender's private key of the sender's personal device. The verification status indicator will typically be generated based on the most recent verification data received by the personal device. Then after the EC has been generated, the sender is presented at step 9200 with an option to update the verification data by inputting to the personal device, for example, a PIN and/or BIO. This may be desirable if the verification data has grown stale, i.e., another EC has been signed by the device using the current verification data. Or, verification data may not have been entered into the device since it was placed into the sending PC. In addition, verification data may have been entered, with no digital signature having been made since the verification data was entered, but the current verification data was incorrect, i.e. the wrong PIN and/or the BIO did not match the correct BIO inside the device. Correctly entering fresh verification data, i.e. a digital signature has not been generated using the device's private key since the verification data was entered, is desirable because the verification data is used to generate a verification status indicator that accompanies ECs digitally signed by the device. Thus, by evaluating the verification status indicator contained in an EC, a recipient may increase the confidence which is placed in the authentication of the EC.

If the sender decides not to update the verification data, i.e the sender may not know the PIN or may not be the owner to which the personal device is assigned, although the sender may have permission of the owner to use the device to digitally sign the EC, the process advances to step 9350, which will be discussed shortly in turn. The sender may be using the device to place an order for goods for example, the cost of the order being less than a predetermined amount based on business rules previously agreed to between the sender's employer, for example, and the recipient/offeree. However, if the sending party decides to update the verification data, which would be the case, for example, if the sender knew that the business rules required updated verification data be entered immediately prior to signing of the EC, then the sender enters updated PIN and/or BIO at step 9250. Upon entry of verification data, i.e. the device's correct PIN and/or valid BIO, the process replaces the verification data that was originally generated as part of the EC at step 9150. After the stale verification data has been replaced with updated verification data, the EC is transmitted to the recipient at step 9350.

After the EC is sent at step 9350, the recipient receives the EC at step 9400. Upon receipt of the EC, the recipient authenticates the sender of the EC at step 9450. Authentication of the sender may include decrypting the digital signature of the EC. In addition, the verification status of the EC may be used to raise the level of confidence in the authentication of the EC. For example, if the verification status indicates that valid verification data was entered prior to signing the EC, the recipient has higher confidence in the authentication of the sender, i. e., the sender is who the EC indicates that the sender is. This is because the verification status indicator indicates that before the EC was digitally signed, the legitimate owner of the device containing the private key used to sign the EC entered valid verification data, and thus, indicates that the an imposter did not use the device to pose as the legitimate owner thereof. Furthermore, this indicates that since the legitimate owner was the likely signer of the EC, the legitimate owner intended to be bound by the contract terms contained in the subject matter of the EC message.

However, the verification status indicator may also indicate that valid verification data was not entered immediately prior to the device being used to digitally sign the EC. Thus, before the recipient decides whether to act on the subject matter of the EC, i.e. accepting an offer or evaluating an acceptance to determine whether the acceptance -modified the terms of the original offer, etc., the verification status indicator is determined at step 9500. Then, the process compares the verification status indicator with the business rules at step 9550 to determine how to act upon the subject matter of the received EC.

For example, if the amount of the transaction is below a predetermined threshold, the recipient may not care whether valid verification data was entered into the sending device immediately before the EC was signed by the device's private key, although the business rules may require that valid verification data be entered into the device at some time prior to the signing of the EC. However, if the cost amount of the transaction is above a predetermined threshold, the business rules may require that the DS flag sent as part of the verification status indicator indicate that valid verification data was entered into the device prior to being used to sign the EC, without an intervening EC being signed before the EC being evaluated by the recipient was signed. Furthermore, the business rule may require that not only valid verification data be entered immediately prior to the signing of the EC currently under evaluation, but that the verification data be entered within a predetermined timeout period before the EC was signed. This reduces the likelihood that valid verification data was entered into the device, only to have the device left unattended while an unauthorized user came upon the device and used it to sign the EC. Accordingly, an overt action by the sender immediately before and in conjunction with digitally signing an EC establishes intent on behalf of the sender to sign the EC.

If the determination made at step 9550 indicates that the business rules were not satisfactorily met, the recipient may decide to indicate to the sender that the business rules were not satisfied at step 9555. This indication can be made in the form of a unsigned message to the original sender requesting that an EC containing the contract document subject matter be resigned with valid verification data entered into the sending device immediately prior to signing the new EC. Thus, the process returns to step 9200, where the process followed as described above again. If the recipient does not wish to send a simple message instructing the original sender to reenter the verification data, the process follows the "N" path from step 9555 to step 9650. At step 9650, a decision is made whether to send a message in the form of a digitally signed EC. For example, the recipient may wish to send the original EC back to the original sender, so as to have the original sender digitally sign the original contract document so that the terms of the contract remain the same as when they were originally sent. If the decision at step 9650, the process returns to step 9050 and begins again with the original sender deciding whether to send another EC. For instance, if the legitimate owner of the device used to sign the original EC did not send it, the sender may choose not to send another EC at step 9050. If this is the decision, the process proceeds to step 9055, where an evaluation is made as to whether an EC is present to be received. If so the process proceeds to step 9400 and receives the EC, and the process continues as already described. If there is not an EC present to be received, the process terminates.

Returning to discussion of the evaluation performed at step 9550, if the business rules were satisfied by the verification status indicator in the original EC, the subject matter of the EC is acted upon at step 9600. Satisfaction of the business rules typically implies that the verification status indicator provides to the recipient an indication, with a certain level of confidence that the sender of the EC assented to the terms of the contract document contained in the EC. The verification status indicator provides this confidence because it indicates that valid verification data was entered into the device used to sign the EC within a predetermined period prior to the signing. Furthermore, the if the business rules require that the DS flag be set to zero, the verification status indicator indicates that valid verification data was entered in connection with the signing of the particular EC that was evaluated by the business rules. Thus, the verification status that satisfies the business rules indicates that the legitimate owner of the device used to sign the EC performed an overt act in order to cause the device to digitally sign the EC.

If the business rules were satisfied at step 9550, the action upon the EC subject matter will typically be to accept the offer, if the EC contains an offer. If the EC contains an acceptance, the action may be to ship ordered goods along with an invoice. Or, the action to the acceptance may be inaction, as the offer was accepted and performance begins as a matter of course in accordance with the terms of the contract. After the action at step 9600, if any, is performed in response to the terms of the received EC, a determination is made whether to send another EC at step 9650. If, for example, the received EC was an offer, the action taken at step 9600 in response to the EC may be to send an acceptance in the form of another EC. If so, the process follows the "Y" path and the process returns to step 9050, where it continues as described above. If the decision to send another EC at step 9650 is no, the process follows the "N" path, and ends.

PriMR without ABDS

Figure 10:
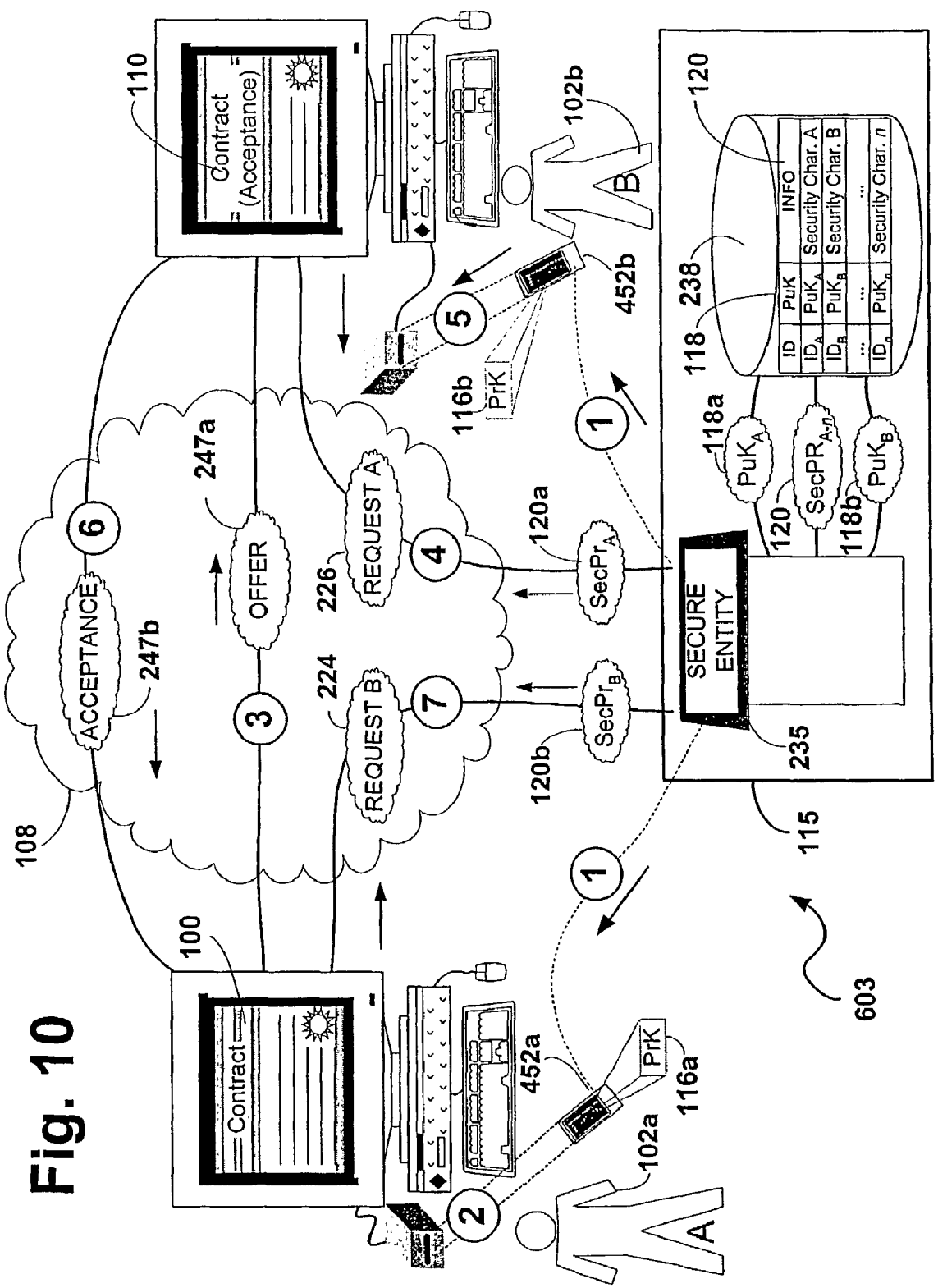
FIG. 10 illustrates a contracting scenario that uses a security profile of a device.

Turning now to FIG. 10, a public-key-linked information system 603 used to conduct e-contract transactions is shown, wherein a network, preferably the Internet 108, may be used to transmit and receive messages between the contracting parties. Beginning at step 1, private keys 116a and 116b are manufactured into devices 452a and 452b in a secure environment 115 by secure entity 235. Devices 452a and 452b, and their respective private keys 116a and 116b of asymmetric key pairs contained therein, are distributed to contracting parties offeror 102a and offeree 102b, who use the devices to generate digital signatures. At the time of manufacturing of the devices, the public keys 118a and 118b of the key pairs are stored in a secure database 238 that is preferably maintained in secure environment 115, which also contains the secure entity 235. Such a secure entity 235, secure database 238 and secure environment 115 are described in detail in the incorporated PRiMR Applications.

Although the private keys 116a and 116b for devices 450a and 450b do not necessarily have to be manufactured and sent simultaneously, the processes of distributing the devices to the contracting parties from secure entity 235 are shown in the figure as a single step for illustration purposes. Thus, multiple parties may have separate devices, each device being particular and personal to each separate party, and may receive the devices containing private keys corresponding to each stored public key at different times. In addition to sending devices containing private keys 116a and 116b, and storing public keys 118a and 118b, secure entity 235 stores information pertaining to the devices in secure database 238. This information may contain, but is not limited to, the type of device, i.e. PC, PDA, etc., the date of manufacture of the device, the location of manufacture and the type of data, if any, that the device is capable of accepting to authenticate a user or sender and their intent in digitally signing an EC. Such examples of data are referred to as a security characteristic of a device and are collectively referred to as a security profile 120 for a particular device. Thus, upon issuing devices having public keys and storing the corresponding public keys, secure entity 235 may also stores security profile information 120 at step 1. Thus, the security profile 120 of each device is stored to secure database 238 and linked to the corresponding public key associated with each device.

In such a scenario where each party has a separate device that is particular and personal to that party, each party takes advantage of the securely maintained database 238 when the parties form a contract with one another. For example, if an offeror party 102a using device 452a decides to make an offer 100 to offeree party 102b, the offer may be sent electronically in the form of an EC 247a to the offeree. The offeror uses the private key of device 452a to digitally sign an EC containing the terms of a contract offer at step 2. The EC 247a is sent from the offeror 102a to the offeree 102b at step 3. Since the offeree 102b typically will want to know how much confidence to have in the authentication of the sender of EC 247a, the offeree 102b may wish to send a request 226 to secure entity 235 at step 4, to retrieve the security profile of the device 452a used to digitally sign the EC 247a.

Upon receiving the request 226 which may be an EC from the offeree 102b, the secure entity 235 accesses the secure database 238 and retrieves the information linked to the public key 118a that was sent with the request, and returns the security profile 120a corresponding to public key 118a to requestor-offeree 102b. Alternatively, the security profile can be retrieved based on an account identifier the request 226. Thus, offeree 102b can make an informed decision as to the likelihood that the device 452a used to send the offer EC 247a was fraudulently used or used by someone other than the sender identified in the EC. This provides the benefit that the offeree 102b may choose not accept the terms of the offer 100 without assurance that the sender of the offer EC 247a is the party identified in the EC. Assurance is provided by the security profile 120a because the offeree 102b can evaluate the security profile to determine whether the device 452a is of secure enough type such that it is incapable of being compromised and the private key 116a contained therein being learned. If the device 452a is highly secure, it cannot be electrically or physically disassembled such that the private key 116a can be determined, and the offeree 102b is provided assurance that the EC 247a was digitally signed by the legitimate owner thereof. This is especially beneficial when, for example, acceptance may be carried out by performance of the contract terms of offer 100, i.e. shipping goods ordered in EC 247a to the offeror 102a. Thus, the offeree 102b is protected from having to fruitlessly try to prove later that the party identified in the EC 247a is actually the party who sent the EC, and not someone who had stolen or otherwise unlawfully used the private key 116a from device 452a to send the EC.

If acceptance of offer 100 may not be carried out by performance, the offeree 102b may accept the offer by sending an acceptance 110 in the form of another EC. This would typically involve forming a message and digitally signing the message using device 452b, as shown at step 5. Then, the EC 247b is sent to the original offeror 102a at step 6. Similar to the offeree 102b receiving the offer EC 247a, upon receiving the acceptance EC 247b, the original offeror 102a may request the security profile of the device 452b from secure database 238 at step 7. As discussed above, this security profile may be used to determine whether the trust that the sender of the EC 247b was actually the sender identified in the EC, and consequently, whether to rely on the terms in the acceptance 110 of offer 100.

Process for PriMR without ABDS

Figure 11:
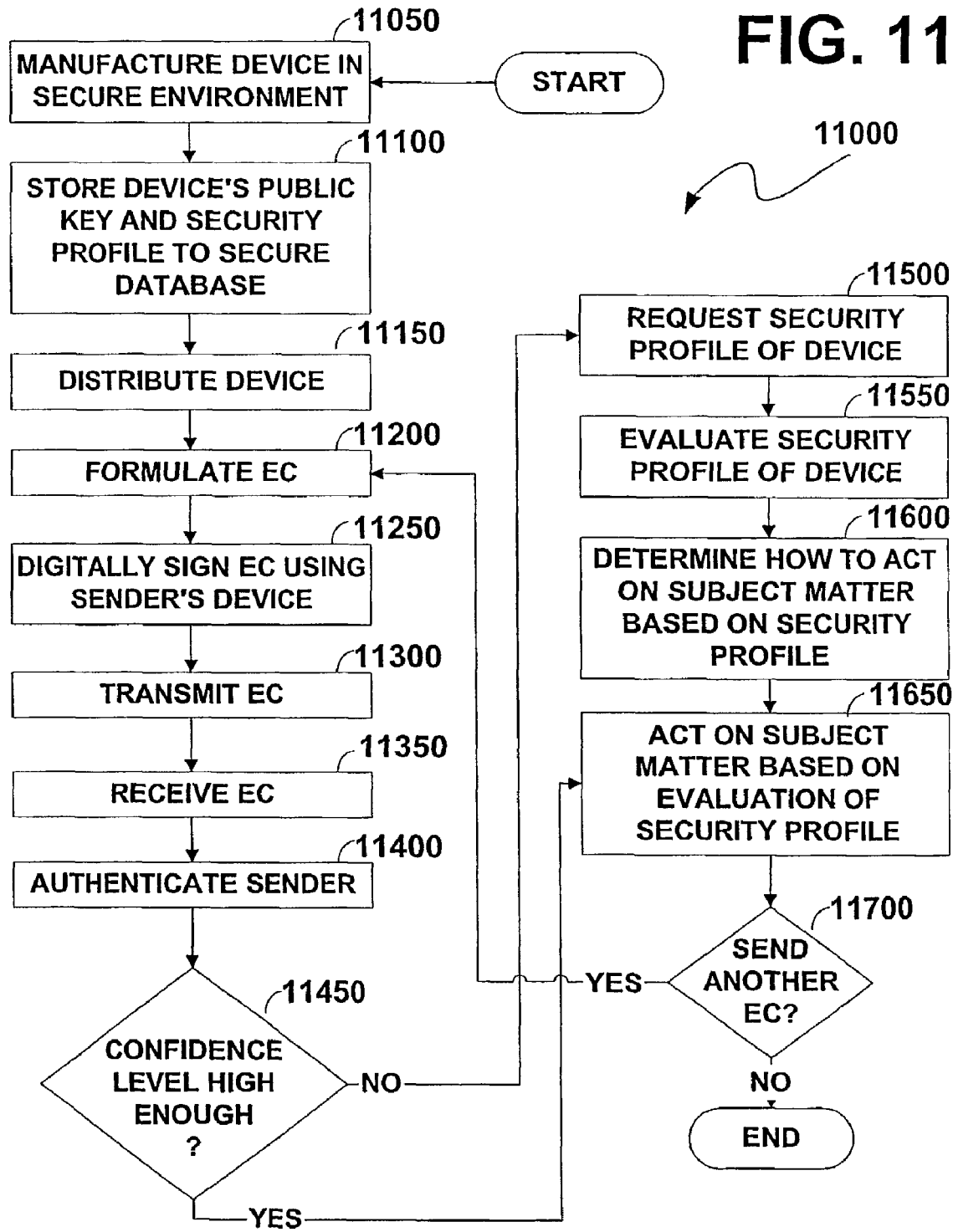
FIG. 11 illustrates a flow diagram depicting a process for using a device that has a security profile in a contracting scenario.

Turning now to FIG. 11, a flow diagram for using a security profile of a device to raise the confidence in a recipient of the authentication of a sender and a message of an EC is illustrated. As discussed above, a device personalized to a particular individual or entity may be used to digitally sign an EC that contains a message, the subject mater of which is a contract document. Furthermore, if the device is manufactured in a secure environment, as discussed above and in the incorporated PRiMR Applications, a security profile for the device may be generated at the time of manufacture and thereafter maintained in a secure environment. The security profile may then be used by a party to a contract that receives an EC that has been signed by a legitimate owner of a contract scenario to increase the receiving party's confidence in the authentication of the sender and of the message contained in the EC.

The illustrated process 11000 begins with manufacturing of a device at step 11050. The device is preferably manufactured in a secure environment such that the private key contained in the device is not divulged and not retrievable therefrom. When an EC is digitally signed, the private key is not transmitted from the device. Rather, the message of an EC to be digitally signed by the private key contained within the device is transmitted into the device, whereupon the message is signed and then transmitted back out of the device as a digital signature. Thus, when a recipient receives an EC signed by the device, and successfully authenticates the sender of the EC by verifying the digital signature, the recipient has a confidence level that the device was used to sign the EC.

However, although authenticating an EC provides confidence that a particular device was used to sign an EC, information pertaining to the degree to which the private key of the device is secure from a hacker, for instance, would provide the recipient a higher level of confidence. This is because if a device is manufactured in bulk, and does not protect the private key contained therein from physical of electrical intrusion that may result in the private key being divulged, the key may potentially be used by an imposter posing as the legitimate owner of the device. Thus, merely authenticating an EC by decrypting and performing a hash of the message of the EC may not provide as high a level of confidence in the authenticity of the sender as the recipient may wish. Even if the device that signs an EC is manufactured to high standards with respect to its impenetrability in protecting the private key from a hacker, and is manufactured with the utmost security as in ensuring that the private key is not discovered and/or recorded during its manufacture, the recipient of an EC signed using the device may not be aware of the standards to which it was designed and manufactured. Therefore, a security profile that is obtainable by a recipient of an EC with regard to the device used to sign the EC is desirable so that the recipient may evaluate the security profile to determine the risk in believing that the private key of the device was not copied, and thus used fraudulently, for example, by a hacker/imposter.

Accordingly, after manufacture, the security profile of the device, as described above and in further detail in the incorporated PRiMR Applications, is stored to a secure database maintained in a secure environment at step 11100. The secure environment is preferably the same secure environment in which the device was manufactured. In addition, the public key that corresponds to the private key of the device is also stored to the database, which is then indexed by public key. After the security profile and public have been stored to the secure database, the device is distributed to the legitimate owner at step 11150. Then, after receiving the device, the owner may formulate an EC to send to a recipient at step 11200. The subject matter may be an offer, an acceptance, or other contract document as discussed elsewhere herein.

When the subject of the EC has been formulated, the device is used to digitally sign the EC at step 11250 using the private key of the device. The method by which the device is used to sign the EC is not limited to any one method, but in the preferred method, the device is a card that is inserted into a card reader, the card reader being electrically connected to a PC. Thus, the subject matter of the EC will preferably be formulated using the PC, and will then be signed by the private key of the device while the device is inserted into the reader. Upon signature of the EC by the device, the EC is transmitted to the recipient, typically via a network, which is preferably the Internet, for example.

Upon receipt of the EC at step 11350, the recipient authenticates the sender of the EC at step 11400. When the authentication has been performed, the sender decides at step 11450 whether the confidence level in the security of the private key that results from merely decrypting and performing a hash of the message in the EC is acceptable before acting upon the subject matter of the EC. If yes, the process follows the "Y" path and the recipient acts on the subject matter of the EC at step 11650. Such action may be an acceptance, performance of the contract terms of an accepted offer, etc. In addition, the recipient may choose to do nothing. After acting at step 11650, if the recipient chooses at step 11700 not to send another EC to the original sender, the process ends. Or, if the EC was an offer, the recipient may choose at step 11700 to accept the offer by sending an acceptance in the form of another EC.

If the recipient decides at step 11450 that there is not enough confidence in the authenticity of the sender to act on the subject matter of the EC, the recipient may request a security profile of the device at step 11500 from the secure database based on the public key used to verify the digital signature. Upon receipt of the security profile of the device used to send the EC, the recipient evaluates at step 11550 the security profile to determine whether to trust the authentication of the sender. For example, if the security profile of the device indicates that the device is impenetrable, such that the recipient can assume with a high level of confidence that the private key could not have been copied form the device. Thus, based on evaluation, the recipient can decide how to act on the subject matter of the EC at step 11000. For example, if the security profile indicates that the device securely protects the secrecy of the private key, the recipient may ship goods to the sender if the EC subject matter was an offer to buy the goods. After determination of how to act, the recipient acts on the subject matter of the EC at step 11650 and the process continues as discussed above.

Contract Scenario Using PRiMR and VS without ABDS

Figure 12:
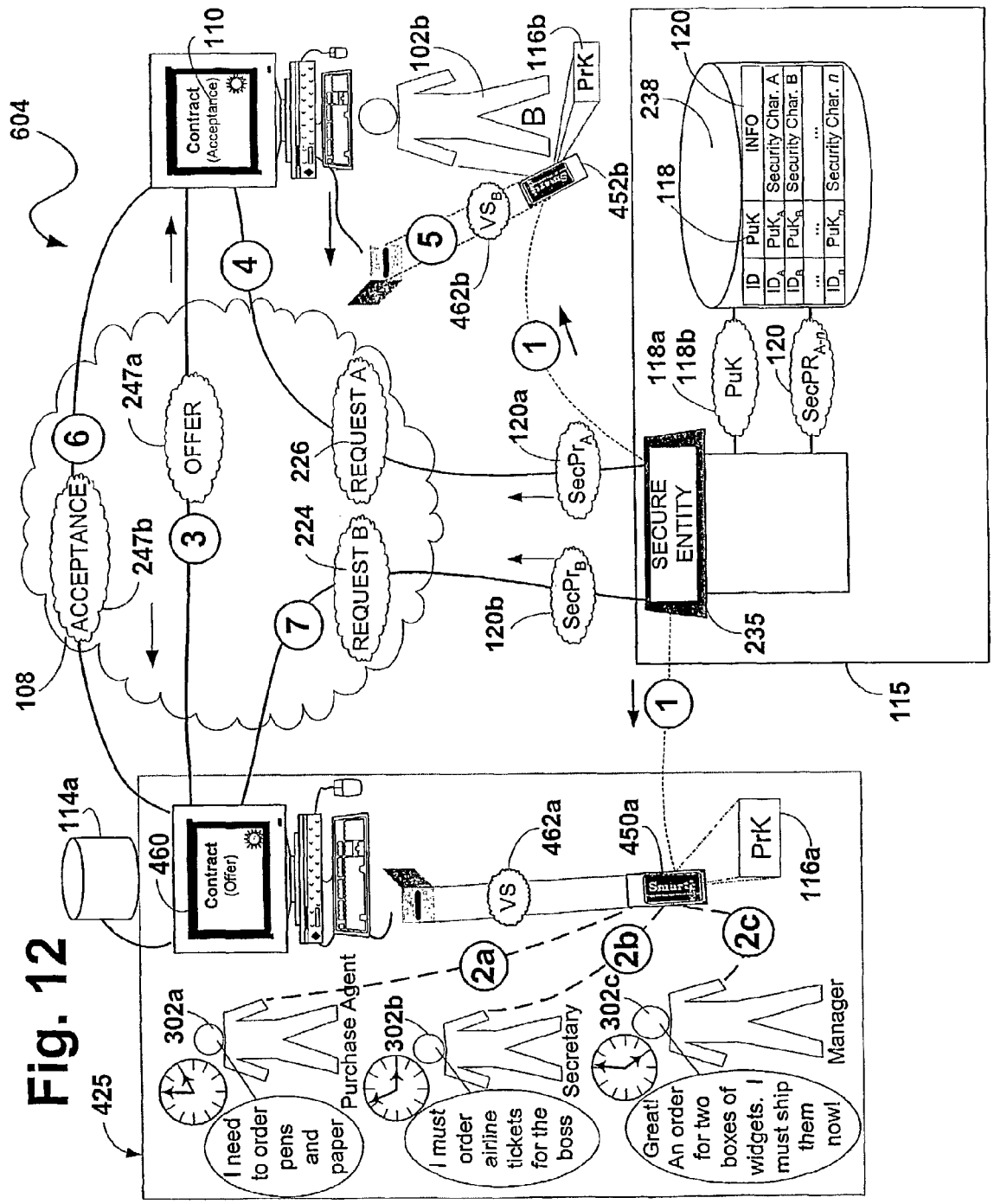
FIG. 12 illustrates a contracting scenario that uses a secure input device to authenticate an EC that has authenticated a sender and the sender's message.

Turning now FIG. 12, a system 604 is illustrated that uses a security profile and a verification status indicator to facilitate e-contracting, wherein a network, preferably the Internet 108, may be used to transmit and receive messages between the contracting parties. For example, business rules of the recipient of an EC may require that a device used to generate an EC was manufactured in a secure environment 115, as described in the incorporated PRiMR Applications. The business rules may use certain parameters of a verification status indicator to determine whether valid verification data was input to the device before the EC was generated, and, whether the EC was the first EC generated by that particular device since the verification data was input. Verification data and verification status indicators are described in detail in the incorporated VS Applications. Thus, in the aspect shown in FIG. 12, each of the verification status indicator aspect and the security profile aspect contribute to the level of confidence a recipient of an EC may place on the authenticity of the EC's sender, as identified in the EC.

Beginning at step 1, shown in the encircled numeral 1, private keys 116A and 116B asymmetric key pairs are stored in devices 450a and 450b, which are used to encrypt messages to form digital signatures. The private key 116a is preferably stored to the device 450a when the device is manufactured. The device 450a is preferably manufactured in a secure manufacturing facility 235 as described in detail in the incorporated PRiMR Applications. Upon manufacture of the devices 450a and 450b in the secure facility 235, the public keys 118a and 118b of the key pairs are stored in a database 238 that is preferably maintained in a secure environment 115, which also contains the secure facility. Although these devices 450a and 450b are not necessarily manufactured simultaneously, the process of manufacturing the devices is shown in the figure as a single step 1 for purposes of illustration.

Thus, multiple parties may have separate devices, each device being particular and personal to each separate party. Such a scenario where each party has a separate device that is particular and personal to that party takes advantage of the securely maintained database 238. For example, if an employee of offeror entity 425 decides to make an offer 100 to offeree party 102b, the offer may be sent electronically in the form of an EC 247a to the offeree.

After the devices have been manufactured, the offeror entity 425 prepares to make an offer 100 and send it as an EC to the offeree 102*b*. The actual individual making the offeror 100 may be any of the three individuals agent 302*a*, secretary 302*b* or manager 302*c*, as shown in the figure and described in detail in the discussion above of FIG. 8. Thus, the offer 100 is converted into a message and encrypted in forming a digital signature using the private key 116*a* of device 450*a* at steps 2*a*, 2*b*, or 2*c* depending upon which individual is making the offer. The three individual parties are shown to illustrate the use of the verification status aspect of the invention, as described above in connection with FIG. 8. The verification status indicator is generated by device 450*a* at the time the private key is used to generate the digital signature of EC 247*a*. The verification status is sent as an indicator 462*a* as discussed in reference to FIG. 8 and more fully in the incorporated VS Applications. The indicator 462*a* is used to provide assurance that the sender of the EC 247*a* intended to be bound to the contract offer 100, as discussed above in reference to FIG. 8.

After the EC 247*a* has been formulated at step 2*a*, 2*b*, or 2*c* to include the offer message, the digital signature, an identifier and the verification status indicator 462*a*, the EC is sent to the offeree 102*b* at step 3. Upon receiving the EC 247*a*, the offeree 102*b* determines whether to accept or reject the offer 100. The offeree 102*b* then authenticates the sender as the offeror entity 425 by retrieving the offeror's public key 118*a* based on the identifier contained in the EC 247*a*, thereby providing confidence that the offeror sent the EC.

However, the offeree 102*b* may desire more assurance that the sender is the offeror entity 425. Accordingly, the offeree 102*b* sends a request 226 to the secure entity 235 at step 4. This request 226 is an EC requesting the security profile 120*a* of the device that was used to send the offer EC 247*a*. The creation and use of the security profile 120*a* is described in detail in the incorporated PRiMR Applications. The security profile 120*a* is contained as a record in 238 database 238 that was created at the same time the device 450*a* was created in the secure manufacturing facility 235. The security profile 120*a* provides security characteristics of the device 450*a* to the offeree 102*b*. This information is used by the offeree 102*b* to determine the level of security of the device 450*a* that was used to generate the digital signature of offer EC 247*a*. This information may include security attributes of the secure entity 235 and secure environment 115, as well as the procedures used to manufacture the device, the type of device itself and procedures used to maintain the security of the private key 116*a* during the manufacturing process. Moreover, the data may relate to the tamper-resistance of the device 450*a* and how safe the private key 116*a* is from hacking.

Continuing to describe the aspect illustrated in FIG. 12, the business rules that relate to offeror entity 425 may require a determination of the security attributes of the device 450*a* used to send the EC 247*a*. The business rules associated with public key 118*a* may require the security profile 120A in order to determine whether the device 450*a* used to generate EC 247*a* is tamper-resistant, for example. If the security profile 120*a* sent in response to request 226 indicates that the device is tamper-resistant, the offeree 102*b* is assured that the device is capable of protecting the secrecy of private key 116*a* contained therein, and the business rules have been satisfied. For example, if device 450*a* comes into the hands of someone other than the proper owner, that other someone would be unable to discern the private key through disassembly of the device. Accordingly, offeree 102*b* is reasonably assured that the device 450*a* was used to generate the digital signature of the EC, rather than some other device using private key 116*a* that may have been pirated from device 450*a*.

In addition to the security profile contributing to the overall confidence the offeree 102*b* places in the origin of the EC, the verification status indicator 462*a* indicates whether any verification data was input into the device when signing the EC 247*a*. The indicator 462*a* also indicates whether valid verification data was entered, and the DS flag is used to indicate whether the correct data was entered since the device 450*a* was reset. In addition, the verification status indicator 462*a* indicates whether invalid verification data was entered when the EC 247*a* was digitally signed by device 450*a*. Therefore, if the security profile 120*a* indicates that the private key 116*a* cannot be pirated from the device 450*a*, and the verification status indicator 462*a* sent by device 450*a* at step 2*a*, 2*b* or 2*c* indicates that valid verification data was entered into the device immediately prior to the generation of EC 247*a*, the offeree 102*b* has a high level of confidence that the person or entity that generated EC 247*a* is the person or entity that is associated with public key 118*a* in database 114*b*.

With respect to the verification indicator, the verification data parameters include a PIN or biometric data as described in the incorporated VS Applications. The security profile may also include information as to the type of verification data that the device 450*a* is capable of receiving. Thus, if the security profile 120*a* sent to the offeree 102*b* from the secure database 238 at step 4 indicates that the device 450*a* was manufactured with the capability that a PIN may be entered, the offeree is assured that someone with knowledge of the correct PIN legitimately used the device to digitally sign EC 247*a* before it was sent at step 3. In addition, the device 450*a* may have been manufactured with the capability that biometric data can be entered to further assure a recipient that the person signing the EC 247*a* with device 450*a* was the correct owner of the device. This would result in an even higher level of confidence that the legitimate owner of the device 450*a* used the device to digitally sign EC 247*a*. Thus, if the verification status indicates that valid verification data, PIN, BIO, or other type of verification data, was entered into the device 450*a*, the offeree 102*b* is assured that the EC 247*a* was digitally signed using device 450*a* by someone that legitimately possessed the device. Furthermore, the person or entity legitimately using device 450*a* to digitally sign the EC is the person or entity that is associated with public key 118A in database 114*b*. Moreover, if the security profile 120*a* indicates that the private key 116*a* cannot be compromised by electrical or mechanical disassembly or dissection of the device 450*a*, the offeree 102*b* is further assured that the sender of the EC 247*a* is the person or entity that is associated with public key 118*a* in database 114*b*.

Still discussing the aspect illustrated in FIG. 12, this high degree of confidence may be required for an offer of which the transaction's value is above a predetermined amount. Thus, if the transaction amount is small, the offeree 102*b* may only require that the public key associated with the identifier of the EC 247*a* be used to authenticate the user thereof. Furthermore, if the transaction amount is low, the offeree may not even request a security profile from the secure environment 115 at step 4. This is in order to keep costs low, as the secure entity 235 may typically charge a fee for each access of data from database 238.

However, if the transaction amount of the offer 100 is relatively large, the offeree 102*b* will typically require that the security profile 120*a* of the device used to generate the digital signature indicate that a PIN, or even biometric data, is supported by device 450a. Moreover, the offeree 102b may require that the security profile indicate that the private key 116a cannot be pirated from the device. If the security profile 120a so indicates, the offeree 102b is assured that the device was not stolen and was used by the proper owner of the device. This protects the offeree 102b because there is tangible evidence that the sender of the offer EC 247a is the owner of the device, and therefore, the offeree can prove that the sender of the message is bound to the terms of the contract 100 if the offeree decides to accept the offer.

Furthermore, in addition to the high degree of confidence as to the security of the private key 116a of the device 450a, the offeree 102b may also wish to know that the offeror entity 425 intended to be bound to the particular contract 100 that made up the subject matter of the EC 247a. This is accomplished by using the verification status aspect described in the incorporated VS Applications, that indicates the timeout status of the device and the sequence status of the device as described above in reference to FIG. 8. Thus, in the scenario described in reference to FIG. 8, the device 450a sends as part of the EC 247a an indicator that indicates whether the device has timed out. In addition, the indicator may indicate the DS flag of the device, which is incremented every time the private key 116a of the device 450a is used to generate a digital signature of an EC. As described above in reference to FIG. 8, the timeout and DS flag parameters are used to indicate that the sender actually intended to send the actual contract document 100 that was contained in the EC 247a.

In accepting the terms of the offer, the acceptance 110 may be made by a process similar to the process described above regarding the making of the offer. Offeree 102b formulates an acceptance 110 into an EC 247b by using the private key 116b from device 450b to digitally sign the EC at step 5. Then, the acceptance EC 247b is sent to the original offeror entity 425 at step 6. Upon receiving the acceptance 247b at step 6, the offeror entity 425 may then request a security characteristic profile 120b from the secure environment entity 235 at step 7. This is similar to the process at step 4 where the offeree 102b requested the security characteristic profile 120a of device 450a that was used to digitally sign EC 247a. Similar processes of accessing the security characteristics profile and verification status indicator of device 450B are performed as were performed by the offeree 102b with respect to offer EC 247a.

Upon authentication of the sender of EC 247b and determination of the security characteristics and verification status indicator of device 450b in accordance with business rules that are associated with the sender of EC 247b, the offeror entity 425 is provided confidence that a valid contract has been formed. Thus, performance of the terms of the original contract offer 100 can begin. Just like the offeree 102b can reliably determine that the offeror entity 425 intended to send the offer 100, and is thus bound to the terms thereof, the offeror entity can reliably determine that the offeree intended to assent to the terms of the acceptance 110.

Information related to the security of the device is maintained in secure database 238. This information, referred to as a security profile 120, is maintained securely, preferably by the same entity 235 that manufactured devices 450, such that the information provides confidence that the security profile is accurately used. This secure manner in which the database is maintained increases the confidence that, for example, a low security device is not fraudulently identified as having very high security. Furthermore, business rules that are associated with a particular public key 118 that correspond to the sender of an EC may require that the security profile indicate that the private key 116 is undetectable through disassembly or dissection of the device. In addition, a verification status indicator 462, which is part of an EC, indicates whether valid verification data was entered to indicate that the appropriate user, to which the device 450 is assigned, used the device to digitally sign the EC. Moreover, the verification status indicator includes a DS flag that indicates whether the device has been used since the last time it was reset or valid verification data was entered. Therefore, the combination of a security profile, satisfaction of business rules, and a verification status indicator, provides a recipient a high degree of confidence that the sender of an EC is who they say they are and that they intended to the send the message contained in the EC. Thus, system 604 provides a method and system for reliably establishing confidence and tangible evidence that offeror entity 425 and offeree 102b mutually assented to the terms of the contract formed by the agreement represented by the offer 100 and the acceptance 110 thereof.

Process for Contract Scenario Using PriMR and VS without ABDS

Figure 13:
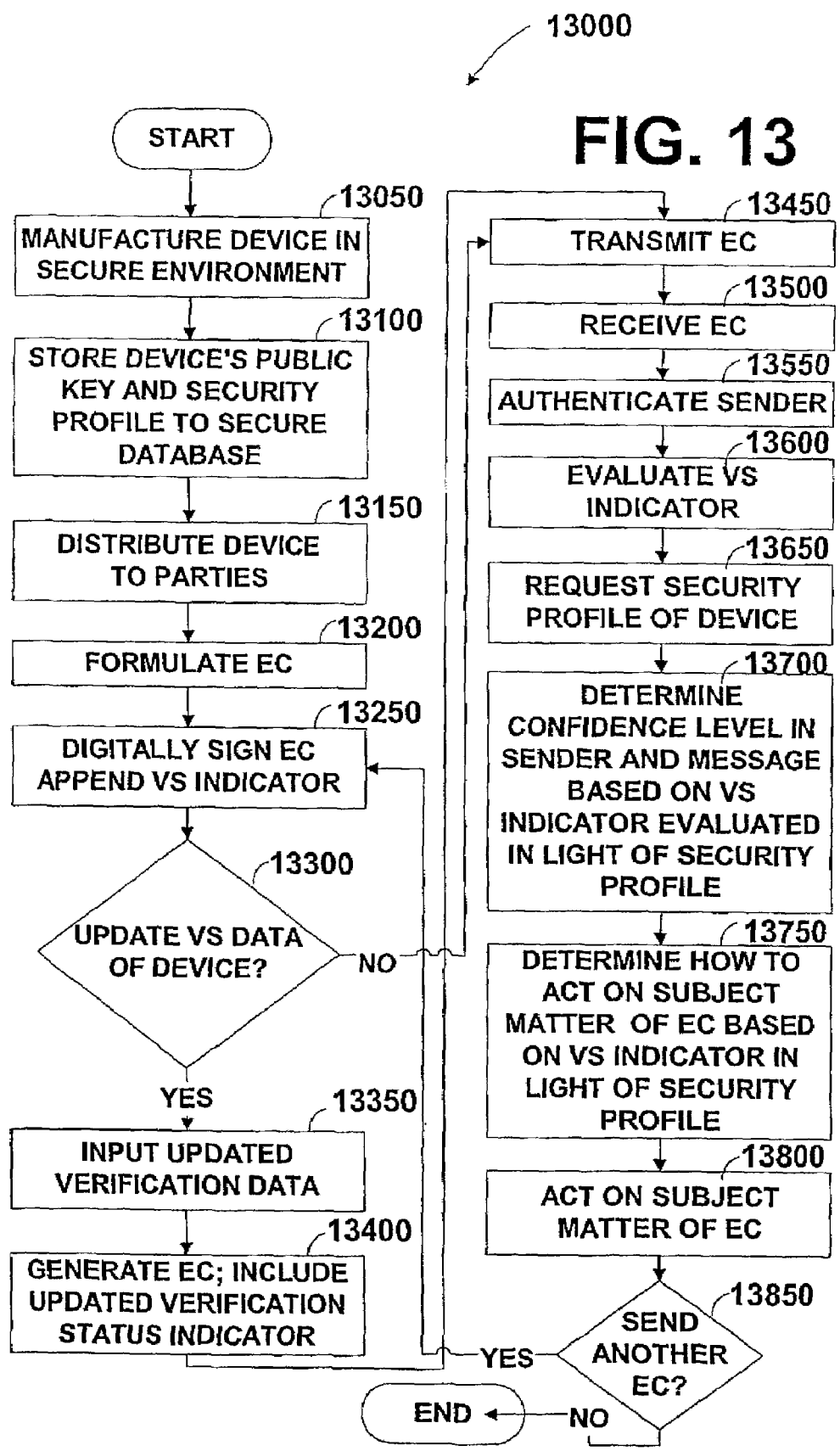
FIG. 13 illustrates a flow diagram depicting a process for using a secure input device to authenticate an EC sent using a sender's private key.

Turning now to FIG. 13, a flow diagram for a process 13000 is illustrated for authenticating a sender of an EC and the message contained therein, wherein the process creates, updates and evaluates a verification status indicator, as described in reference to FIG. 8, FIG. 9, and as described in detail in the incorporated VS Applications. The process also evaluates a security profile as described in reference to FIG. 10, FIG. 11 and as described in detail in the incorporated PRiMR Applications.

The process begins at step 13050 where a personal device is manufacture in a secure environment. When the device is manufactured in the secure environment, a public key that corresponds to the device's internal private key is stored at step 13100. Also at step 13100, the security characteristics are stored to a secure database maintained in a secure environment, such that a devices public key and the devices security characteristics are associated together. After the public key and corresponding security characteristics of a device have been stored to the database, the device is distributed to a user at step 13150.

After the user receives the device, that user may wish to formulate an EC that includes a contract document, for example, as the subject of a message contained therein at step 13200. When the message has been formulated, it is digitally signed using the devices public key at step 13250. The EC may also contain a verification status indicator as described herein. If the user wishes to update the current verification status of the device, the decision to do so is performed at step 13300. If the user decides not to update the verification status of the device at step 13300, the process proceeds to step 13450. However, if the user decides to update the verification status of the device at step 13300, the updated data is input into the device at step 13350. Then the EC, including the updated verification status indicator, is digitally signed at step 13400 and transmitted to a recipient at step 13450.

Next, the recipient receives the EC at step 13500 and authenticates the sender at step 13550. After the sender has been authenticated, the recipient evaluates the verification status indicator at step 13600. This evaluation may be performed in light of predetermined business rules, as discussed elsewhere herein. If the business rules need a security profile in order to raise the confidence level of the authentication of the sender, a security profile of the device is requested from the secure entity at step 13650. Then, the level of confidence in the authentication is determined at step 13700 based on the verification status indicator evaluated in light of the requested security profile as described elsewhere herein. When the confidence level is determined, the business rules determine how to act on the subject matter of the EC based on the evaluation performed at step 13700 on the verification status indicator in light of the security profile.

After the determination of how to act is determined, the subject matter is acted on in accordance with the determined confidence level as applied by the business rules at step 13800. If the recipient of the EC wishes to send an EC in response to the EC received at step 13500, an acceptance to an offer for example, the decision is to send another EEC is made at step 13850. If the decision is made to send another EC, the process returns to step 13200 where the process continues as described above, with the original recipient now being the sender of the new EC, and the original sender becoming the new recipient of the EC. If the recipient decides at step 13850 not to send another EC, the process ends.

System Using a Personal Device in Conjunction with a Secure Input Device

Figure 14:
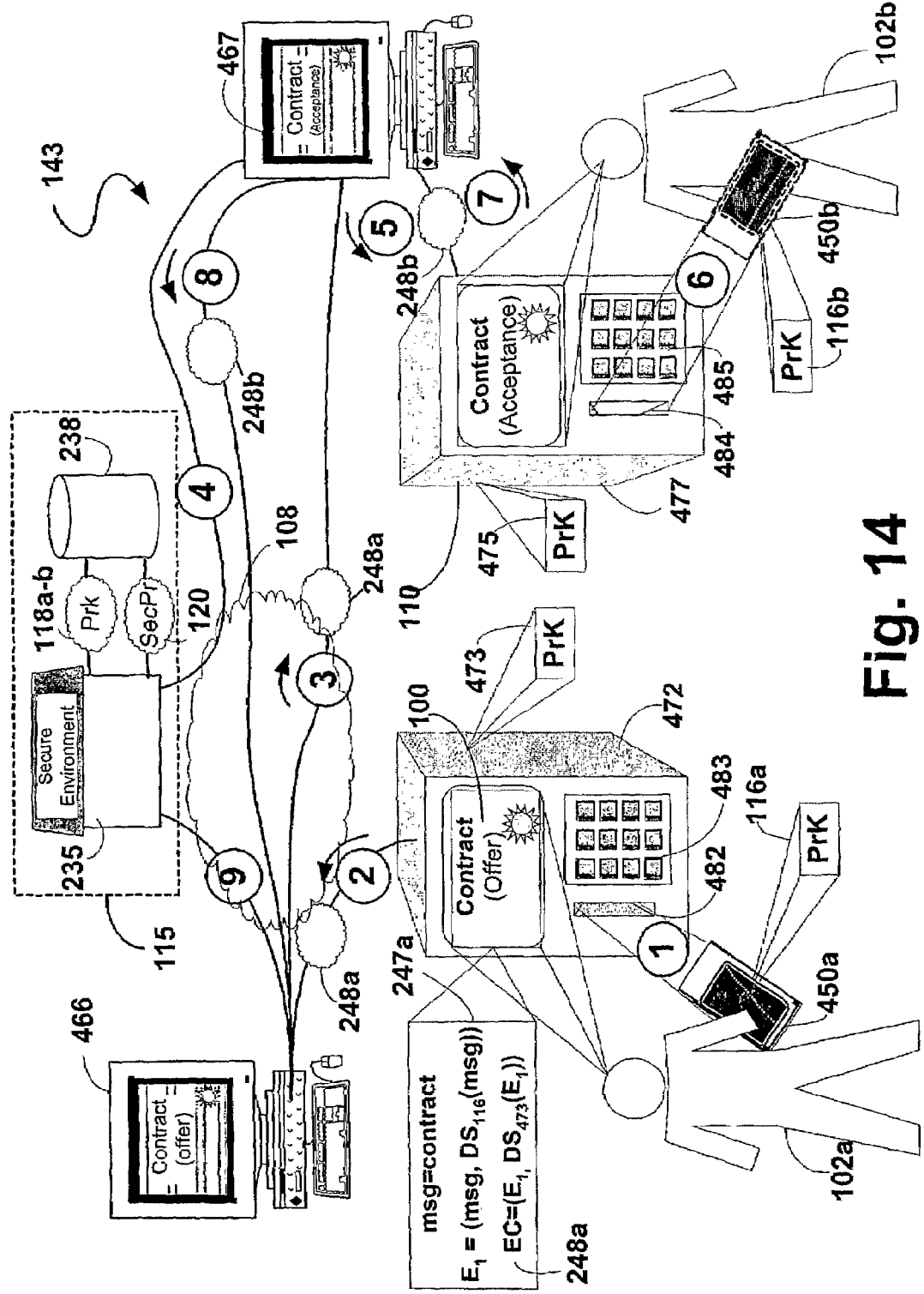
FIG. 14 illustrates a contracting scenario that uses a combination of a verification status indicator and a security profile.

Turning now to FIG. 14, a system 143 is illustrated that uses secure input devices 472 and 474. The secure input devices 472 and 474 provide for 1) secure entry of PIN and/or BIO verification data (for instance, precluding a PC virus eavesdropping that could replay the data as part of a fraudulent transaction) 2) secure display of EC message to be signed (precluding a PC virus displaying a message different than the message to be signed). Moreover, when either secure input device 472 or 474 signs an EC using their respective private keys 473 or 475 respectively, the recipient has evidence of the security of the sender's digital signing environment.

Note that if a device is ever used in a non-secure environment, there is an increased possibility that the PIN and/or BIO verification date may have been compromised and could later be used in fraudulent transactions. The immediate risk possibility is whether the current EC was signed in a secure environment. There is also increased risk if the device was ever used in the past in an insecure environment.

In high security situations, the recipient may want to know that a high security input device is being used in conjunction with the input of multiple BIO verification data. Furthermore, multiple inputs of the same biometric factor (thumb, left index, iris, etc.) should all have slightly different matching values. Therefore, identical BIO verification status matching values can be an indication of a fraudulent transaction.

Accordingly, the system 143 illustrated in FIG. 14 provides a secure input device for inputting verification data. For purposes of example, when the offeror 102a formulates an offer to be sent using PC 466, secure input device 472 is used to sign the offer EC to be sent to the offeree/recipient 102b. To begin the signing process, offeror 102a inserts device 450a, which is personalized to the sender and contains private key 116a, into slot 482 of secure input device 472 at step 1. The contract offer 100 is then displayed on the display of device 472. After the device 450a has been inserted into slot 482 and while the document terms are displayed on display 476, the offeror 102a enters verification data, such as a PIN for example, using keypad 483, which is part of secure input device 472. The verification data is then securely input into personal device 450a, from which a verification status indicator is generated, as described above and in the incorporated VS Applications, to become part of EC 247a. EC 247a is signed by the sender's 102a device 450a, as previously described elsewhere herein, using private key 116a. After EC 247a has been generated internal to the secure input device 472, EC 247a is then enveloped by another EC 248a, which treats EC 247a as a message, much the same way the subject matter of the contract offer 100 is treated as a message in generating EC 247a. Device 472 uses its private key 473 to digitally sign EC 248a, which is then sent to PC 466 at step 2. Upon receiving the EC 248a, the PC 466 prompts the sender to transmit the EC. If the sender chooses to send the EC 248a, the EC 248a is sent to offeree/recipient 102b at step 3, preferably via the Internet 108.

When the recipient 102b has received and authenticated sender and message of EC 248a and then EC 247a, the ECs may be evaluated in accordance with business rules, in a manner described elsewhere herein, to determine what level of confidence to assign the EC 248a. As described above, security profiles of personal device 450a and secure input device 472 may be requested from secure entity 235 by the recipient 102b at step 4. Upon the secure entity 235 retrieving the requested security profiles from secure database 238, the security profile(s) are sent to the requesting party 102b. Upon receiving the requested security profiles of the personal device 450a and secure input device 472, the recipient 102b determines what level of confidence to place in the authenticity of the ECs 248a and 247a. If the security profile that corresponds to secure input device 472 indicates that the secure input device is capable of receiving verification data that corresponds to a personal device inserted into the secure input device, and is also capable of securely displaying the subject matter of a message to be signed with the inserted personal device and sent to a recipient as an EC, the recipient 102b has a high confidence level that the sender of EC 247a performed an overt act in connection with the use of personal device 450a to sign the subject matter of EC 247a.

Furthermore, if the security profile corresponding to personal device 450a indicates that the device is impervious to attack by a hacker, for example, the recipient is assured, to a high confidence level, that the legitimate owner of device 450a used the device in conjunction with secure input device 472 to sign EC 247a. This assumes, of course, that the verification status indicator indicates that valid verification data was entered into keypad 483 while the contract offer 100 was displayed on display 476 while the sender was performing the overt act of entering a correct PIN, for instance. Thus, the recipient is assured to a high confidence level that the offeror 102a was the sender of EC 248a, and thus 247a. Moreover, the recipient is assured to a high level of confidence that the sender intended to be bound to the terms contained in the subject matter of the EC 247a.

When EC 247a and EF 248a have been authenticated, the manifestation of intent by the sender thereof having been determined through evaluation of the verification status indicator in light of the security profiles for the personal device 450a and the secure input device 472, the offeree 102b in the example may analyze the subject matter of EC 247a on PC 467. If a decision is made to accept the offer 100, the terms thereof are displayed on the display of secure device 474 as an acceptance 110 at step 5. Then, the offeree 102b performs the steps 6, 7 and 8, which are similar to the previously described steps 1, 2 and 3. After the original offeror 102a receives the EC 248b, which has a similar structure to that of EC 247a, EC 248b and EC 247b are authenticated and the security profiles of personal device 450b and secure input device 474 are requested of the secure entity based on the public keys that correspond to private keys 116b and 475, which are contained in personal device 450*b* and secure input device 474 respectively. These security profiles are evaluated to determine whether the legitimate owner of the device 450*b* caused its private key 116*b* to sign EC 247*b*, whether offeree 102*b* performed an overt act as a manifestation if intent to sign the subject matter of EC 248*b*, and whether the secure input device can confidently be relied on to correctly and securely associate the manifestation of intent by offeree 102*b* with the subject matter contained in EC 248*b*.

Process for Using a Personal Device in Conjunction with a Secure Input Device

Figure 15:
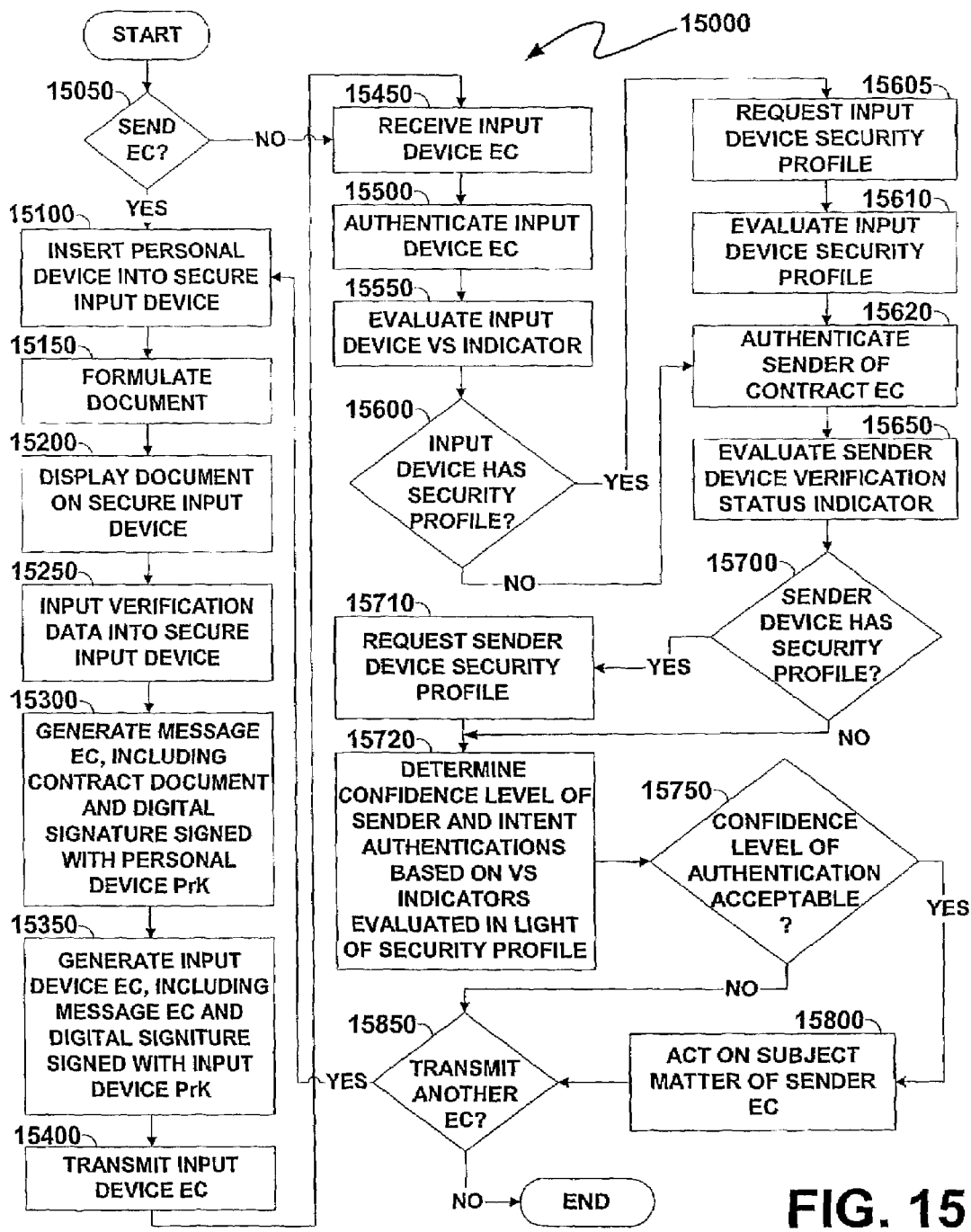
FIG. 15 illustrates a flow diagram depicting a process for using a combination of a verification status indicator and a security profile in a contracting scenario.

Turning now to FIG. 15, a flow diagram of a process 15000 for using a personal device in conjunction with a secure input device is illustrated. The first step in the illustrated process is to determine whether an EC is to be sent. If not, the process proceeds to step 15450 where an EC from a secure input device is received. If an EC is to be sent, the process proceeds to step 15100 where an individual or entity that will be sending an EC inserts a device personalized to the sender into the secure input device. After the device has been input into the secure input device, the subject matter of the EC is formulated at step 15150. This subject matter, a contract offer for example, may be formulated on a PC, for example, that is connected to the secure input device. When the subject matter has been formulated, the terms of the offer are displayed on a display portion of the secure input device. After the offer has been displayed on the secure input device, the sender of the enters verification data into an input portion of the secure input device at step 15250. For example, if the verification data being entered is a PIN, the input portion may comprise a numerical keypad. When the verification data has been input, the secure input device generates a first EC, a message EC for example, that includes the subject matter of the offer and that is digitally signed using the private key of the inserted personal device at step 15300. After the message EC has been generated, the secure input device, treating the message EC as a separate a discrete message, generates a second EC, a input device EC, using the private key of the secure input device to digitally sign the second EC, wherein the second EC comprises the message EC.

After the second EC has been generated at step 15350, it is transmitted to a recipient at step 15400. The recipient receives the second EC at step 15450. Upon receipt of the second EC, the recipient authenticates the second EC at step 15500. After the second EC has been authenticated at step 15500, the recipient may evaluate the verification status indicator contained in the second EC, if such an indicator is so contained, at step 15550. Then, a determination as to whether the second EC has an associated security profile, as described elsewhere herein, is made at step 15600. If it is determined at step 15600 that the second EC does not have a security profile associated therewith, the process proceeds to step 15620, where the sender of the first message is authenticated.

If, however, the second message has a security profile, the process requests the security profile of the input device from a secure entity at step 15605. Upon receipt of the requested security profile for the secure input device, the recipient evaluates the security profile of the secure input device at step 15610. After evaluating the security profile of the secure input device, the sender of the first EC is authenticated step 15620. Then the verification status indicator of the personal device used to digitally sign the first EC is evaluated at step 15650. At step, the determination is made whether the personal device used to digitally sign the first EC has a security profile. If it is determined that the personal device has a security profile, that profile is requested at step 15710 from the secure entity/facility as discussed in detail in the incorporated PRiMR Applications. When the security profile of the personal sending device used to digitally sign the first message is received, the confidence level in the authentication of the sender of the first EC is determined based on an evaluation(s) of the verification status indicator(s) of the personal device sending device and the secure input device in light of the security profiles of each device at step 15720.

Next, the confidence level determination made at step 15720 is evaluated at step 15750 to determine whether the confidence level is acceptable to allow acting by the recipient on the subject matter of the first EC. This determination at step 15750 may be made in light of business rules, but any other method known to those skilled in the art of making business decisions may also be used. If it is determined at step 15750 that the confidence level in the authentication of the sender of the first EC, as well as the confidence level in the indication of the sender's performance of an overt act as evidence of intention to digitally sign the subject matter of the first EC is acceptable, the subject matter of the EC is acted on at step 15800. If the confidence levels determined at step 15750 are not acceptable, then the process proceeds to step 15850, where a decision is made whether the recipient desires to send an EC to the original sender of the first message. The process also proceeds to step 15850 after the subject matter of the first EC is acted upon at step 15800. Thus, if the subject matter of the first message was an offer, the action taken at step 15800 may be to accept the terms of the offer. A decision may be made at step 15850 to transmit the acceptance as another EC. If so, the process returns to step 15050, and the process continues from there as described above. If the determination at step 15750 was that the confidence level is not acceptable to act on the subject matter of the first EC, then the decision to report this back to the original sender and prompt the sender to enter updated verification data before sending the subject matter again may be made in the form of another EC. If so, the process returns to step 15050. If the decision at step 15850 is to not send another EC, the process ends.

Contract Scenario Using PriMR, VS and ABDS

Figure 16:
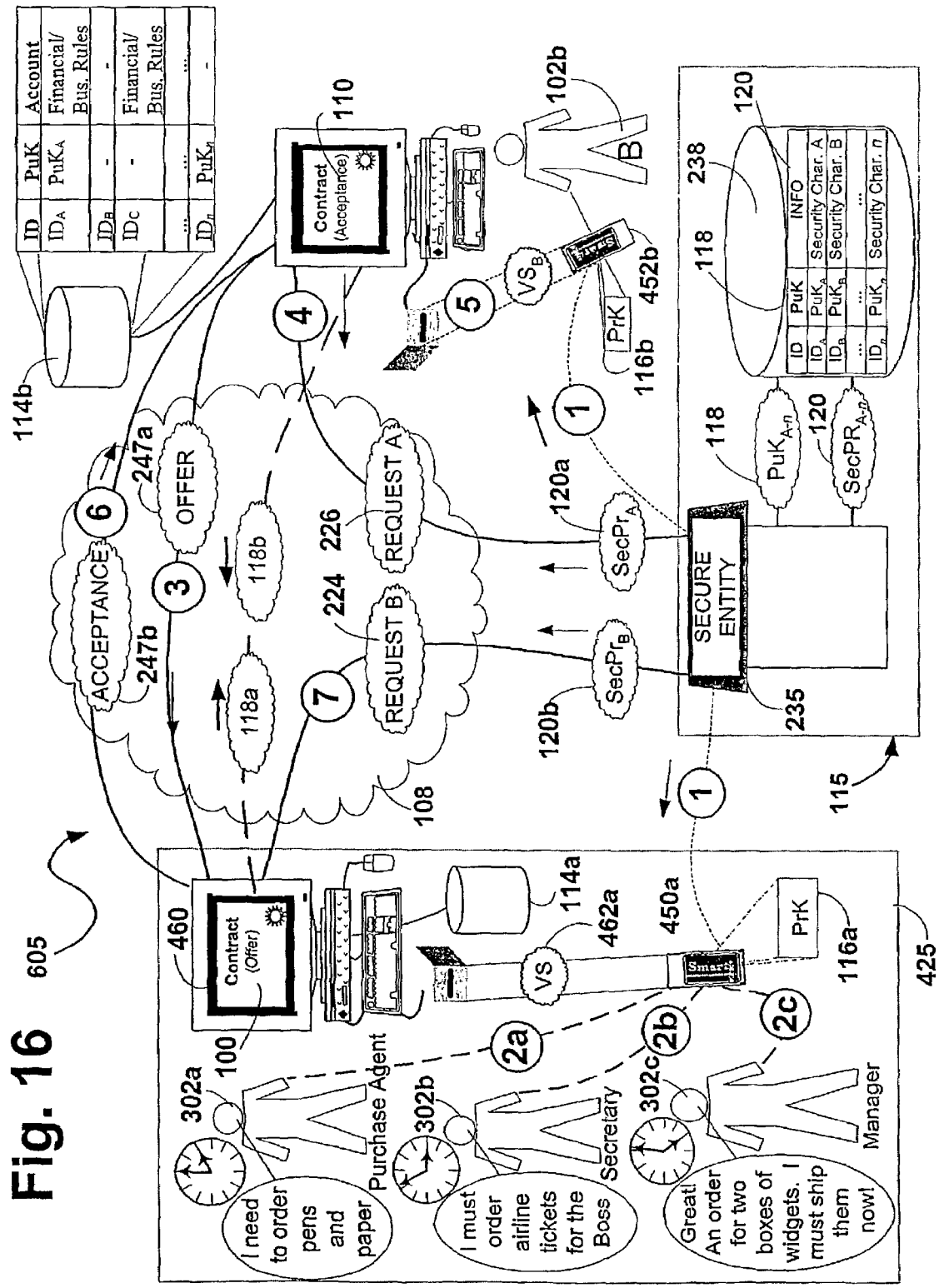
FIG. 16 illustrates a contracting scenario that uses a combination of a verification status, a security profile and an account based digital signature system.

Turning now to FIG. 16, a system 605 for electronically contracting between parties is illustrated that uses a public-key-linked security profile, a verification status indicator and an account based digital signature system as shown in the incorporated PRiMR, VS, and ABDS Applications. The system 605 may use a network, preferably the Internet 108, to transmit and receive messages between the contracting parties. The aspect uses a database maintained by one party that associates another party with that other party's account information. The account information can be any type of information, such as, for example, line of credit amount, available cash for withdrawal, and location information such as telephone number and street address of the other party, that is related to the other party.

Moreover, the account information may also include business rules that are used to determine what level of confidence to place in an EC. For example, business rules of the recipient of an EC may require that a device used to generate an EC was manufactured in a secure environment 115, as described in the incorporated PRiMR Applications. The establishment, types, uses and accessing of the account information is described in detail in the incorporated ABDS Applications. Furthermore, the business rules may use certain parameters of a verification status indicator to determine whether valid verification data was input to the device before the EC was generated, and, whether the EC was the first EC generated by that particular device since the verification data was input. Verification data and verification status indicators are described in detail in the incorporated VS Applications. Thus, in the aspect shown in FIG. 16, each of the elements, the verification status indicator aspect, the account based digital signature aspect and the public key linked security profile aspect contribute to the level of confidence a recipient of an EC may place on the authenticity of the EC's sender, as identified in the EC.

Beginning at step 1, shown in the encircled numeral 1, private keys 116*a* and 116*b* asymmetric key pairs are stored to devices 450*a* and 450*b*, which are used to generate digital signatures. The private key 116*a* is preferably stored to the device 450*a* when the device is manufactured. The device 450*a* is preferably manufactured in a secure manufacturing facility 235 as described in detail in the incorporated PRiMR Applications. Upon manufacture of the devices 450*a* and 450*b* in the secure facility 235, the public keys 118*a* and 118*b* of the key pairs are stored in a database 238 that is preferably maintained in a secure environment 115, which also contains the secure facility. Although these devices 450*a* and 450*b* are not necessarily manufactured simultaneously, the process of manufacturing the devices is shown in the figure as a single step 1 for purposes of illustration.

Thus, multiple parties may have separate devices, each device being particular and personal to each separate party. Such a scenario where each party has a separate device that is particular and personal to that party takes advantage of the securely maintained database 238 when the parties form a contract with one another. For example, if an employee of offeror entity 425 decides to make an offer 100 to offeree party 102*b*, the offer may be sent electronically in the form of an EC 247*a* to the offeree. In addition, the parties may also have formed a relationship at step 1*a* where each party has an account with the other party. Thus, each party acts as an AA for the other. Moreover, when each party established an account with the other party at step 1*a*, they provided to the other party their respective public keys 118 that correspond to the private keys of their respective devices. In the illustrated example, the offeror entity 425, represented by the office desk in the figure, provides the public key 118*a* that corresponds to the private key 116*a* and the offeree 102*b* likewise provides the public key 118*b* that corresponds to the private key 116*b*.

Accordingly, the public key 118*a* of the offeror entity 425 is maintained by the offeree 102*b* in database 114*b*. Similarly, the public key 118*b* of the offeree 102*b* is maintained by the offeror entity 425 in database 114*a*. Thus, the offeror entity 425 can advantageously associate the offeree's 102*b* public key with the offeror's account information in database 114*a*. Similarly, the offeree 102*b* can advantageously associate the offeror entity's 425 public key 118*a* with the offeree's account information in database 114*b*. Therefore, since the complementary public key of either device 450*a* or device 450*b* is associated with private keys 116*a* and 116*b* respectively, each party can associate the account information of the other party with the other party's device.

After the devices have been manufactured, and the relationships have been developed and the accounts established at steps 1 and 1*a*, the offeror entity 425 prepares to make an offer 100 and send it as an EC to the offeree 102*b*. The actual individual making the offeror 100 may be any of the three individuals agent 302*a*, secretary 302*b* or manager 302*c*, as shown in the figure and described in detail in the discussion above of FIG. 8. Thus, the offer 100 is converted into a message and digitally signed using the private key 116*a* of device 450*a* at steps 2*a*, 2*b*, or 2*c* depending upon which individual is making the offer. The three individual parties are shown to illustrate the use of the verification status aspect of the invention, as described above in connection with FIG. 8. The verification status indicator is generated by the device 450*a* at the time the private key is used to generate the digital signature of EC 247*a*. The verification status is sent as an indicator 462*a* as discussed in reference to FIG. 8 and more fully in the incorporated VS Applications. The indicator 462*a* is used to provide assurance that the sender of the EC 247*a* intended to be bound to the contract offer 100, as discussed above in reference to FIG. 8.

After the EC 247*a* has been formulated at step 2*a*, 2*b*, or 2*c* to include the offer message, the digital signature, an identifier and the verification status indicator 462*a*, the EC is sent to the offeree 102*b* at step 3. Upon receiving the EC 247*a*, the offeree 102*b* determines whether to accept or reject the offer 100. The identifier, which is typically an account number, is used to look up the public key 118*a* from database 114*b*. The offeree 102*b* then decrypts the digital signature using the offeror entity's 425 public key 118*a* that is retrieved from database 114*b*. Database 114*b* preferably has three essential fields. These fields include an identifier, a public key and associated account information for each account database record of the database 114*b*. However, the database may only comprise two fields, wherein the public key doubles as the identifier. When the offer EC 247*a* is retrieved by the offeree 102*b*, the identifier, which is preferably not encrypted with the offeror's private key, is used to locate the public key 118*a* that corresponds to the identifier. The matching public key is then used to authenticate the sender of EC 247*a*. This provides confidence that the sender is the offeror entity 425 because the public key that authenticated the sender of EC 247*a* is associated with the offeror entity's account number.

However, the offeree 102*b* may desire more assurance that the sender is the offeror entity 425. Accordingly, the offeree 102*b* sends a request 226 to the secure entity 235 at step 4. This request 226 is an EC requesting the security profile 120A of the device that was used to send the offer EC 247*a*. The creation and use of the security profile 120*a* is described in detail in the incorporated PRiMR Applications. The security profile 120*a* is contained in a record in database 238 that was created at the same time the device 450*a* was created in the secure manufacturing facility 235. The security profile 120*a* provides security characteristics of the device 450*a* to the offeree 102*b*. This information is used by the offeree 102*b* to determine the level of security of the device 450*a* that was used to generate the digital signature of offer EC 247*a*. This information may include security attributes of the secure entity 235 and secure environment 115, as well as the procedures used to manufacture the device, the type of device itself and procedures used to maintain the secrecy of the private key 116*a* during the manufacturing process. Moreover, the data relates to the tamper-resistance of the device 450*a* and how safe the private key 116*a* contained therein is from hacking.

Continuing the discussion in reference to FIG. 16, the business rules maintained in database 114*b* that are associated with the offeror entity 425 may require a determination of the security attributes of the device 450*a* used to send the EC 247*a*. The business rules associated with public key 118*a* in database 114*b* may require the security profile 120*a* in order to determine whether the device 450*a* used to generate EC 247*a* is tamper-resistant. If the security profile 120*a* sent in response to request 226 indicates that the device is tamper-resistant, the offeree 102*b* is assured that the device is capable of protecting the secrecy of private key 116a contained therein. For example, if device 450a comes into the hands of someone other than the proper owner, that other someone would be unable to discern the private key through disassembly of the device. Accordingly, offeree 102b is reasonably assured that the device 450a was used to generate the digital signature of the EC, rather than some other device using private key 116a that may have been pirated from device 450a.

In addition to the security profile contributing to the overall confidence the offeree 102b places in the origin of the EC, the verification status indicator 462a indicates whether any verification data was input into the device when signing the EC 247a. The indicator 462a also indicates whether valid verification data was entered, and the DS flag is used to indicate whether the correct data was entered since the device 450a was reset. In addition, the verification status indicator 462a indicates whether invalid verification data was entered when the EC 247a was digitally signed by device 450a. Therefore, if the security profile 120a indicates that the private key 116a cannot be extracted from the device 450a, and that the verification status indicator 462a sent by device 450a at step 2a, 2b or 2c indicates that valid verification data was entered into the device immediately prior to the generation of EC 247a, the offeree 102b has a high level of confidence that the person or entity that generated EC 247a is the person or entity that is associated with public key 118a in database 114a.

With respect to the verification indicator, the verification data parameters include a PIN or biometric data as described in the incorporated VS Applications. The security profile may also include information as to the type of verification data that the device 450a is capable of receiving. Thus, if the security profile 120a sent to the offeree 102b from the database 238 at step 4 indicates that the device 450a was manufactured with the capability that a PIN can be entered, the offeree is assured that someone with knowledge of the correct PIN legitimately used the device to digitally sign EC 247a before it was sent at step 3. In addition, the device 450a may have been manufactured with the capability that biometric data be entered to further assure a recipient that the person signing the EC 247a with device 450a was the correct owner of the device. This would result in an even higher level of confidence that the legitimate owner of the device 450a used the device to digitally sign EC 247a. Thus, if the verification status indicates that a correct PIN, valid BIO, or other type of verification data, was entered into the device 450a, the offeree 102b is assured that the EC 247a was digitally signed using device 450a by someone that legitimately possessed the device.

Furthermore, the person or entity legitimately using device 450a to digitally sign the EC is the person or entity that is associated with public key 118a in database 114b. Moreover, if the security profile 120a indicates that the private key 116a cannot be compromised by electrical or mechanical disassembly or dissection of the device 450a, the offeree 102b is further assured that the sender of the EC 247a is the person or entity is the person or entity that is associated with public key 118a in database 114a.

Still discussing the system illustrated in FIG. 16, this high degree of certainty may be required for an offer of which the transaction's value is above a predetermined amount. Thus, if the transaction amount is small, the offeree 102b may only require that the public key associated with the identifier of the EC 247a be used to authenticate the sender of the EC. Furthermore, if the transaction amount is low, the offeree may not even request a security profile from the secure environment 115 at step 4. This is in order to keep costs low, as the secure entity 235 may typically charge a fee for each access of data from database 238.

However, if the transaction amount of the offer 100 is relatively large, the offeree 102b will typically require that the security profile 120a of the device used to generate the digital signature indicate that a PIN, or even biometric data, is supported by device 450a. Moreover, the offeree 102b may require that the security profile indicate that the private key 116a cannot be pirated from the device. If the security profile 120a so indicates, the offeree 102b is assured that the device was not stolen and was used by the proper owner of the device. This protects the offeree 102b because there is evidence that the sender of the offer EC 247a was the owner of the device, and therefore, the offeree can prove that the sender of the message will be bound to the terms of the contract 100 if the offeree decides to accept the offer.

Furthermore, in addition to the high degree of confidence as to the security of the private key 116a of the device 450a, the offeree 102b may also need to know that the offeror entity 425 intended to be bound to the particular contract 100 that made up the subject matter of the EC 247a. This is accomplished by using the verification status feature described in the incorporated VS Applications that indicates the timeout status of the device and the sequence status of the device as described above in reference to FIG. 8. Thus, in the scenario described in reference to FIG. 8, the device 450a sends as part of the EC 247a an indicator that indicates whether the device has timed out.

In addition, the indicator may indicate the DS flag of the device, which is incremented every time the private key 116a of the device 450a is used to generate a digital signature. As described above in reference to FIG. 8, the timeout and DS flag parameters are used to indicate that the sender actually intended to send the actual contract document 100 that was contained in the EC 247a. Thus, the verification status indicator provides evidence that the sender performed an overt act as a manifestation of intent to the particular contract document 100, which is the subject matter of the message contained in the EC 247a.

In accepting the terms of the offer, the acceptance 110 may be made by a process similar to the process described above regarding the making of the offer. Offeree 102b formulates an acceptance 110 into an EC 247b by using the private key 116b from device 450b to digitally sign the EC at step 5. Then, the acceptance EC 247b is sent to the original offeror entity 425 at step 6. Upon receiving the acceptance 247b at step 6, the offeror entity 425 may then request a security characteristic profile 120b from the secure environment entity 235 at step 7. This is similar to the process at step 4 where the offeree 102b requested the security characteristic profile 120a of device 450a that was used to digitally sign EC 247a. Similar processes of accessing account record database 114a to authenticate the digital signature of EC 247b and accessing the security characteristics and verification status indicator of device 450b are performed as were performed by the offeree 102b with respect to offer EC 247a.

Upon authentication of the sender of EC 247b and evaluation of the security characteristics and verification status indicator of device 450b in accordance with business rules that are associated with the sender contained in database 114a, the offeror entity 425 is provided confidence that a valid contract has been formed. Thus, performance of the terms of the original contract offer 100 can begin. Just like the offeree 102b can reliably determine that the offeror entity 425 intended to send the offer 100, and is thus bound to the terms thereof, the offeror entity can reliably determine that the offeree intended to assent to the terms of the acceptance 110. Thus, system 605 provides a method and system for reliably producing reliable assurances and tangible evidence that offeror entity 425 and offeree 102b mutually assented to the terms of the contract formed by the agreement represented by the offer 100 and the acceptance 110 thereof.

Thus, system 605 provides a method and system for authenticating, with a high degree of confidence, the sender of an EC, and moreover, an affirmative indication that the sender intended to send the contract 100. The aspect illustrated in FIG. 16 shows how account information data, which may include business rules that require that predetermined parameters be successfully determined prior to assenting to terms in a contract document, are used to facilitate e-contracting. The account information is associated with public keys 118, which in turn correspond to identifiers, on which the database 114b that contains the public keys and associated account information is indexed. The public keys 118 in the database 114b correspond to private keys of devices 450 that maintain the secrecy of the private keys 116 from the rest of the world.

Information related to the degree to which the device can protect the secrecy of the device is maintained in database 238. This information, referred to as a security profile 120, is maintained securely, preferably by the same entity 235 that manufactured devices 450, such that the information provides assurance that the device to which the security profile pertains is accurate. Furthermore, business rules contained in database 114b that are associated with a particular public key 118 that corresponds to an identifier in an EC may require that the security profile indicate that the private key 116 is undetectable through disassembly or dissection of the device.

In addition, a verification status indicator 462 may indicate whether valid verification data was entered into the device 450. This indicates that the appropriate user to which the device 450 is assigned used the device to digitally sign the EC, where the appropriate user corresponds to the identifier account number in database 114b. Moreover, the verification status indicator includes a DS flag that indicates whether the device has been used since the last time it was reset, or whether it has been used since valid verification data was entered. Therefore, if a security profile satisfies business rules that are associated in database 114b with a public key that corresponds to a device used to generate a digital signature, and if a verification status indicator of the device satisfies other parameters of the same business rules, a recipient is provided a high degree of assurance that the sender of an EC that used the device to digitally sign the EC is the person or entity associated with the account identifier in database 114b. Thus, a very secure and reliable method is illustrated that positively links, with a high degree of confidence, the sender of an EC that contains a contract document with account information, which may include financial information, or other information that may be relevant to performance of contract terms contained in the contract document.

Process for Contract Scenario Using PriMR VS and ABDS

Figure 17:
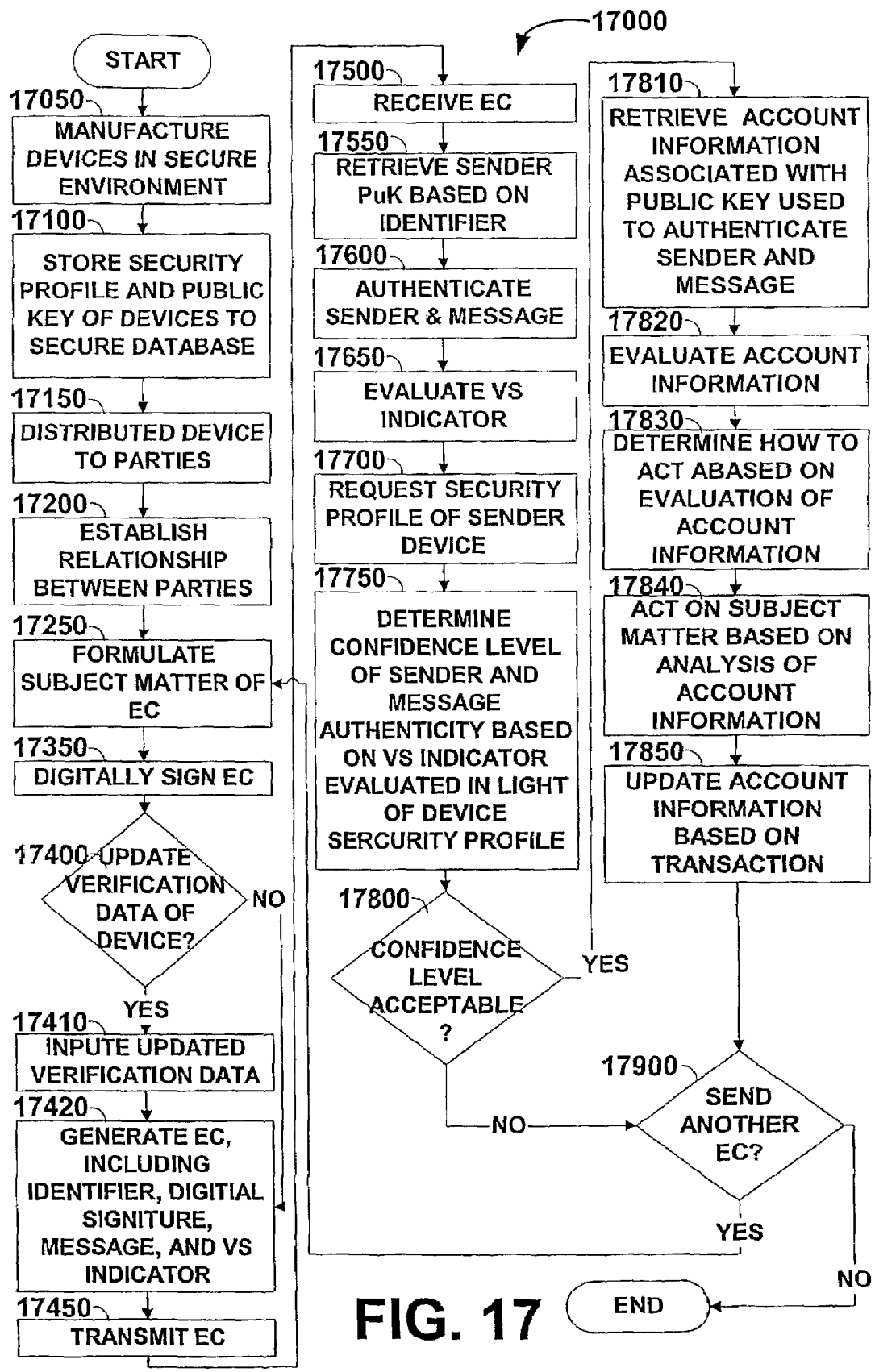
FIG. 17 illustrates a flow diagram depicting a process for using a combination of a verification status indicator, a security profile and an account based digital signature system in a contracting scenario.

Turning now to FIG. 17, flow diagram for a process 17000 is illustrated for authenticating a sender of an EC and the message contained therein, wherein the process creates, updates and evaluates a verification status indicator, as described in reference to FIG. 13. The process also evaluates a security profile as also described in reference to FIG. 13. In addition, the process establishes a relationship between two contracting parties, for example, where the parties exchange public keys with each other. When exchanging public keys, the parties may also establish accounts with each other, such that one party is an account authority for one or all of the other contracting parties. The AA then associates the public key and the account information of the other party(s) together, such that when an EC is received from a party, the EC containing an identifier such as an account number, the identifier is used to retrieve the public key. The public key is then used to authenticate the sender of the EC. This establishing of a relationship where an AA establishes an account with a party, and then uses the account information associated with the public key of the party, is more fully described in reference to FIGS. 1–6 above, and also in detail in the incorporated ABDS Applications.

The process begins at step 17050 where a personal device is manufacture in a secure environment. When the device is manufactured in the secure environment, a public key that corresponds to the devices internal private is stored at step 17100. Also at step 17100, the security characteristics are stored to a secure database maintained in a secure environment, such that a devices public key and the devices security characteristics are associated together. After the public key and corresponding security characteristics of a device have been stored to the database, the device is distributed to a user at step 17150.

After the user receives the device, the user may establish at step 17200 an account with another party. The other party may act as an AA authority to the first party, and vice versa, or a third party AA may maintain a database that associates all accounts with public keys and an identifier as described elsewhere herein. After receiving a device and establishing with another party, the user of the device may wish to formulate at step 17250 an EC that includes a contract document, for example, as the subject of a message contained therein. When the message of the EC has been formulated, the EC is digitally signed using the devices public key at step 17350. The EC may also contain a verification status indicator, as described elsewhere herein. If the user wishes to update the current verification status of the device, the decision to do so is performed at step 17400. This decision may be based on account information received from the party to which the EC will be sent, e.g. business rules, that were received when the relationship between the parties was established at step 17200. If the user decides not to update the verification status of the device at step 17400, the process proceeds to step 17420.

However, if the user decides to update the verification status of the device at step 17400, the updated data is input into the device at step 17410. Then the EC, including the updated verification status indicator, is digitally signed and generated at step 17420 and transmitted to a recipient at step 17450.

Next, the recipient receives the EC at step 17500. Upon receipt of the EC, step 17550, the recipient retrieves from a database maintained by the recipient the sender's public key, by searching the database based on the account identifier contained in the received EC. When the sender's public key has been retrieved it is used to authenticate the sender and message of the EC at step 17600, as described elsewhere herein. After the sender has been authenticated, the recipient evaluates the verification status indicator at step 17650. This evaluation may be performed in light of predetermined business rules, as discussed elsewhere herein. If the business rules need a security profile in order to raise the confidence level of the authentication of the sender, a security profile of the device used to generate the digital signature of the EC is requested from the secure entity at step 17700. Then, the level of confidence in the authentication is determined at step 17750 based on the verification status indicator evaluated in light of the requested security profile as described elsewhere herein. After the confidence level is determined, the recipient decides at step 17800 how to act on the subject matter of the EC based on the evaluation that was performed at step 17750 on the verification status indicator in light of the security profile.

If at step 17800 the confidence level determined at step 17750 is found not to be acceptable, the process 17000 advances to step 17900. However, if the confidence level is determined to be acceptable at step 17800, the public key from the EC received at step 17500 is used to retrieve at step 17810 any account information that is associated with the identifier and public key from the received EC from a database maintained by the recipient. This account information is then evaluated at step 17820 and a determination on how to act on the subject matter of the EC is made at step 17830.

After the determination of how to act is determined at step 17830, the subject matter is acted on at step 17840 in accordance with the determined confidence level as applied by business rules, or any other methodology known to those skilled in the art of making business decisions. After the subject mater is acted upon at step 17840, account information associated with the public key used to sign the EC is updated at step 17850. For example, if the sender of the EC has a line of credit with the recipient, and the EC contained an offer to purchase goods for a certain amount from the recipient, the recipient may reduce the line of credit and increase the accounts receivable with respect to the sender of the EC at step 17850 to reflect the purchase by the sender of the goods.

After updating the account information associated with the public key used to sign the EC, if the recipient of the EC wishes to send an EC in response to the EC received at step 17500, an acceptance, for example, the decision to send another EC is made at step 17900. If the decision is made to send another EC, the process returns to step 17250 where the process continues as described above, with the original recipient now being the sender of the new EC, and the original sender becoming the new recipient of the EC. If the recipient decides at step 17900 not to send another EC, the process ends.

In view of the foregoing detailed description of the preferred embodiments of the present invention, it readily will be understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Furthermore, those skilled in the art will understand and appreciate that the sequence(s) and/or temporal order of the steps of various processes described and claimed herein are those considered by the inventors to be the best mode contemplated by them for carrying out the inventions. It should also be understood that, although steps of various processes are shown and described in some cases as being in a preferred sequence or temporal order, the steps of such processes are not limited to being carried out in any particular sequence or order, absent a specific indication that a step or steps should be carried out in a particular sequence or order to achieve a particular intended result. In most cases, the steps of such processes may be carried out in various different sequences and orders, while still falling within the scope of the present inventions.

Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for establishing an electronic contract between a first party and a second party, comprising the steps of:
   (i) initially, establishing an account of the first party, the account being maintained by the second party, wherein the step of establishing the account comprises:
      (a) assigning an identifier to the account;
      (b) receiving a public key of a public/private key pair directly from the first party, the private key of the public/private key pair being stored securely within a device of the first party, the device being adapted to generate digital signatures using the private key;
      (c) associating the public key with the identifier in a database of the second party; and
      (d) associating a security profile of the device with the account, the security profile indicative of the security level of the device;
   (ii) thereafter,
      (a) the first party formulating an offer associated with the electronic contract;
      (b) the device generating a verification status indicator based on a comparison of verification data provided to the device with verification data of the first party pre-stored within the device;
      (c) the first party using the device to generate a digital signature of the offer and the verification status indicator;
      (d) the first party communicating an electronic communication to the second party, the electronic communication including the identifier, the offer, the digital signature, and the verification status indicator;
      (e) in response to receipt of the electronic communication and based on the identifier obtained therefrom, the second party authenticating the digital signature with the public key associated with the account and accessing the security profile of the device from the database; and
      (f) if the digital signature authenticates, the second party determining a response to the offer as a function of the security level of the device and as a function of the verification status indicator obtained from the electronic communication.

2. The method of claim 1, wherein the identifier is the public key associated with the account.

3. The method of claim 1, wherein the security profile is maintained by a third party independently of the first and second party.

4. The method of claim 1, wherein the security profile indicates the likelihood that the device can be compromised.

5. The method of claim 1, wherein the verification data comprises a PIN, a password, or a biometric characteristic.

6. A method for establishing an electronic contact between a first party and a second party, comprising the steps of:
- (i) initially, setting up an account of the first party with the second party, wherein the step of establishing the account comprises:
  - (a) storing a public key of a public/private key pair of the first party in a database of the second party, the private key of the public/private key pair being stored securely only within a device of the first party, the device being adapted to generate digital signatures using the private key;
  - (b) associating an identifier with the account of the first party;
  - (c) associating the public key with the account such that the public key is retrievable based on the identifier; and
  - (d) associating a security profile of the device with the account, the security profile indicative of the security level of the device;
- (ii) thereafter,
  - (a) the first party formulating an offer associated with the electronic contract;
  - (b) the device generating a verification status indicator based on a comparison of verification data provided to the device with verification data of the first party pre-stored within the device;
  - (c) the first party using the device to generate a digital signature of the offer and the verification status indicator;
  - (d) the first party communicating an electronic communication to the second party, the electronic communication including the offer, the identifier, the digital signature, and the verification status indicator;
  - (e) in response to receipt of the electronic communication and based on the identifier obtained therefrom, the second party authenticating the digital signature with the public key associated with the identifier and accessing the security profile of the device from the database; and
  - (f) if the digital signature authenticates, the second party determining a response to the offer as a function of the security level of the device and as a function of the verification status indicator obtained from the electronic communication.

7. The method of claim 6, wherein the identifier is the public key associated with the account.

8. The method of claim 6, wherein the security profile is maintained by a third party independently of the first and second party.

9. The method of claim 6, wherein the security profile indicates the security features of the device.

10. The method of claim 6, wherein the verification data comprises a PIN, a password, or a biometric characteristic of the first party.

11. A method for creating an electronic contract between a first party and a second party, comprising the steps of:
- (i) initially, establishing an account of the first party with the second party, wherein the step of establishing the account comprises:
  - (a) assigning an identifier to the account;
  - (b) storing a public key of a public/private key pair of the first party in a database of the second party, the private key of the public/private key pair being stored securely within a device of the first party, the device being adapted to generate digital signatures using the private key; and
  - (c) associating the public key with the identifier;
- (ii) thereafter,
  - (a) the first party formulating an offer associated with the electronic contact;
  - (b) the device generating a verification status indicator based on a comparison of verification data provided to the device with verification data of the first party pre-stored within the device;
  - (c) the first party using the device to generate a digital signature of a message, wherein the message contains the offer and the verification status indicator;
  - (d) the first party communicating an electronic communication to the second party, the electronic communication including the message and the digital signature;
  - (e) in response to receipt of the electronic communication and based on the identifier obtained therefrom, the second party authenticating the digital signature with the public key associated with the identifier and accessing the security profile of the device from the database; and
  - (f) if the digital signature authenticates, the second party determining a response to the offer based on pre-stored verification status indicator-related business rules maintained by the second party.

12. The method of claim 11, wherein the offer comprises an electronic message, and further comprising the step of inputting the offer into the device.

13. The method of claim 11, wherein the steps of formulating the offer and inputting the offer into the device make use of a secure input device separate from the device of the first party.

14. The method of claim 11, wherein the secure input device displays information relating to the terms of the offer.

15. The method of claim 11, wherein the verification data is provided to the device using a secure input device separate from the device of the first party.

16. The method of claim 11, wherein the message further includes the identifier.

17. A method for creating an electronic contract between a first party and a second party, comprising the steps of:
- (i) initially, establishing an account of the first party with the second party, wherein the step of establishing the account comprises:
  - (a) assigning an identifier to the account of the first party;
  - (b) storing a public key of a public/private key pair of the first party in a database of the second party, the private key of the public/private key pair being stored securely within a device of the first party, the device being adapted to generate digital signatures using the private key;
  - (c) associating the public key with the identifier; and
  - (d) associating a security profile of the device with the account, the security profile indicative of the security level of the device;
- (ii) thereafter,
  - (a) the first party formulating an offer associated with the electronic contract;
  - (b) the device generating a verification status indicator based on a comparison of verification data provided to the device wit verification data of the first party pre-stored within the device;

(c) the first party using the device to generate a digital signature of the offer and the verification status indicator;
(d) the first party communicating an electronic communication to the second party, the electronic communication including the offer, the identifier, and the digital signature;
(e) in response to receipt of the electronic communication and based on the identifier obtained therefrom, the second party authenticating the digital signature with the public key associated wit the identifier and accessing the security profile of the device from the database; and
(f) if the digital signature authenticates, the second party determining a response to the after based on pre-stored security-profile-related business rules maintained by the second party.

18. The method of claim 17, wherein to second party uses another device that generates digital signatures for responding to the first party.

19. The method of claim 17, wherein the security profile is stored in a security profile database maintained by a third party.

20. The method of claim 19, further comprising the step of the first party requesting the security profile from the security profile database of the third party.

* * * * *